(12) United States Patent
Salerno et al.

(10) Patent No.: US 11,728,081 B2
(45) Date of Patent: Aug. 15, 2023

(54) PLANAR POP-UP ACTUATOR DEVICE WITH EMBEDDED ELECTRO-MAGNETIC ACTUATION

(71) Applicant: ECOLE POLYTECHNIQUE FEDERALE DE LAUSANNE (EPFL), Lausanne (CH)

(72) Inventors: Marco Salerno, Lausanne (CH); Amir Firouzeh, Crissier (CH); Jamie Paik, Lausanne (CH); Stefano Mintchev, Lausanne (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 999 days.

(21) Appl. No.: 16/323,087

(22) PCT Filed: Aug. 4, 2017

(86) PCT No.: PCT/IB2017/054799
§ 371 (c)(1),
(2) Date: Feb. 4, 2019

(87) PCT Pub. No.: WO2018/025241
PCT Pub. Date: Feb. 8, 2018

(65) Prior Publication Data
US 2021/0287836 A1 Sep. 16, 2021

Related U.S. Application Data

(63) Continuation of application No. 15/229,157, filed on Aug. 5, 2016, now abandoned.
(Continued)

(51) Int. Cl.
*B25J 9/00* (2006.01)
*H01F 7/16* (2006.01)
(Continued)

(52) U.S. Cl.
CPC .......... *H01F 7/1646* (2013.01); *B25J 9/0051* (2013.01); *B25J 9/12* (2013.01);
(Continued)

(58) Field of Classification Search
CPC ............. H01F 7/1646; H01F 2007/068; H01F 2007/1692; B25J 9/0051; B25J 9/12; B25J 9/0045; G05G 9/047
See application file for complete search history.

(56) References Cited

U.S. PATENT DOCUMENTS 5,378,282 A * 1/1995 Pollard .................. F16H 25/02
901/29
5,656,905 A * 8/1997 Tsai ..................... B25J 17/0266
901/41

(Continued)

OTHER PUBLICATIONS

Grover, Frederick W., "Inductance Calculations: Working Formulas and Tables", Dover Phoenix Editions, 2004, 304 pages.
(Continued)

*Primary Examiner* — William C Joyce
(74) *Attorney, Agent, or Firm* — Nixon & Vanderhye P.C.

(57) ABSTRACT

A planar actuator device, including a base plate including a first, second, and third pair of planar coils, each pair of planar coils having an inner coil and an outer coil, each pair of planar coils arranged along a first, second, and third linear motion axis, respectively, the first, second, and third linear motion axis arranged in a star configuration, and an actuation mechanism including a first, second, and third planar legs and a centerpiece, the first, second and third planar legs pivotably connected to the centerpiece, the planar legs including a first, second, and third sliding element and a first, second, and third middle section, respectively, a sliding element and middle section of a respective leg pivotably connected to each other, each sliding element including a permanent magnet.

12 Claims, 70 Drawing Sheets

Related U.S. Application Data

(60) Provisional application No. 62/512,108, filed on May 29, 2017.

(51) Int. Cl.
    *B25J 9/12*          (2006.01)
    *H01F 7/06*         (2006.01)

(52) U.S. Cl.
    CPC ............... *H01F 2007/068* (2013.01); *H01F 2007/1692* (2013.01); *Y10S 901/02* (2013.01); *Y10S 901/19* (2013.01)

(56) References Cited

U.S. PATENT DOCUMENTS

| | | | | |
|---|---|---|---|---|
| 6,675,671 | B1* | 1/2004 | Jokiel, Jr. | B25J 9/1065 |
| | | | | 901/29 |
| 7,093,827 | B2* | 8/2006 | Culpepper | F16C 11/12 |
| | | | | 310/309 |
| 7,124,660 | B2* | 10/2006 | Chiang | G09B 9/02 |
| | | | | 901/16 |
| 7,239,107 | B1* | 7/2007 | Ferreira | H02N 2/028 |
| | | | | 318/575 |
| 8,310,128 | B2* | 11/2012 | Ferreira | H02N 1/008 |
| | | | | 310/309 |
| 9,109,743 | B2* | 8/2015 | Schwab | B23Q 1/5462 |
| 9,694,501 | B2* | 7/2017 | Nagatsuka | B25J 9/0051 |
| 2004/0114259 | A1 | 6/2004 | Ishizuya et al. | |
| 2005/0237597 | A1* | 10/2005 | Epitaux | H02N 1/008 |
| | | | | 359/290 |
| 2007/0220882 | A1 | 9/2007 | Culpepper et al. | |
| 2010/0001616 | A1* | 1/2010 | Ferreira | H02N 1/008 |
| | | | | 310/300 |
| 2010/0275717 | A1* | 11/2010 | Poyet | G01Q 10/04 |
| | | | | 74/479.01 |
| 2013/0279030 | A1 | 10/2013 | Calvet et al. | |

OTHER PUBLICATIONS

Kasap, S.O., "Principles of Electronic Materials and Devices", Second Edition, Summer 2001, 252 pages.
COMSOL AC/DC Module User's Guide, Version: COMSOL 5.4, 2018, 366 pages.
International Search Report for PCT/IB2017/054799, dated Mar. 2, 2018, 4 pages.
Written Opinion of the ISA for PCT/IB2017/054799, dated Mar. 2, 2018, 6 pages.

\* cited by examiner

Offset slider-crank mechanism

Offset slider-crank mechanism

PLANAR POP-UP ACTUATOR DEVICE WITH EMBEDDED ELECTRO-MAGNETIC ACTUATION

CROSS-REFERENCE TO RELATED APPLICATIONS

This application is the U.S. national phase of International Application No. PCT/IB2017/054799 filed Aug. 4, 2017, which claims the benefit of U.S. application Ser. No. 15/229,157 that was filed on Aug. 5, 2016, and also claims the benefit of U.S. provisional application with U.S. Ser. No. 62/512,108 that was filed on May 29, 2017, the entire contents of each of which are hereby incorporated herein by reference.

FIELD OF THE INVENTION

The present invention is directed to the field of mechanical actuators, mechanical actuator for robots and haptic devices, and methods of using and manufacturing the same devices.

DISCUSSION OF THE BACKGROUND ART

In the field of mechanical actuators and robots, the smart composites microstructure (SCM) emerged as a high performing low cost innovative technique for manufacturing thin composites embedding many functional features such as electrical connections, actuators and sensors. Researchers demonstrated the potential of this novel manufacturing techniques by realizing different origami inspired robots capable of performing different tasks including shape transformation, crawling locomotion, jumping and multimodal locomotion. In smaller scales, this manufacturing technique has also been used to develop millimeter scale flying robotic insects. For such actuators and robots based on SCM, piezoelectric actuators have been discussed to provide higher speeds (10 mm/s to 50 mm/s) but due to their limited stroke they require the design of a complex transmission mechanism for their employment.

In addition, numerous literatures describe the design and fabrication of coupled magnet and coils and their miniaturized systems in the mesoscale and in the microscale. Their advances have been apparent in wireless power transmission, tactile sensors, and medical imaging. For actuation purposes, millimeter or sub-millimeter scale motions have been obtained by exploiting, in many cases, the simple axial repulsion of a planar coil and an axially magnetized cylindrical magnet.

However, despite these advancements in the field of mechanical actuation and robots, in particular devices and systems of reduced scale, still further improvements and solutions are desired.

SUMMARY

According to one aspect of the present invention, a planar actuator device is provided. Preferably, the planar actuator device includes a base plate including a first, second, and third pair of planar coils, each pair of planar coils having an inner coil and an outer coil, each pair of planar coils arranged along a first, second, and third linear motion axis, respectively, the first, second, and third linear motion axis arranged in a star configuration, and an actuation mechanism including a first, second, and third planar legs and a centerpiece, the first, second and third planar legs pivotably connected to the centerpiece, the planar legs including a first, second, and third sliding element and a first, second, and third middle section, respectively, a sliding element and middle section of a respective leg pivotably connected to each other, each sliding element including a permanent magnet. In addition, preferably, the first, second and third coil pairs respectively, are configured for magnetic coupling with a respective permanent magnet of the first, second, and third sliding element, respectively, to move the first, second, and third sliding element along the first, second, and third linear motion axis, respectively.

According to another aspect of the present invention, an actuator device is provided. Preferably, the actuator device includes a base plate including a first, second, and third pair of planar coils, each pair of planar coils having an inner coil and an outer coil, each pair of planar coils arranged along a first, second, and third linear motion axis, respectively, the first, second, and third linear motion axis arranged in a star configuration, and an actuation mechanism including a first, second, and third planar legs, the planar legs including a first, second, and third sliding element and a first, second, and third middle section, respectively, a sliding element and middle section of a respective leg pivotably connected to each other, each sliding element including a permanent magnet. Moreover, the actuator device preferably further includes a delta robot structure including a first, a second, and a third articulated arm and a centerpiece pivotably connected to each of the first, second, and third articulated arm, each of the first, second, and third articulated arm having a lower section and an upper section pivotably connected to each other, each end portion of the first, the second, and the third middle section of the first, the second, and the third leg, respectively, pivotably connected to the lower section of the first, second, and third articulated arm, respectively.

According to still another aspect of the present invention, a delta robot is provided. Preferably, the delta robot includes a planar base having an opening structure with three longitudinal openings and a center opening, the longitudinal openings arranged in a star configuration, an actuation structure including a fixed center base, three movable legs, and a movable platform, the movable platform rotatably attached to each of the three movable legs; and three mechanical transmission mechanisms to individually actuate the three movable legs. Moreover, preferably, in a folded state, the movable legs of the actuation structure and the centerpiece are arranged inside the opening structure, and in an expanded state, the three movable legs protrude out of the opening structure to move the movable platform with three degrees of freedom by the three mechanical transmission mechanisms.

According to yet another aspect of the present invention, an actuated parallel platform system is provided. Preferably, the actuated parallel platform system includes a planar base having an opening structure with a center opening and three openings arranged in a star configuration from the center opening, an actuation structure including a center base, three movable legs, and a movable platform, the movable platform rotatably attached to each of the three movable legs, and three mechanical transmission mechanisms to individually actuate the three movable legs. Moreover, preferably, each movable leg includes an upper leg pivotably attached to the movable platform, a lower leg operatively attached to a respective mechanical transmission mechanism for rotation, and a foldable middle section pivotably connecting to both the upper leg and the lower leg, and in a folded state, the movable legs of the actuation structure and the centerpiece are arranged in the opening structure. Moreover, preferably, in an expanded state, the three movable legs protrude out of the opening structure to move the movable platform with one translational degree of freedom and two rotational degrees of freedom by the three mechanical transmission mechanisms The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1A shows the unfolded and flat two-dimensional (2D) configuration of the device with a top and the side view, FIG. 1B shows the three-dimensional (3D) folded configuration upon an actuation with a top and side view, the arrows mark the direction of motion of sliding elements and centerpiece, and FIG. 1C shows the base platform without the articulated mechanism;

FIG. 16C shows calculated parameters used in the comparison with the model;

FIG. 37C shows the cover layer, the rail layer, and the actuation transmission layer superposed, FIG. 37D shows the sensing and control layer that can also include a controller to control the motion of the legs of the planar delta robot, and FIG. 37E the actuation transmission layer superposed and attached to the sensing and control layer;

FIG. 40F shows the three legs of the planar delta robot in an extended state, each leg interconnected with each other via the triangularly-shaped attachment base.

FIG. 50B shows two side views from a first side and another second side that is arranged perpendicular to the first side, showing one leg operatively connected to the centerpiece or movable platform in a second extended position or state, being slightly less extended than the first state, FIG. 50C showing a perspective view of the first state, and FIG. 50D showing a perspective view of the second state;

Figure 1A:
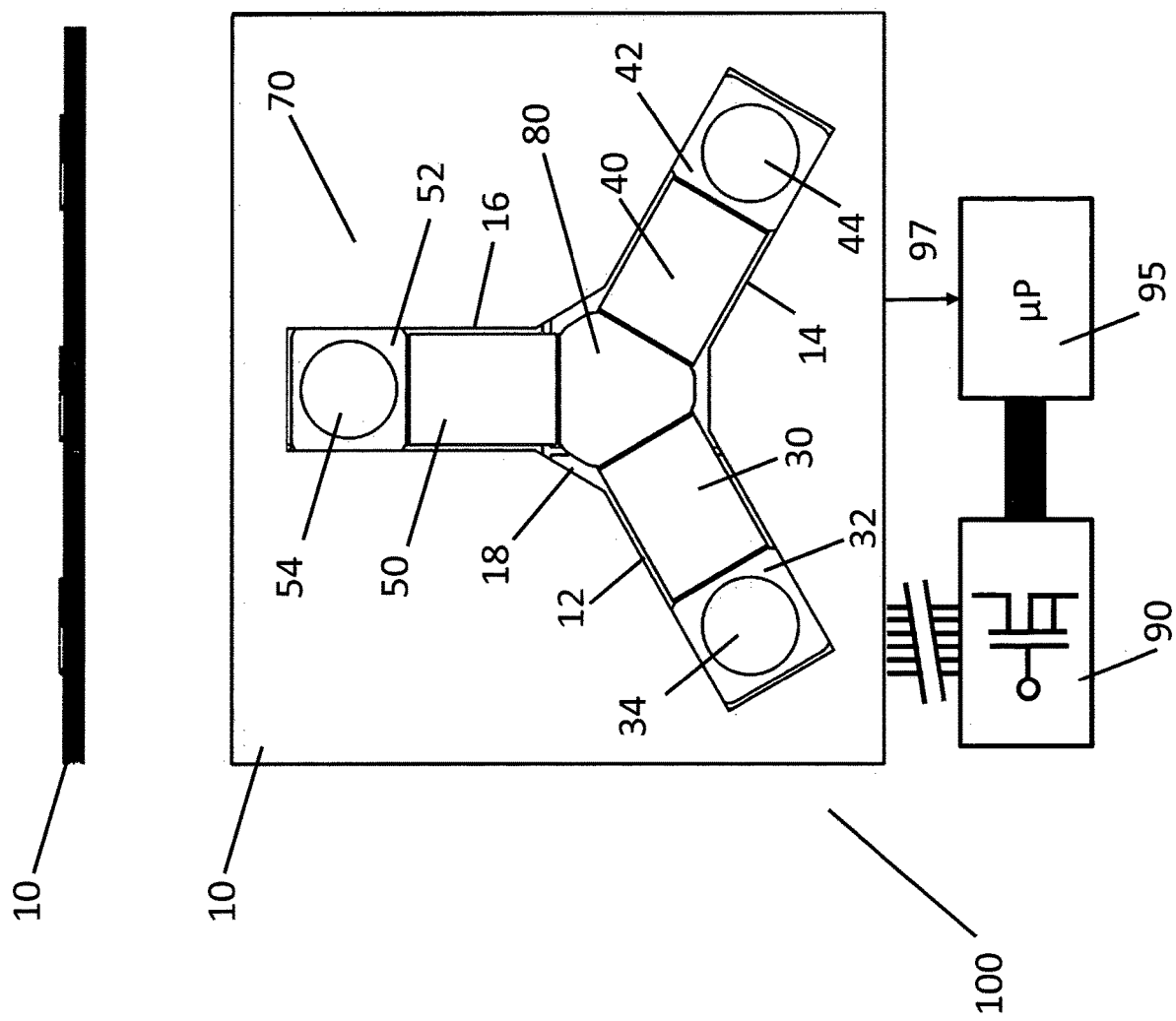
FIGS. 1A, 1B, and 1C show a side and top schematic view of an aspect of the present invention, showing the pop-up foldable actuator with and without the articulated mechanism.

Table I shows user-defined parameters used in the FEM simulations for an exemplary pop-up foldable actuator device;

Table II shows design parameters for an exemplary pop-up foldable actuator device;

Table III shows the weight of the different parts for an exemplary pop-up foldable actuator device;

Table IV shows parameters used in the thermal model for an exemplary pop-up foldable actuator device; and Table V shows dynamic parameters used in magnet in rail model for an exemplary pop-up foldable actuator device.

Herein, identical reference numerals are used, where possible, to designate identical elements that are common to the figures. Also, the images are simplified for illustration purposes and may not be depicted to scale.

DETAILED DESCRIPTION OF THE PREFERRED EMBODIMENTS

FIG. 1A depicts a top and side schematic view of a pop-up planar actuator device 100, according to one aspect of the present invention. The device 100 includes a base platform 10 and an articulated mechanism 70 having three (3) legs 30, 40, 50 each rotatably connected at one end to a top platform 80. Top platform or centerpiece 80 can have a substantially triangular shape or another shape that has three (3) sides, each side rotatably connecting to a corresponding end of a leg 30, 40, 50. Each leg 30, 40, 50 includes a respective slider 32, 42, 52 and a respective permanent magnet 34, 44, 54 that are arranged at the other end of the corresponding leg 30, 40, 50. Each permanent magnet 34, 44, 54 is axially magnetized and can be surface-mounted to corresponding leg 30, 40, 50. Each slider 32, 42, 52 is rotatably connected at an end portion to a middle section of a corresponding leg 30, 40, 50. As further shown in FIG. 3, base platform 10 includes three (3) rail structure 13, 15, 17, rail structures 13, 15, 17 defined as side walls of longitudinal, flat openings 12, 14, 16, each opening 12, 14, 16 having a shape or outline to accommodate a corresponding leg 30, 40, 50 when the device 100 are in a disengaged or deactivated state. This means that legs 30, 40, and 50 are in a planar or flat state. Moreover, openings 12, 14, 16 are arranged in a star configuration towards each other, and at the center of the star an opening 18 is arranged to accommodate the top platform 80, when device 100 is in the disengaged or deactivated state, as shown in FIG. 1A.

The mechanical moving elements or articulated mechanism 70 that include legs 30, 40, 50 with slider 32, 42, 52, respectively, arranged in a star configuration around centerpiece 80 can be made from one layer. Rotatable connections are formed between each slider 32, 42, 52 of leg 30, 40, 50 and middle sections of leg 30, 40, 50, and between each middle section of leg 30, 40, 50 and top platform or centerpiece 80. These rotatable connections can be made by a thinned portion as a foldable linkage from a single layer of carbon fiber. In a variant, the articulated mechanism 70 can be made of reinforced epoxy to manufacture legs 30, 40, 50 and centerpiece 80, that are connected together with a thin polyamide layer forming the rotatable connections.

Figure 1B:
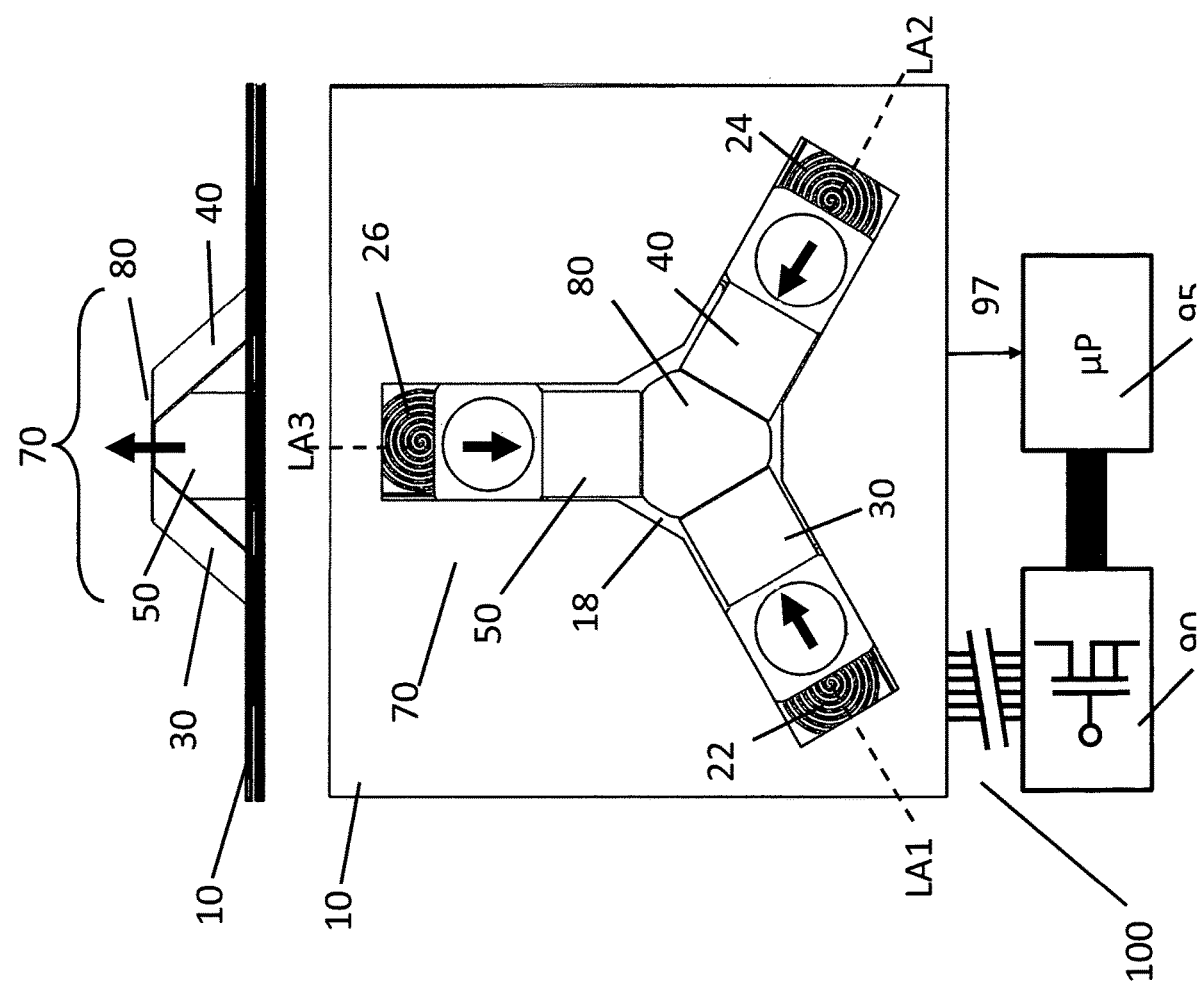
Figure 1C:
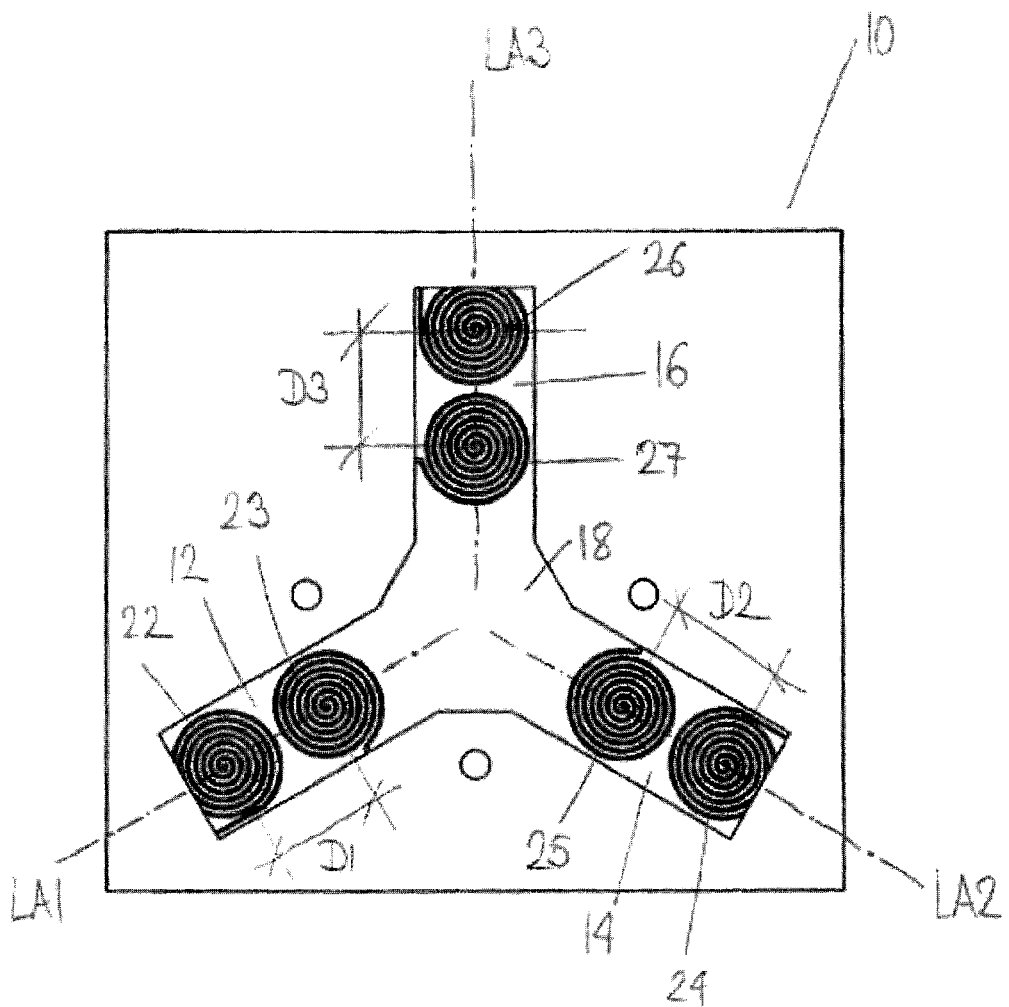

FIG. 1C shows the base platform 10 with the articulated mechanism 70 removed therefrom. In the base platform 10 at an area of each opening 12, 14, 16, pairs of planar coils 22, 23, 24, 25, and 26, 27 are arranged, such that an outer planar coil 22, 24, 26 of the pair of coils is arranged at an outer section of a corresponding opening 12, 14, 16, and the inner planar coils 23, 25, 27 of the pair of coils are arranged away from the outer section of the corresponding openings 12, 14, 16 closer to the center of the star. FIG. 1B shows the outer planar coils 22, 24, 26 partially uncovered by an articulated mechanism 70 and corresponding slider 32, 42, 52 of leg 30, 40, 50, respectively, when the device 100 is in an engaged or activated state. Pairs of planar coils 22, 23, 24, 25, and 26, 27 are used to activate a linear movement of a corresponding slider 32, 42, 52 in the corresponding opening 12, 14, 16 with a corresponding permanent magnet 34, 44, 54 that is arranged on slider 32, 42, 52, respectively. Pairs of planar coils are spaced apart by a distance D1, D2, and D3, respectively, preferably the distance D1, D1, and D3 being the same. The distances D1, D2, and D3 defines the range of linear motion for corresponding sliders 32, 42, and 52, and in turn define a motional range of centerpiece 80.

Thereby, each pair of planar coils forms a linear motion axis L1, L2, and L3, respectively, with coils 22, 23 arranged along the linear motion axis L1, coils 24, 25 arranged along linear motion axis L2, and coils 26, 27 arranged along linear motion axis L3. In the variant shown, the linear motion axes L1, L2, and L3 are arranged in a star configuration crossing each other at a middle point, preferably located substantially in a center of the base platform 10. However, other types of arrangement of the linear axes is also possible. Thereby, pairs of planar coils 22, 23, 24, 25, and 26, 27 and corresponding legs 30, 40, 50 and the associated slider 32, 42, 52 form three linear actuators that can move sliders 32, 42, 52 along linear motion axes L1, L2, L3, respectively, by magnetic coupling.

The linear actuators, placed in a star configuration on the base platform 10 and coupled mechanically together with the top platform or centerpiece 80 include the pairs of planar coils 22, 23, 24, 25, and 26, 27, a rail structure 13, 15, 17 that is formed by side walls of openings 12, 14, 16 arranged in a star configuration, and an axially magnetized permanent magnets 34, 44, 54 arranged at a corresponding slider 32, 42, 52. The pair of coils 22, 23, 24, 25, and 26, 27 are designed to make the corresponding slider 32, 42, 52 with magnet 34,

44, 54 translate, move or slide along the opening in a direction of longitudinal extension of each opening 12, 14, 16 when the pair of coils are energized thus obtaining a linear motion. Each leg 30, 40, 50 in this mechanism constrains four (4) out of the six (6) degrees of freedom (DoF) of the top platform or centerpiece 80. Because the constraints between each leg are coupled, the overall mechanism consisting of three legs 30, 40, 50 has one (1) active DoF. For example, when inner coils 23, 25, 27 are energized, while outer coils 22, 24, 26 are not energized, top platform or centerpiece 80 moves to an outermost position away from the base platform 10, by a linear motion of all sliders 32, 42, 52 towards the center of the star arrangement of openings 12, 14, 16. In contrast thereto, as shown in FIG. 1A, device 100 is configured such that when outer coils 22, 24, 26 are energized, while inner coils 23, 25, 27 are not energized, top platform or centerpiece 80 moves towards the base platform 10 to be accommodated in opening 18, by a linear motion of all sliders 32, 42, 52 away from the center of the star arrangement of openings 12, 14, 16. At the same time, legs 30, 40, 50 move towards base platform 10 to be accommodated in openings 12, 14, 16. In this deactivated state, legs 30, 40, 50 and top platform or centerpiece 80 are arranged in a same plane parallel to the extension of the base platform 10.

In FIG. 1A, device 100 is shown in a planar, flat, state, when device 100 is deactivated or disengaged, and in FIG. 1B the device 100 is shown to be in a 3D state, where legs 30, 40, 50 connected to top platform 80 protrude from base platform 10, in an operating or expanded state. In the deactivated state, it is possible that the legs 30, 40, 50 and top platform 80 are entirely comprised by base platform 10, when seen from the lateral side, as shown on the top of FIG. 1A. According to some aspects of the present invention, these features allow to provide for a pop-up planar actuator device 100 that can be used for highly mobile or portable robotics, or for a haptic device as a portable and collapsible human-robot interface (HRI). The device 100 is very compact in a deactivated state to form a thin planar device, and it can be manufactured based on a layered construction using printed circuit board and surface mount fabrication process steps. Such manufacturing allows to make the fabrication accurate, robust and comparatively cost-effective. In the embodiment shown in FIG. 1A, the entire device 100 is less than 1.7-mm thick in its deactivated or disengaged state, yet the device 100 will increase to a multiple of the thickness in an activated 3D state, as shown in FIG. 1B.

FIGS. 1A and 1B also show a power supply module 90 for providing electrical power individually to each of the planar coils 22, 23, 24, 25, 26, 27. This allows to magnetize each coil separately and individually to create a magnetic coupling with permanent magnets 34, 44, 54. Next, a control device 95 is shown that is configured to control the power supply module 90, and to receive measurement signals 97 from the device 100. For example, as discussed further below, hall effect sensors or position measurements sensors that are embedded in either base platform 10 or articulated mechanism 70 can provide for feedback measurement signals to control device 95, to provide for controlled electrical power for each planar coil 22, 23, 24, 25, 26, 27 for generating linear motion of each sliding elements 32, 42, 52. In the variant shown, the control device 95 and the power supply module 90 are arranged outside of the base platform 10. However, it is also possible to integrate a planar power supply module 90 and/or a planar control device 95, for example a microchip, directly into the planar layers of the base platform 10.

With the aspects and features of device 100 used for example but not limited to robotic technology, actuators, and haptic devices, it is possible to achieve more challenging tasks in more sophisticated and special environments. Bringing traditionally powerful and fast, but as a consequence, large and unsafe robotic systems and devices into daily human life presents numerous engineering challenges. One aspect is the provision of mechanical and geometric scalability of the traditional mechanisms and actuators. In particular, portable robotic manipulators and highly interactive HRI require extremely demanding engineering requirements that oblige novel solutions in mechanism design and actuation systems. The structural bases for many robotic devices are manipulators and grippers based on numerous linkages and joints. Therefore, with the features of pop-up planar actuator device 100, according to some aspects of the present invention, a mechanically simple yet scalable and effective design is proposed, that can be used for example as an HRI for existing systems and devices. In a deactivated state, the device 100 can be made very thin allowing specific applications for handling, mobility, and use.

The device 100 according to some aspects of the present invention allows to provide for a flat or planar miniature parallel system with an embedded actuation mechanism and the mechanical links for motion transmission by a top platform and centerpiece 80 that can be lifted out from the planar state to perform 3D motions with three (3) degrees of freedom. According to another aspect of the present invention, device 100 can be used as a component for a miniature haptic interface. With pop-up planar actuator device 100, origami inspired designs based on folding technique to give structural stability to thin lightweight composite materials while endowing possibility of transformation between a planar deactivated, quasi-2D configuration to a 3D configuration is possible. Moreover, pop-up planar actuator device 100 can be manufactured in a foldable pocket size to a millimeter-thick structure that can transform into robust 3D articulated mechanisms that allows interaction with a potential user by providing motion and/or force in a desired direction with the top platform 80.

With at least some aspects of the present invention, pop-up planar actuator device 100 includes a millimeter-thick linear electromagnetic actuator, made of legs 30, 40, 50 with sliders 32, 42, 52, and permanent magnets 34, 44, 54 and pairs of planar coils 22, 23, 24, 25, 26, 27 that can be further integrated into a robotic device or system, or can be integrated into a haptic device. According to one aspect of the invention, with an exemplary embodiment of device 100 the magnetic field is controlled that is generated by the pairs of planar coils 22, 23, 24, 25, 26, 27 to modulate up to 13 mm actuation distance with a thickness of 1.7 mm of the device 100 in the deactivated state. Device 100 also demonstrates the functionalities and performance on a one-degree of-freedom (DoF) origami parallel platform that can be reversibly folded from a planar, flat, 2D configuration to a 3D pop-up structure.

In order to make device 100 autonomous and to reduce the overall size of the device 100, device 100 and the articulated mechanism 70 can be embedded as one of the functional layers in SCM. Actuators to be embedded in the structure have to be thin, contained in the millimeter size of the system, and capable of a wide range of speed in a range between 1 mm/s to 100 mm/s and forces of at least 200 mN, for example to allow interaction as a haptic device with human hands.

Currently, there are no suitable devices and systems for manufacturing and operating such device. Thermally-activated actuation methods, whether for permanent shape transformation or repeatable motion using shape memory alloy (SMA) actuators are not suitable for such system and device given the need for fast and repeatable motions in human-robot interfaces (HRI). Aiming to achieve an actuation system with a wide stroke, high speed and low-profile, according to one aspect of the present invention, a device 100 is presented that allows to use electromagnetic actuation due to the ease of manufacturing planar coils 22, 23, 24, 25, 26, 27 through photolithography process and the possibility of embedding these layers in a flat, planar or quasi-2D structure based on the SCM technique.

Figure 2:
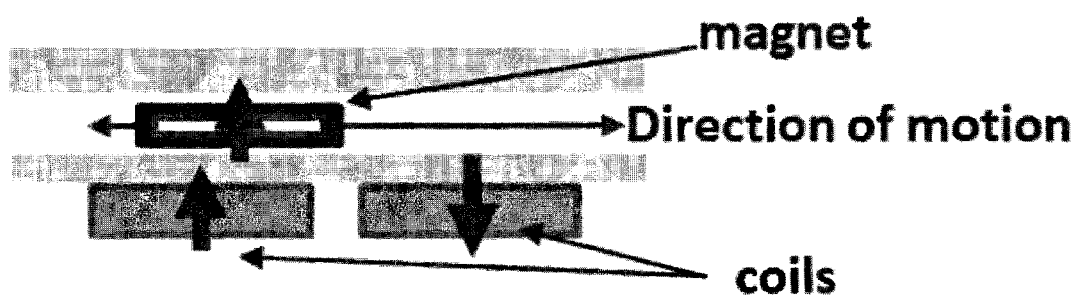
FIG. 2 shows a side schematic view of a miniaturized electromagnetic actuator that represents the operating principle and components of the pop-up foldable actuator, the arrows mark the magnetization direction of magnet and coils.

With FIG. 2, a schematic and simplified representation of the actuator components and the linear actuation operation principle is described, with a side cross-sectional view. In this description, only one leg of the device 100 is described for simplification purposes, but the representation of the operating principle shown in FIG. 2 applies to all three (3) legs, or more legs. A permanent magnet 34 is shown as a part of a slider 32 that can move above a sliding surface 13 of opening 12 formed by base platform 10. Below the sliding surface 12, a planar coil pair 22, 23 are arranged. The arrangement of coil pair 22, 23 defines a maximal linear translation range that can be achieved by actuator. Coils 22 and 23 can be selectively energized so that permanent magnet 24 and corresponding slider 32 can move to the left or to the right to perform a linear movement along a longitudinal extension of opening 12.

Figure 3:
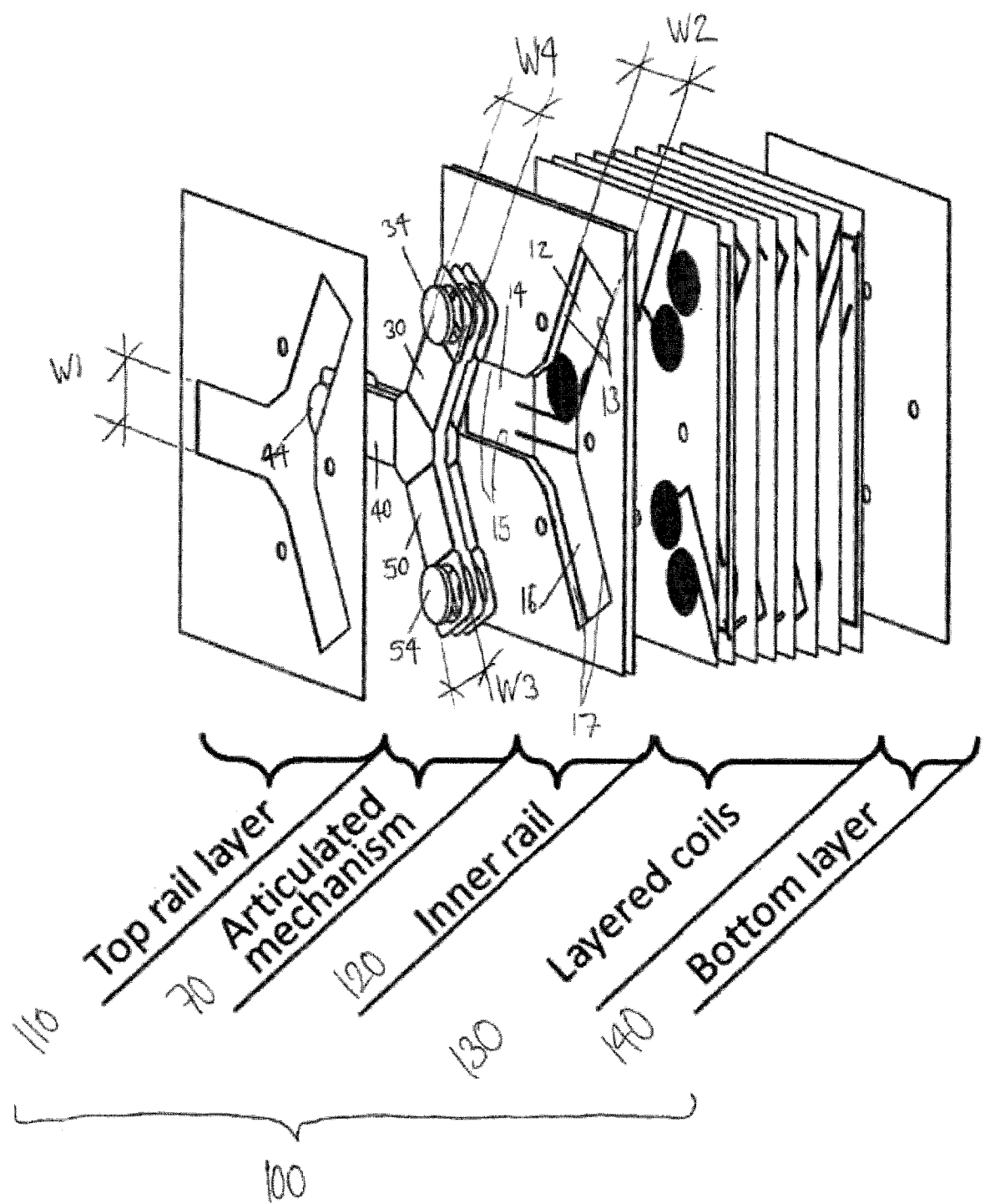
FIG. 3 shows a schematic perspective view of the layers that can form the pop-up parallel actuator device.

FIG. 3 shows a perspective, exploded view of one embodiment of device 100, in which device 100 is made of a series of thin layers, for example printed circuit board layers that can be combined with reinforcement layers, for example fiberglass or carbon fiber layers. In this variant, device 100 is made of a top rail layer 110 that provides for guidance of the legs 30, 40, 50 of the articulated mechanism 70, articulated mechanism 70 itself with the permanent magnets 34, 44, 54. The legs 30, 40, 50 of articulated mechanism 70 themselves can be made of multiple layers, and each permanent magnet 34, 44, 54 located inside a cavity that traverses all of the multiple layers that form the corresponding leg 30, 40, 50. Next, an inner rail layer 120 is shown that provides for additional guidance for legs. Openings 12, 14, 16 for respective legs 30, 40, 50 are formed by both the top rail layer 110 and the inner rail layer 120. This can be done with the opening of top rail layer 110 being slightly narrower in a transverse direction of a corresponding linear motion axis as compared to the opening formed by the inner rail layer 120. For example, respective slider 32, 42, 52 having a respective permanent magnet 34, 44, 54 are slightly narrower in width W3 than the width W2 of the respective opening 12, 14, 16 formed by inner rail 120, such that the sliders 32, 42, 52 can be guided linearly along the respective opening, while a width W1 of the respective opening of top rail layer 110 is slightly narrower than a width W3 of the sliders 32, 42, 52 so that the sliders can be guided and still cannot exit the respective opening 12, 14, 16 that form the respective linear motion axis. In addition, a width W4 of leg 30, 40, 50 is narrower than the width W1 of the top rail layer 110, so that the legs 30, 40, 50 can exit and enter the openings 12, 14, 16, respectively, upon actuation of the sliders.

Next, the inner rail 120 is placed onto a stack of layered coils 130. The layered coils 130 can be a stack of printed circuit boards, or a multilayer printed circuit board that includes planar coils 22, 23, 24, 25, 26, 27. In a variant, each coil 22, 23, 24, 25, 26, 27 can be made of a single coil from each layer of the layered coils 130, and then the single coils are all connected in series or in parallel. The stack of layered coils 130 is placed onto a bottom layer 140 serving as a cover. Materials of the layers 110, 120, 130, and 140 can be chosen to for their respective function. For example, the top rail layer 110 and the bottom layer 140 can be made of a thin and stiff material to serve as a casing, for example but not limited to a thin layer of carbon fiber, fiberglass, or metal. An inner side of top rail layer 110 can be coated with a layer that reduced friction, for example but not limit to Teflon or Kevlar™ Inner rail layers 120 can also be made to have inner surfaces that form the opening that provide for reduced friction towards the sliders 32, 42, 52. Similarly, an upper surface of layered coils 130 that faces the sliders 32, 42, 52 can be covered with an thin insulating layer to preserve the magnetic coupling between the permanent magnets 34, 44, 54, and planar coils 22, 23, 24, 25, 26, 27. The design and fabrication of layers 110, 120, 130, and 140 and articulated mechanism 70 can be based on the SCM fabrication that embeds multiple essential components such as folding linkages and actuation system in the different layers of the structure.

Figure 4A:
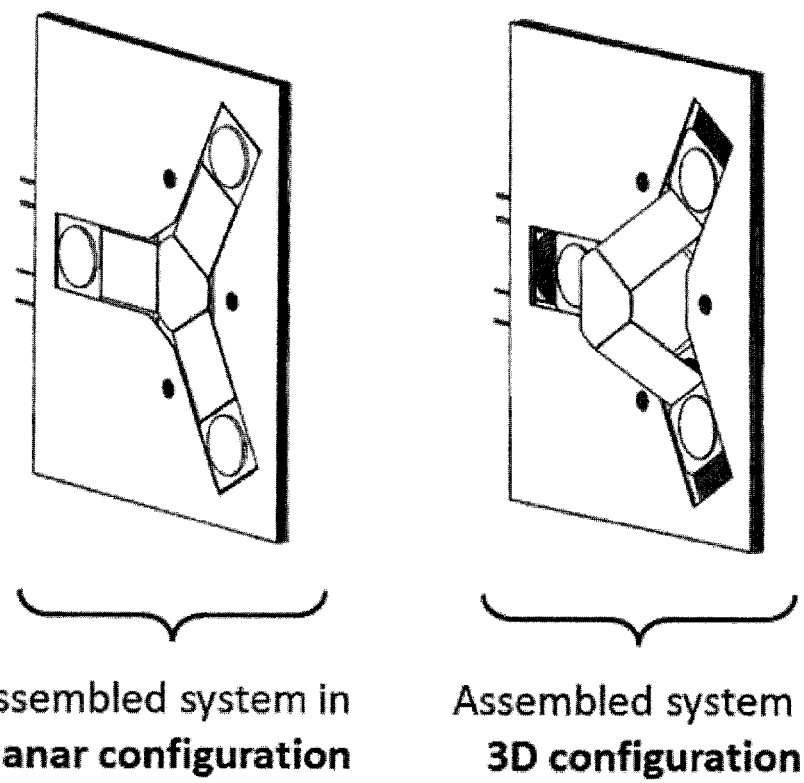
FIG. 4A shows a schematic perspective view of the pop-up parallel actuator device the unfolded in the 2D state at the left, and the folded 3D device configuration on the right.

FIG. 4A shows the assembled pop-up planar actuator device 100 with the sliders 32, 42, 52 located and guided within their corresponding opening 12, 14, 16, showing the device 100 on the left side in the deactivated planar or 2D configuration, with centerpiece or platform 80 accommodated in device 100, so that the entire device 100 is entirely planar. On the right side of FIG. 4A, the activated device 100 is shown, where the sliders 32, 42, 52 have moved towards a center of device 100, and the centerpiece 80 has been lifted from base platform 10, the base platform 10 preferably being formed by layers 110, 120, 130, and 140 shown in FIG. 3. In the activated state, the device 100 is not planar anymore, and is in a 3D configuration.

Figure 4B:
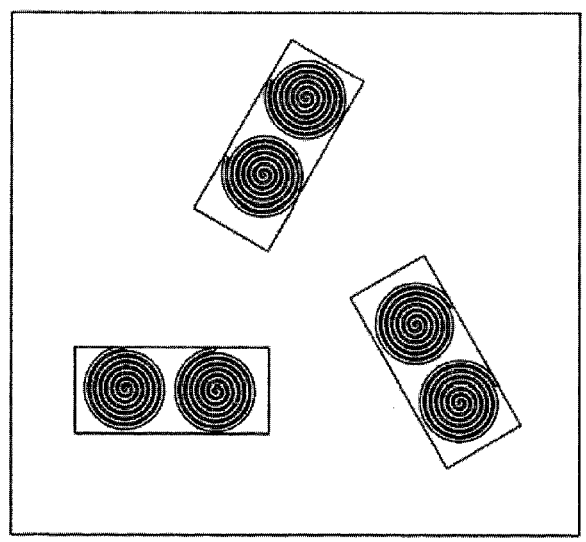
FIG. 4B shows a variant of a base platform with three openings and corresponding pairs of planar coils forming linear motion axes that are not arranged in star configuration.
Figure 4C:
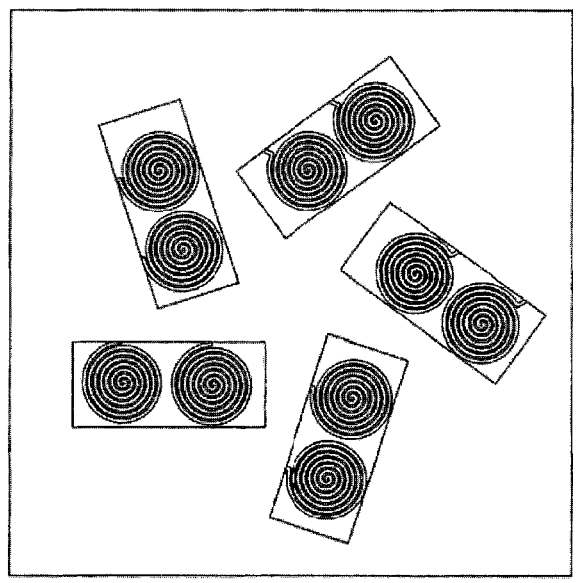
FIG. 4C shows another variant of a base platform with five (5) openings and corresponding pairs of planar coils forming five (5) linear motion axes that are arranged in pentagon configuration.
Figure 4D:
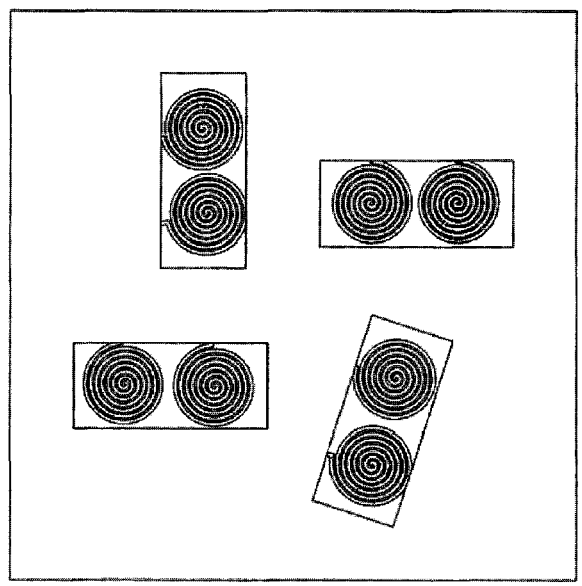
FIG. 4D shows a variant of a base platform with four (4) openings and corresponding pairs of planar coils forming four (4) linear motion axes.

According to another aspect of the present invention, the linear motion axes can be arranged in different configurations, and there is no need to have exactly three axes. FIG. 4B shows another variant of the base platform 10, with openings having pairs of planar coils that define three (3) linear motion axes, in which the three (3) motion axes are arranged in a triangular configuration. In other variant, as shown in FIG. 4C, five (5) linear motion axes are provided with five openings and five corresponding pairs of planar coils, placed in a pentagonal arrangement. Moreover, another variant in FIG. 4D shows four (4) linear motion axes are provided with four openings and four corresponding pairs of planar coils, placed in a substantially square arrangement.

Figure 5:
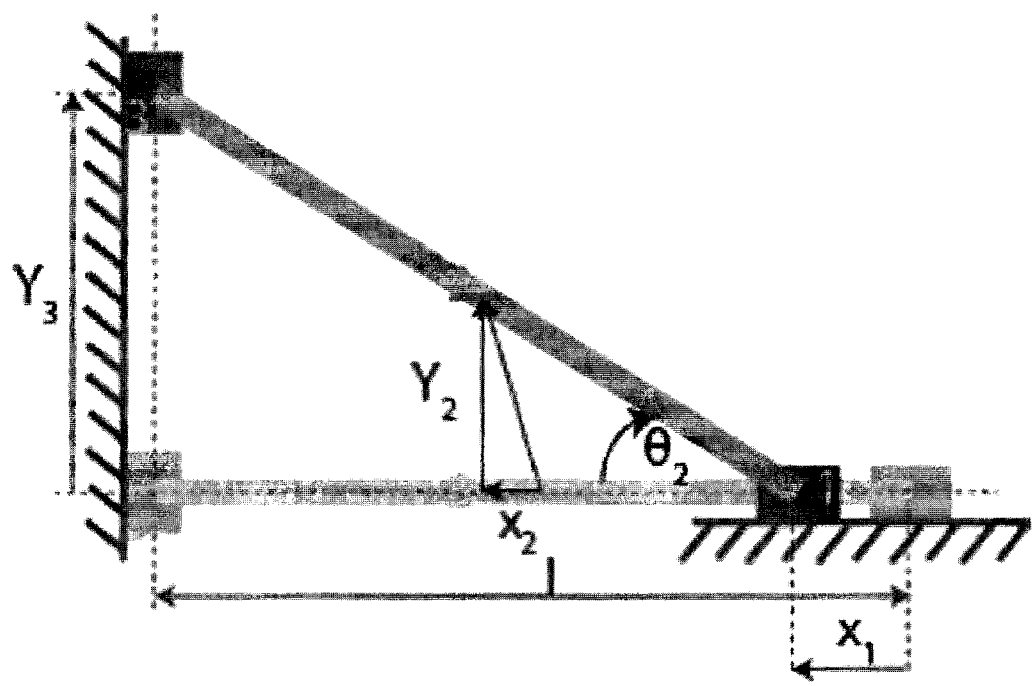
FIG. 5 shows a schematic representation of the two-position slider mechanism, the proposed device can be considered axial symmetric and composed by three (3) sliders arranged at 120° from each other and sharing the prismatic joint.

Next, according to another aspect of the present invention, the performance of the pop-up planar actuator device 100 is determined by the geometrical parameters of the mechanism which dictate the transmission ratio between the input and the output strokes, velocities, as well as by the effectiveness of different configurations. Design parameters for the overall platform based on these considerations are presented. Regarding the kinematics of the mechanism of the pop-up planar actuator device 100 as shown in FIGS. 1A-1C and 3, the resulting mechanism has been modelled of each leg as equivalent to a double slider presented in FIG. 5. In this configuration, the horizontal slider, link 1, includes the magnet and its motion is controlled by the magnetic field generated by the coils. This link has a single degree of freedom (DoF) dictated by the rail in which it moves. The mechanism transforms the in-plane motion of this link to the vertical motion of the second slider, represented by link 3 through the interaction with the link 2.

The transmission ratio between the input link, link 1, and the output link, link 3, is determined by the length of the link 2 and the position of link 1 in the rail according to the following Equations (1) and (2):

$$y_3 = \sqrt{l^2 - (l - x_1)^2} \quad (1)$$

$$\dot{y}_3 = \frac{\dot{x}_1(l - x_1)}{\sqrt{l^2 - (l - x_1)^2}} = \frac{\dot{x}_1}{\tan\theta_2} \quad (2)$$

The equation for the velocity of the links suggests a nonlinear transmission between the link 1 and link 3 velocities. In the flat state, the mechanism is at a singular point and as it starts moving upwards the ratio of the output speed to the input speed decreases according to Equation (2). This transmission ratio can be exploited further to obtain a desired force profile on the output link. Decreasing the velocity ratio, the mechanism has a higher force transmission in larger angles that is desirable since it can overcome increasing forces as it moves toward its final position.

The pop-up planar actuator device 70 is over-constrained with the three sliders 32, 42, 52. Despite the over-constraint, this design has two advantages. First, it reduces the forces transmitted to the rails, because the in-plane components of the three legs 30, 40, 50 exerted on the centerpiece 80 cancel each other out, which reduces significantly the friction forces onto the rails, and second, the output vertical force from the centerpiece 80 is increased by increasing the number of actuation points. Also, the over-constraint mechanism issues are alleviated via clearance between the leg 30, 40, 50 and the rail. The dynamic modeling of this structure helps to understand the forces acting on the mechanism of the articulated mechanism 70, and other types of articulated mechanisms.

Figure 6A:
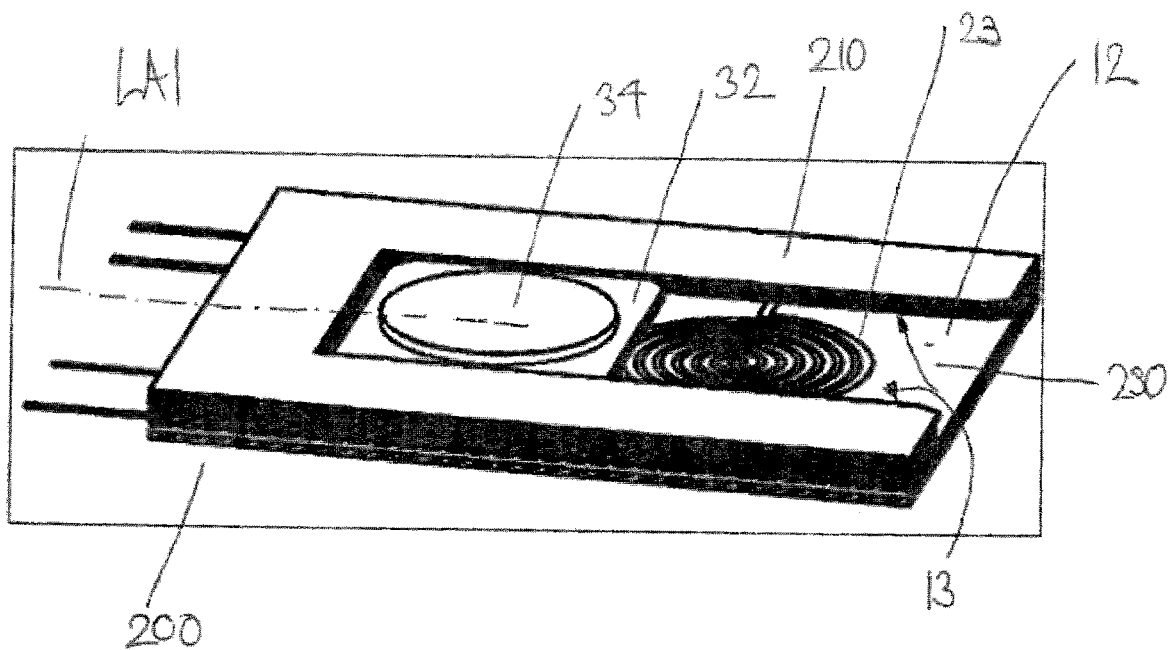
FIG. 6A shows a schematic perspective representation of the assembled miniaturized electromagnetic actuator used for the pop-up foldable actuator, with. The schematic of the assembled actuator.
Figure 6B:
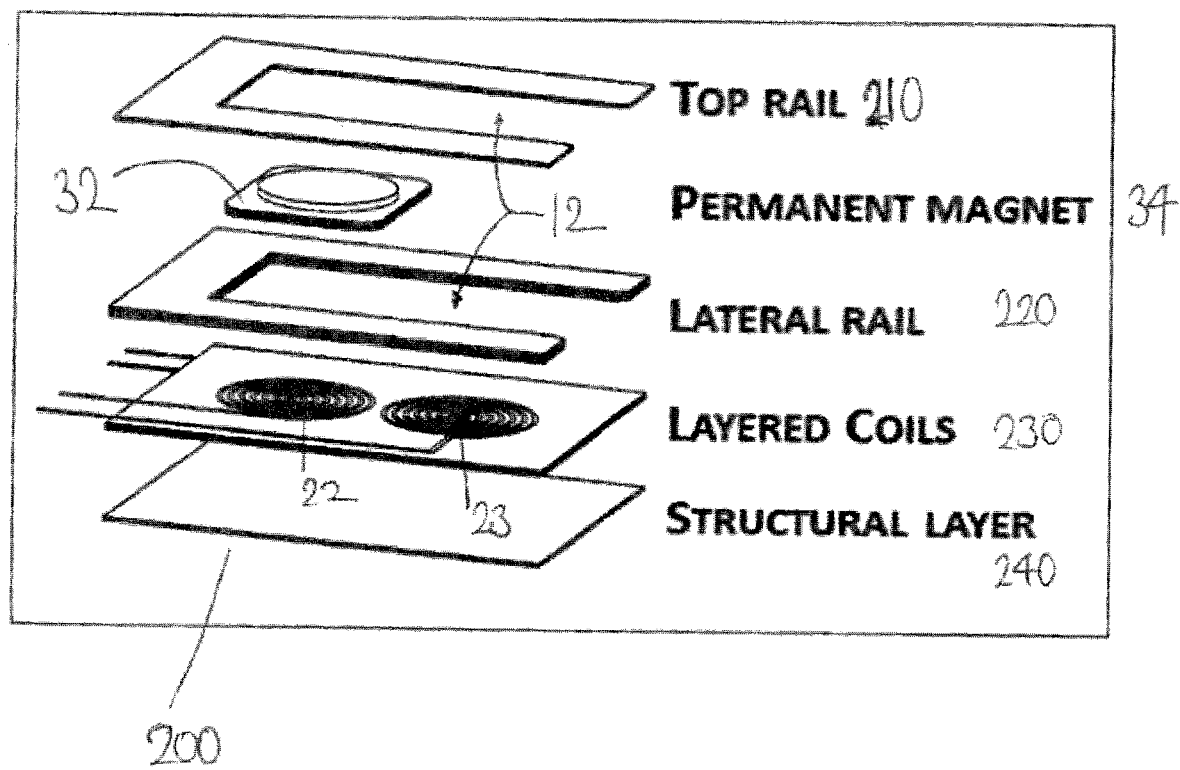
FIG. 6B shows a schematic perspective representation of the different layers of the device shown in FIG. 6A that compose the miniaturized electromagnetic actuator used for the pop-up foldable actuator.

According to still another aspect of the present invention, an individual linear actuator 200 of device 100 is described as shown in FIGS. 6A and 6B. In the variant shown a linear actuator 200 is composed of two planar coils 22, 23 that are made from layered coils structure 230, a rail structure 13 that is formed by a side wall of top rail layer 210 and a side wall of inner or lateral rail layer 220 that face opening 12, thereby forming guiding rails for corresponding side edges of slider 32, and an axially magnetized permanent magnet 34 that is mounted to the slider 32. For representation purposes, the corresponding leg 30 is not shown. The coils 22, 23 are designed in order to make the magnet 32 slide in rail structure 13 that are formed by side walls of opening 12, when coils 22, 23 are energized. This allows slider 32 to move back and forth within opening 12, along linear motion axis LA1. With the dimensions shown, one advantage of this arrangement is that the magnetic field is managed along the rail to allow maximum of 8 mm stroke of movement along the linear motion axis LA1, but the transmission will redirect the stroke in vertical direction with leg 30 and centerpiece 80 thus obtaining 13 mm actuation strokes of a 1.7 mm thick device 100. Accordingly, with the device 100, it is possible to obtain a ratio between the thickness of device 100 and the actuation stroke at about 1:10, even 1:20. The linear movement of magnet 32 is initiated by the combination of repulsive force from a first coil, either 22 or 23 and attractive force from the second coil, either 23 or 22. The magnetic fields of the two planar coils 22, 23 interact and generate the electromagnetic force on permanent magnet 32.

Although the magnetic forces applied to permanent magnet 32 drops with the power of three (3) because it is dependent by magnet volume when the magnetic system is scaled down by reducing it in thickness for the planar design of device 100, the force to weight ratio does not suffer from this reduction since the mass scales as well with the power of three (3). Furthermore, with the same current density in coils 22, 23, it is possible to reach higher actuation velocities. While decimeter scale coils use cylindrical wires, miniature planar coils, as shown in the variant of FIGS. 6A and 6B, can use micron thick flat conductors with rectangular cross section; this further increases the conductor surface/volume ratio, boosting the thermal exchanges and as consequence allowing higher current densities compared with the decimeter scale where thermal exchanges are not very efficient. As a consequence, upon a scaling of 1/k, increases the magnetic interaction of a factor k is increased. See for example, Cugat, Orphee, Jerome Delamare, and Gilbert Reyne, "Magnetic micro-actuators and systems (MAGMAS)," IEEE Transactions on magnetics 39.6 (2003): pp. 3607-3612. See also Niarchos, D, "Magnetic MEMS: key issues and some applications," Sensors and Actuators A: Physical 109.1 (2003): pp. 166-173, this reference being herewith incorporated by reference in its entirety.

It has been shown to be difficult to obtain wide motions in millimeter scale by exploiting the axial repulsion of a planar coil and an axially magnetized cylindrical magnet, a challenge shared by other researchers. This is due to the exponential drop of magnetic forces with the increase of a distance or gap between permanent magnet and coil. For this reason, the use of a linear electromagnetic actuator combined with proper transmission appears to be an ideal means of reducing the gap or distance to a minimal value.

In an exemplary variant shown in FIGS. 6A and 6B, permanent magnet 32 is a 1 mm-long cylinder having a 10 mm diameter. It is axially magnetized and has a magnetic flux remanence of 1.2 Tesla, for example from the manufacturer HKCM®. Coils 22, 23 are designed with slightly larger diameter, 12 mm, the stroke will be smaller than the diameter of the coil 22, 23 because, when the magnet is lying in the center of one of the two coils 22, 23, the repulsive or attractive forces would be normal to the direction of guiding rails 12 or normal to linear motion axis LA1 and would not result in action of the mechanism. For these reasons we chose 8 mm to be conservative and ensure magnet motion. In this way, it is avoided that slider 32 with permanent magnet 34 lies directly in axis with a coil 22, 23.

Figure 6C:
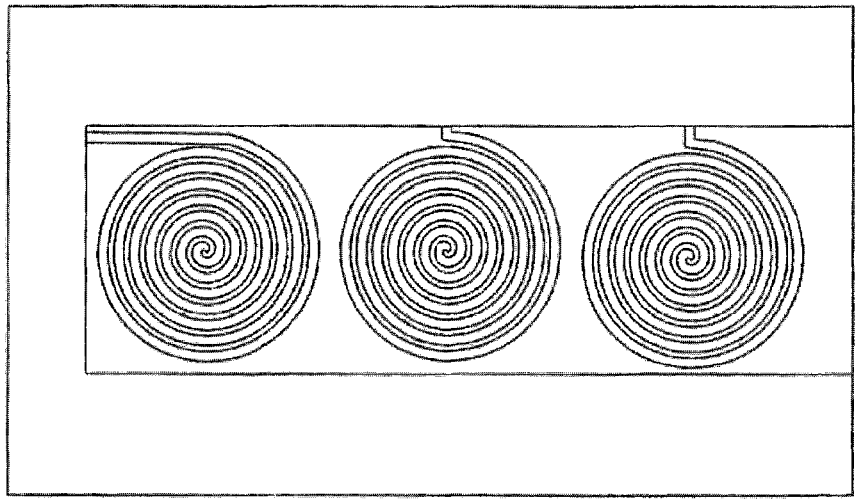
FIG. 6C shows an exemplary opening with three planar coils that can form a single linear motion axis, instead of two planar coils described in FIG. 6A.
Figure 6D:
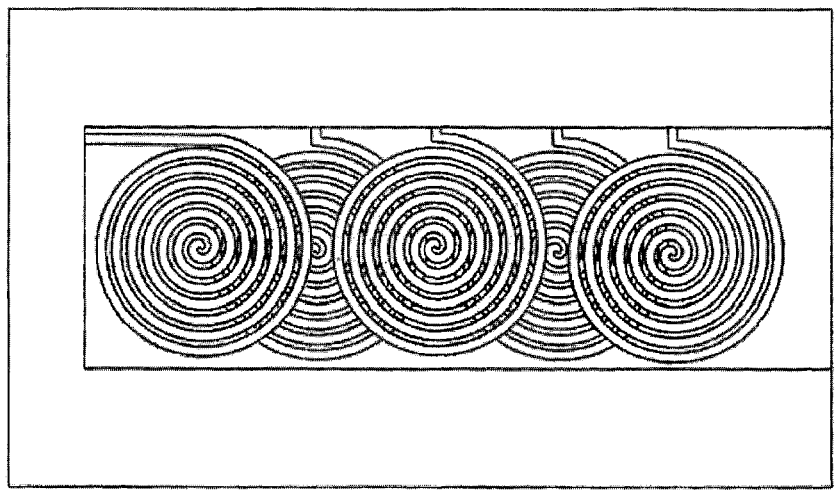
FIG. 6D shows an exemplary opening with five (5) planar coils that can form a single linear motion axis, the five (5) planar coils being overlapping with each other.

FIGS. 6C and 6D shows variants of the layered coils 230 that can be used for the linear actuator 200 of the pop-up planar actuator device 100. For example, FIG. 6C shows a layered coil with three instead of only two coils, for a single linear motion axis LA1. Moreover, FIG. 6D shows five coils, adjacent coils having an overlapping surface area. This can be done by arranging the two coils in the background in one layer, and the three coils in the foreground in another layer, so that the multilayer structure can be used to create overlapping magnetic fields with the coils for linear actuator 200. With the addition of more coils that the minimal amount for operation of two coils, the magnetic field can be generated more selectively along the linear motion axis LA1, and as a consequence, a finer positioning of the sider 32 along axis LA1 is possible.

In order to define the others system design parameters, finite elements analysis (FEA) to evaluate the forces between coils 22, 23 and magnet 34 has been executed using the AC/DC module of Comsol 5.2. The forces applied by the coils 22, 23 to magnet 34 have been considered, as first approximation, magnetostatic. For this purpose, a stationary study has been set using the following Equations, with the Ampere law for static cases defined as $$\nabla \times H - \sigma v \times B = J_e \quad (3)$$

The definition of magnetic potential is $$B = \nabla \times A \quad (4)$$

The constitutive relation for the magnet is $$B = \mu_0 \mu_r H + B_r \quad (5)$$

The constitutive relation for the coils is $$B = \mu_0 \mu_r H \quad (6)$$

And the externally generated currents for the coils are $$J_e = \frac{NI_{coil}}{a_s} e_{coil}. \quad (7)$$

The expression $J_e$ of Equation (7) is an externally generated current density, v is the velocity of the conductor, σ the electrical conductivity, H the magnetic field in Equation (3), A the magnetic potential in Equation (4), B is the flux density in Equation (6), Br the residual flux density in Equation (5), $\mu_0$ the magnetic permeability in vacuum, $\mu_r$ the relative permeability of the material, N the number of turns of the coil, $I_{coil}$ the current energizing the coil, as is the cross sectional area of the coil domain and $e_{coil}$ is the coil current flow.

A height of coil 22, 23 has been set to 0.5 mm to be embedded in a millimeter thick layered coil layer 230. The magnetic forces are calculated using Maxwell's stress tensor, and in particular, a numeric integration on the surface of the object that the force acts upon, was performed (magnet). The aspect ratio of magnet 34 and coils 22, 23 was around 0.05 making computationally heavy meshing and solving the model but, we obtained a stable solution by using a gradient in mesh nodes distribution and increasing elements number at around 106.

Magnet-coils interaction forces where tested for different positions along the linear motion axis LA1 and different elevations, and the simulations were used set to evaluate the magnetostatic forces acting on magnet 34. The interaction forces between the magnet 34 and another one of the magnets 44, 54 at different distances have also been analyzed. The interactions of two magnets laying on a common plane and having a specific distance between them was analyzed. This simulation has been used set to evaluate the minimum distance for which two coplanar magnets generate negligible interaction forces. With these results, the pop-up planar actuator device 100 has been designed.

Figure 7A:
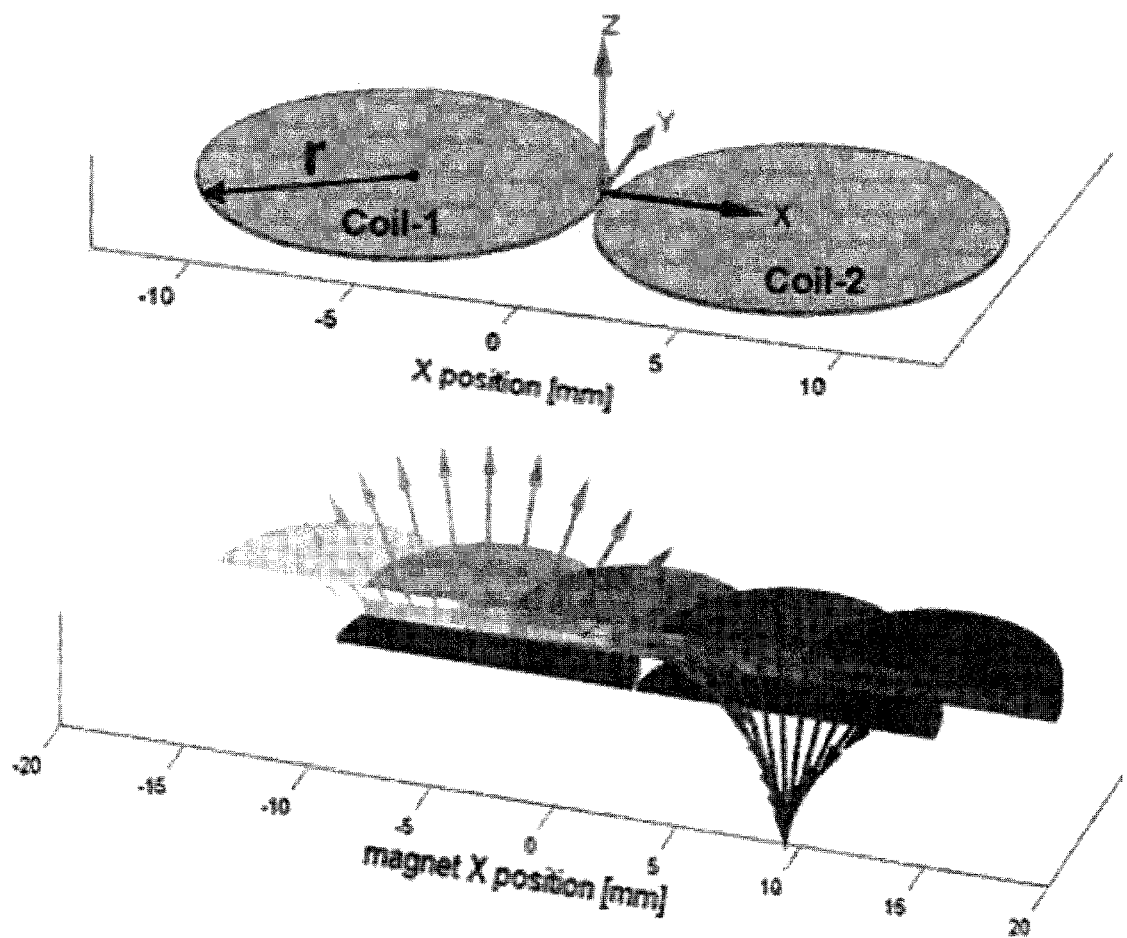
FIG. 7A shows a graph schematically representing magnet-coil interactions, showing a coordinate reference system used for defining the position of the magnet in respect to the coils in the upper section, and the resultant force acting on the magnet for increasing X positions in the lower section, FIG. 7B schematically depicts a graph with calculated finite element method (FEM) resulting forces in X and Z direction by changing magnet X position.
Figure 7B:
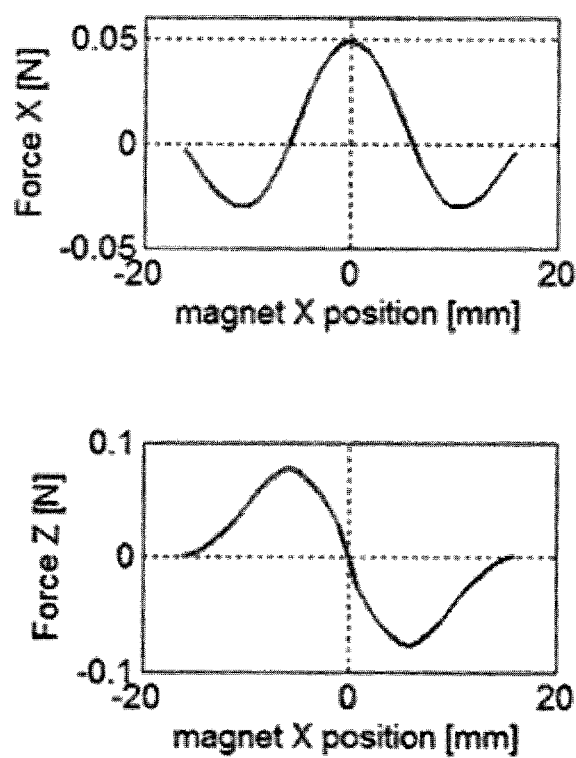
FIG. 7C depicts a 3D graph with FEM resulting forces in X direction by changing magnet X position and magnet elevation along Z in the upper section, and depicts a 3D graph FEM resulting forces in Z direction by changing magnet X position and magnet elevation along Z direction in the lower section.

Regarding the magnet-coils interactions, a parametric study has been done varying magnet position in x and y directions according to the reference system reported in FIGS. 7A and 7B. In the simulation, the current and the conductor turns have been iteratively simulated, along with the maximum number of coil turns that were possible to be manufactured with a given number of layers of layered coils 230. The constants used in the model are reported in Table I. Simulation results were used to estimate the ampere/turns needed to perform motion thus getting an indication of the number of turns and layers for the planar coils design with layered coils 230. The magnetostatic forces calculated with the simulations were used for the system motion prediction.

Figure 7C:
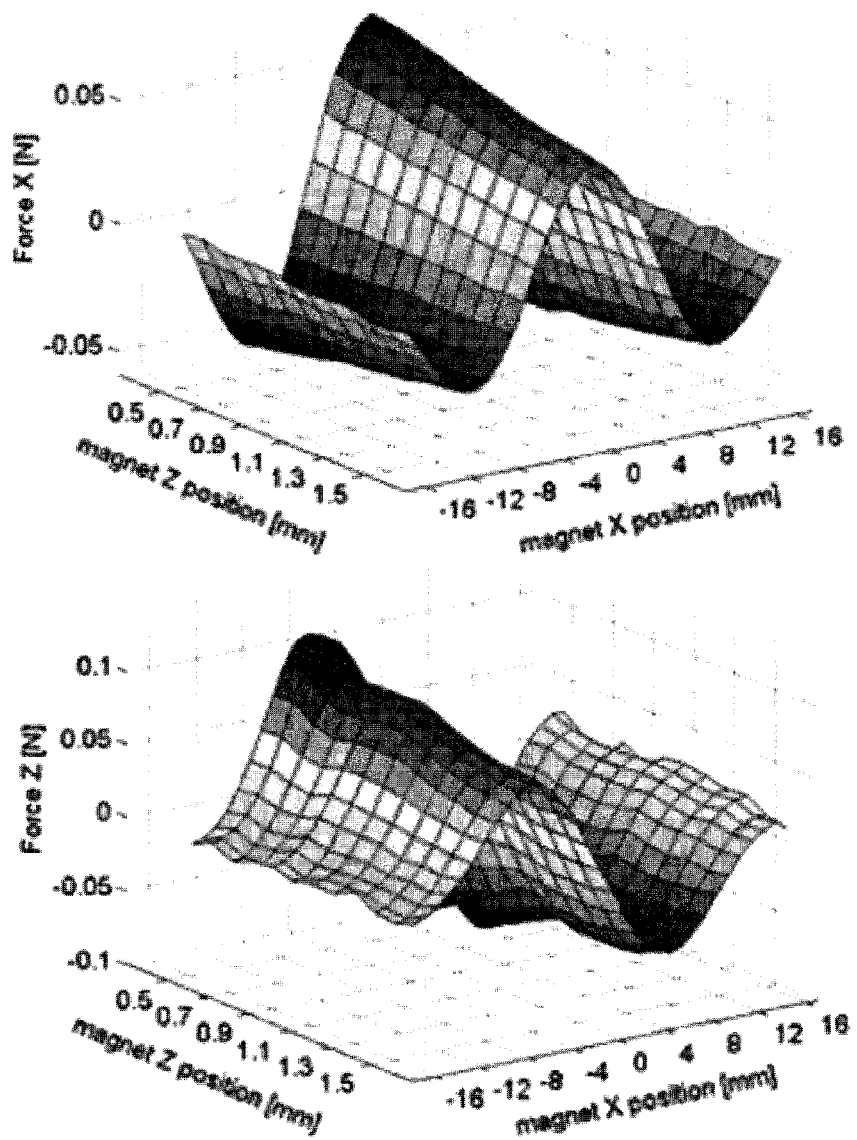
Figure 10:
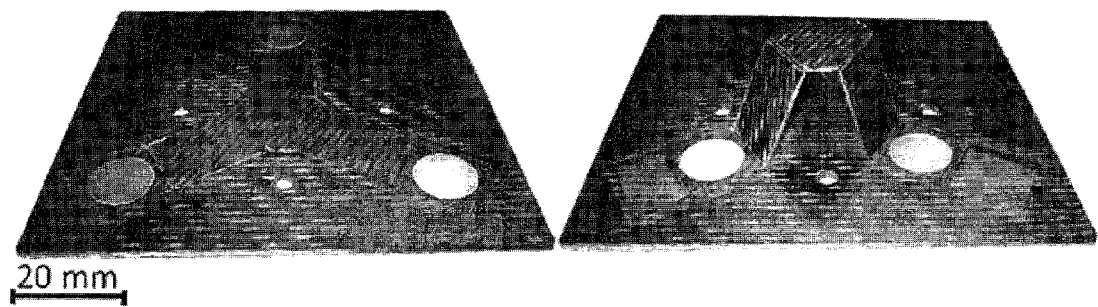
FIG. 10 shows two photographs of the pop-up foldable actuator showing alignment holes used during the fabrication process. The device is shown in a flat, collapsed state (left), and in the pop-up state (right)

The parametric study that considering magnet position along the z axis; this was useful since magnet elevation depends by the platform design; the simulations results are reported in FIG. 7C. With exemplary device 100 as shown in FIG. 10, the exemplary coils-magnet distance in the z direction is 1.4 mm. Regarding the magnet-magnet interaction, another parametric study of two coplanar magnets was performed, varying their distance. According to the simulations, at a distance of 45 mm the interaction forces between the magnets were lower than 0.1 mN, three orders of magnitude lower than the maximum force applied by the coil system, for example 50 mN, therefore they can be considered negligible. We then considered this distance limit in the design of the pop-up parallel platform in order to avoid magnetic interactions between the legs.

According to still another aspect of the present invention, a method for manufacturing the pop-up planar actuator device 100 is presented. One goal of the manufacturing method is to keep the overall dimension of the platform at the minimum while maximizing the output force and the range of motion. This requires an accurate, robust and repeatable steps for the manufacturing method to realize all the individual layers and to integrate them. Next, the fabrication of coils 22, 23, 24, 25, 26, 27 and articulated mechanism 70 and the integration of them in millimeter thick actuated pop-up planar actuator device 100.

For the planar coils, a photo-engraving technique on Pyralux™ flexible thin sheets having a thickness of 32 μm with a conductor thickness of 12 μm has been used. The winding sense of the stacked coils was inverted to sum the magnetic field produced by the single coils. To electrically connect in series overlapping coil layers in the layered coils 230, a UV laser micromachining system was used, DCH-355-4 laser head from Photonics Industries Inc., to remove the Kapton™ layer from the back of the coil, exposing the conductor and then conductive epoxy glue was applied, for example Chemtronics™ CW2460 to electrically bond six adjacent layers for the layered coils 230.

As one goal is to minimize the overall thickness of device 100 while targeting high actuation speeds, the initial criteria for maximizing the produced magnetic field is to maximize the number of turns in a coil of a single layer without stacking too many layers, thus, the conductive path width was minimized avoiding short circuits and open circuits, and to connect the single coils throughout the layers in series. The photoresist has a 15 μm resolution; therefore, coils with a path width of 50 μm and a distance between two turns of 100 μm have been investigated.

Figure 8:
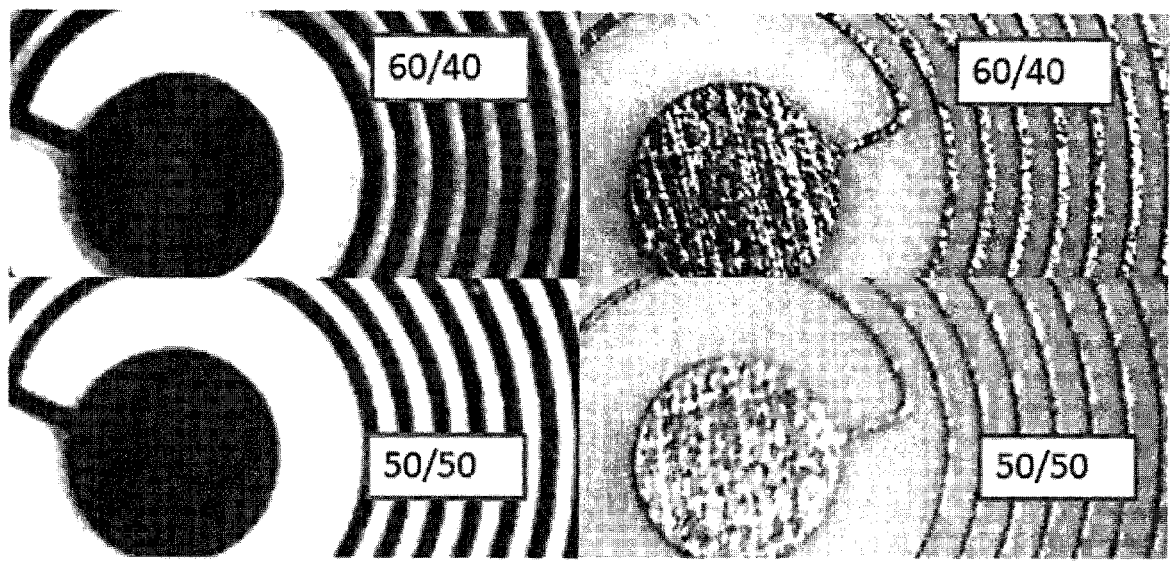
FIG. 8 shows top views from a masks and coils made from the mask, and a comparison of mask and corresponding resultant coil that can be used for the pop-up foldable actuator. In the manufactured coil an under-etching effect is visible, and conductor tracks result much thinner than the correspondent mask tracks.

As the first step, the coil shape was defined in Matlab™ from MathWorks™ as a sequence of coordinates and the shape was further elaborated with Altium™ designer for printing the mask used for the circuit impression. The parameters such as the ultra-violet (UV) exposition time, the photoresist development time and the etching time were iteratively changed in order to increase the successful rate of the coils. Further, in order to compensate for the under-etching, masks with different path thicknesses were tested and the results were compared. As example, some of the masks used and resulting coils are shown in FIG. 8. The criteria for choosing the fabrication parameters were the electrical resistance experimental values closeness to the theoretical calculated, and a low percentage of failures, considering as failed a coil with broken conductors or with resistance deviating of 20% or more from the theoretical values. The resistance of the coil was estimated according to the formula R=ρ*L/A, where ρ is copper resistivity (1.68 e-8 Ω/m), L is the length of the conductor of the planar coil, calculated as 1.122 m for the used coils of 12 mm in diameter and having 55 turns, and A is the section of the conductor corresponding to a width between 50 μm and 80

µm. It has been shown that a mask having 70 µm for the conductive path and 30 µm for the insulating path gave the most robust results, with 20.9±3.2Ω where the theoretical value was 22.5Ω, and has been used for the steps of manufacturing the coils.

The dimensions of the mechanism were designed to have negligible interaction from the magnetic field of each two legs. The design was based on simulations that use the predetermined design parameters: the magnet size (10 mm in diameter), the magnet in rail motion range (8-10 mm) and the diameter of the coils (12 mm). The minimum distance d, which is the minimal distance of the magnets 34, 44, 54 at the pop-up state, of 45 mm was required. This initial design, used to study the behavior of the system, follows the criteria of low weight and avoidance of magnet-magnet interactions.

Figure 9:
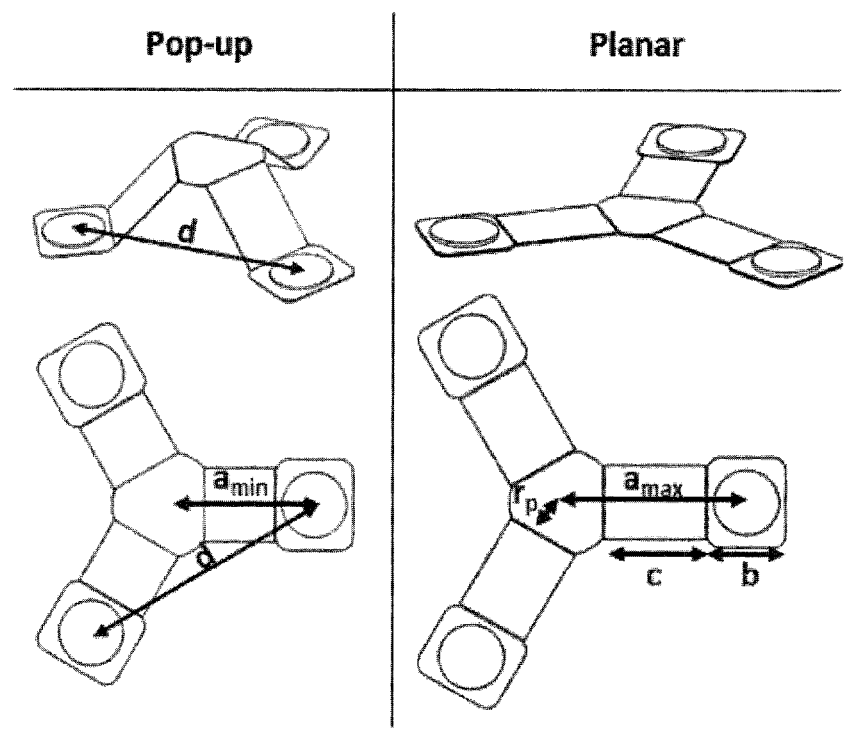
FIG. 9 depicts a schematic perspective representation of an exemplary pop-up foldable actuator in pop-up (left) and extended (right) configurations and exemplary design parameters used. The values of the parameters used are shown in Table II.

As schematically shown in FIG. 9, the distance between the center of the platform and center of the magnet during motion, $a_{min}$, resulted around 20 mm, being d=45 mm based on simulation results, because the actuation range was 8 mm, the length $a_{max}$ in mechanism extended configuration was 28 mm. The minimum length b, of the structure embedding the magnet was 12 mm, considering 1 mm of material around the magnets 34, 44, 54; the same size for, $r_p$, central structure size (6 mm) was maintained. Consequently, a value of $c=a_{max}-r_p-b/2$, 16 mm to the length c of the articulated link was assigned. The vertical range of motion of the platform was expected to be 12 mm.

Experimental results have been performed with the pop-up planar actuator device 100. An exemplary device 100 was made by integrating layers of different materials with specific functionalities for obtaining a multifunctional composite. The exemplary device 100 was composed of the following functional layers, with reference to FIG. 3: Bottom layer 140 that provides anchoring plane for the platform and protects sensitive layered coils 130, layered coils 130 that provide magnetic fields for the actuation. Two patterned glass fiber layers with a Kapton™ layer embedded between them provide for the articulated mechanism 70. Four glass fiber layers that cover the coil system and form the rails for the sliders of the mechanism, by forming top rail layer 110 and inner rail layer 120.

Figure 11:
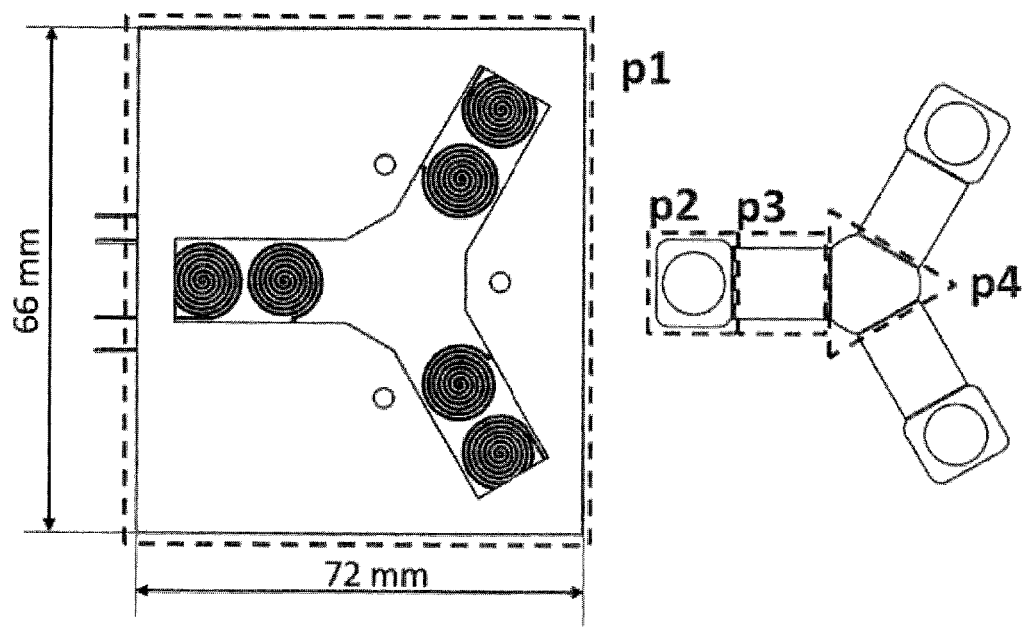
FIG. 11 shows a schematic top view of an exemplary pop-up foldable actuator according to an aspect of the present invention with some exemplary dimensions, the weights of the components shown in Table III.

FIG. 3 shows the schematic of the layers, FIG. 10 shows a picture of an exemplary device 100, and FIG. 11 reports platform size and weight. Table III reassumes platform elements mass. The patterns were machined in different layers including the structural 0.2 mm glass fiber layers, the 32 µm coil layers and the 25 µm Kapton™ layers. These layers were aligned and stacked using the reference holes and a jig. Moreover, the layers were connected with thermo-adhesive inter-layers using a heat-press. The resulting device 100 shown in FIG. 10, has a thickness of 1.7 mm, in the collapsed state.

To identify the predominant physical effects influencing mechanism motion, the coil system, the actuator, and the pop-up parallel platform were analyzed and modelled. We estimated and experimentally verified the coils time response, the temperature change and the friction between the slider and the rail. The pop-up planar actuator device 100 is powered through multiple planar coil stacks, for example the layered coils 130. In the following paragraphs, an estimation of the coil system time response has been made, and the experimental results are provided. For verifying the time constant of the stacked coil system of layered coils 130, coil inductance was calculated and experimentally verified the corresponding value.

As the first approximation, the coil has been assumed as a series of loops with the same diameter, and the theoretical formula used for estimating the inductance $L_{circle}$ is:

$$L_{circle} \approx N^2 R \mu_0 \mu_r \left[ \ln \frac{8R}{a_1} - 2 \right] \qquad (8)$$

In Equation (8), N is the number of turns, R is the radius of the circle, $a_1$ is the wire radius, $\mu_0$ and $\mu_r$ are the magnetic permeability in vacuum ($\mu_0$=1.2567 H/m) and the relative permeability of the medium, in this case, the air ($\mu_r$=1.00000037). An inductance of 1.4161 mH resulted from six coils that are connected in series having 300 turns, 50 µm of conductor width and an average radius of 6 mm. A resistance of 21Ω, for each layer was considered. The resulting time constant, τ, was 11.2 µs. Because the calculation was based on actuation times at around 0.1 s electromagnetic transient effects were neglected due to magnetic field generation. Transient thermal response is another aspect that can change the magnetic field by affecting the electrical resistance of the coils. For describing this effect, we used the linear correlation between the temperature increase and the resistance increase:

$$R = R_0[1 + \alpha(T - T_0)] \qquad (9)$$

Where the electrical resistance, R, at the temperature, T, depends on the resistance $R_0$, at the temperature $T_0$, and on the temperature coefficient α. Further, considering the power consumption after the magnetic field reaches the steady state, the power P, converted to electrical energy due to the current I, flowing in the resistance, results in:

$$P = \frac{V^2}{R} \qquad (10)$$

While the temperature increase dT, due to the heat dQ, supplied to the conductor is:

$$dQ = Pdt = (m_c c_c + m_k c_k) dT \qquad (11)$$

where $m_c$ and $m_k$ are the mass of the conductor and the mass of the Kapton™ in contact with the conductor, $c_c$ is the specific heat of the copper and $c_k$ is the specific heat of the Kapton™ By multiplying Equation (10) for the activation time t and integrating Equation (11), the following equation is obtained:

$$(m_c c_c + m_k c_k)[T^2 \frac{\alpha}{2} + T(1 - \alpha T_0) - T_0 + \alpha \frac{T_0^2}{2}] = \frac{V^2}{R_0} t \qquad (12)$$

Solving Equation (13), the temperature T of the coil after a time t was calculated, the values used for the constants are reported in Table IV.

Thermal exchanges have not been considered because the heating rate of the coil was expected to be fast and the materials the coil is in contact with do not have high thermal conductivity, i.e. Kapton™ and glass fiber. Although the proposed model is expected to overestimate the temperature increase of the coil, the trend of current decrease due to the temperature rise is expected to be similar to the experimental case.

Next, the rail and slider model is presented in the form of actuator 200. Actuator 200 is tested in simulations, in particular the interaction of magnet, the couple of coils that are energized in opposite sense, and the rail constraining magnet motion. The model was used to identify the parameters affecting the rail and slider interaction. These parameters were evaluated using the experiment on one actuator and they were then used to predict the motion of pop-up planar actuator device 100.

The main forces acting on the magnet are the magnetic forces applied by the coils to the magnet considered dependent by their relative position and by the current flowing in the coils; the interaction of the magnet with the rail, modeled with static and dynamic dry friction where the force generating friction is the magnetic component perpendicular to the direction of motion and also the weight of the magnet; the constant force C opposite to the direction of motion exerted by the bottom part of the rail on which the magnet slides.

The following equations describe actuator behavior:

$$F_{mX} - F_{fr} - C = m\ddot{x} \tag{13}$$

$$F_{fr} = \text{sign}(\dot{x})(F_{mZ} + mg)\mu_n \tag{14}$$

$$F_{mX} = f(x,V)Q, \quad F_{mZ} = f(x,V)Q \tag{15, 16}$$

In these Equations, $F_{mX}$ and $F_{mZ}$ are the magnetostatic forces in the direction of motion and in the direction perpendicular to coil plane. $F_{mX}$ and $F_{mZ}$ are function of the magnet position x, the powering voltage V and the coil quality factor Q, ranging from 0 to 1, for taking into account the coil turn loss by leakages of the conductive glue during the multilayer bonding. The values of the magnetic forces were obtained by lookup tables over the FEM pre-calculated results. The constant m is the mass of the magnet moving into the rail, g the gravitational acceleration, $F_{fr}$ is the friction force and $\mu_n$ is the friction coefficient. To determine the unknown parameters $\mu_n$ and C in Equations (13) and (14) that model the interaction of the slider 32 and the rail 13, grid search was done to find the values that resulted in the best fit of the simulation results. Equations (13) and (14) are solved numerically in a Simulink™ model and the experimental results are presented below. These parameters were used for estimating the behavior of the whole mechanism.

Up to this point the model for the actuation system and the interaction between the slider and the rail were presented. To model the behavior of the platform and predict its output force and displacement we integrated the models for the actuation system and the slider in an overall dynamical model for the platform. The proposed model for the pop-up platform was tested and verified through experimental comparison, as reported in the next section. Due to the symmetry of the structure, the kinematics of the pop-up platform is similar to that of a double slider mechanism that has been expanded to a triple slider and the force that the platform can generate on the middle part is the sum of the vertical force that three of such triple slider mechanisms can generate. The kinematics of the mechanism is dictated by the angle $\theta_2$. These equations can be rearranged to present all the variables as the input motion of the link 1 but the following representation is more convenient in the dynamic analysis of the mechanism.

$$x_1 = l(1 - \cos\theta_2), \quad \dot{x}_1 = l\dot{\theta}_2\sin\theta_2, \quad \ddot{x}_1 = l(\ddot{\theta}_2\sin\theta_2 + \dot{\theta}_2^2\cos\theta_2) \tag{17}$$

$$z_3 = l\sin\theta, \quad \dot{z}_3 = l\dot{\theta}_2\cos\theta_2, \quad \ddot{z}_3 = l(\ddot{\theta}_2\cos\theta_2 - \dot{\theta}_2^2\sin\theta_2) \tag{18}$$

$$x_2 = x_1/2, \quad \dot{x}_2 = \dot{x}_1/2, \quad \ddot{x}_2 = \ddot{x}_1/2 \tag{19}$$

$$x_2 = z_3/2, \quad \dot{z}_2 = \dot{z}_3/2, \quad \ddot{z}_2 = \ddot{z}_3/2 \tag{20}$$

Figure 12:
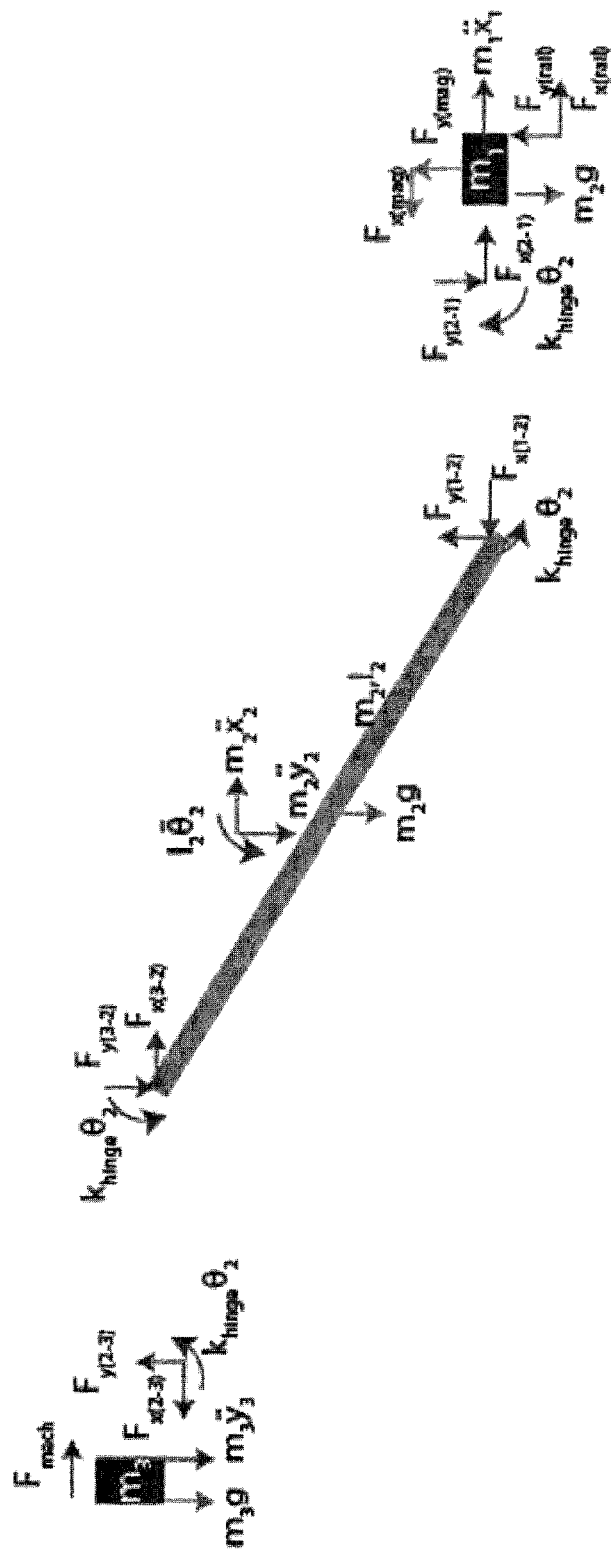
FIG. 12 is a schematic representation of a free body diagrams of the three links composing the triple slider mechanism of a pop-up foldable actuator.

The free body diagrams of the three (3) links are presented in FIG. 12. The followings are the governing dynamic equations for the mechanism.

$$F_{y(3-2)} = m_3(g + \ddot{y}_3) + F_{Load\,cell} \tag{21}$$

$$F_{y(1-2)} = F_{y(3-2)} + m_2(g + \ddot{y}_2) \tag{22}$$

$$F_{x(1-2)} = F_{y(1-2)}\cot\theta_2 + 1/2\,m_2\cot\theta_2\ddot{y}_2 + 1/2\,m_2\ddot{x}_2\frac{l_2\ddot{\theta}_2}{l_2\sin\theta_2} + 2k_{hinge}\theta_2 \tag{23}$$

$$F_{y(rail)} = F_{y(1-2)} + m_2 g - F_{mz} \tag{24}$$

$$m_1\ddot{x}_1 = F_{mx} - F_{fr} - F_{x(1-2)} \tag{25}$$

$$F_{fr} = \text{sign}(\dot{x})(F_{y(rail)})\mu_n - C \tag{26}$$

In the manufactured exemplary device 100 the hinges were characterized by a b of 10 mm, L of 1 mm and h of 25 µm; the elastic module E of the Kapton™ layer used was 2 GPa. Hinges were experimentally evaluated to have a rotational stiffness $k_{hinge}$ through repeated tests using small weights in different angular positions. It resulted 0.84±3 10-6 Nm/rad. Equations (17-26) dictate the behavior of the mechanism. The estimation based on them was used to study the experimental results and to determine trends in the results for various loading and actuation scenarios.

In the following paragraphs, experiments are discussed to verify the negligible effects such as transient thermal and electromagnetic effects and to characterize the unknown parameters in the model ($\mu_n$, C, and Q). As the first set of experiments, the magnetic field flux density B was measured, the variation produced by the coils upon activation, as shown in FIG. 14A. W used this test to verify coil system time constant and the increase of resistance due to the temperature increase. As the second set of experiments, we measured the motion of a single magnet propelled by the coils, as shown in FIG. 13C. This test set was used to evaluate the parameters affecting the rail and slider interaction such as the friction coefficient µn, the external force C and the coil quality factor Q.

Figure 13A:
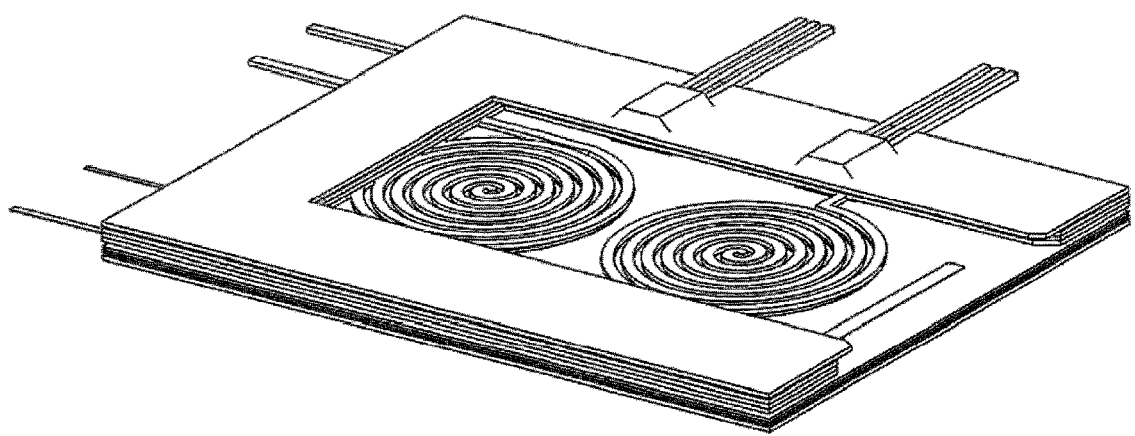
FIGS. 13A-13B show perspective views of the actuator coils and a symbolic representation of one or two hall effect sensors to measure time constants of the coils.
Figure 13B:
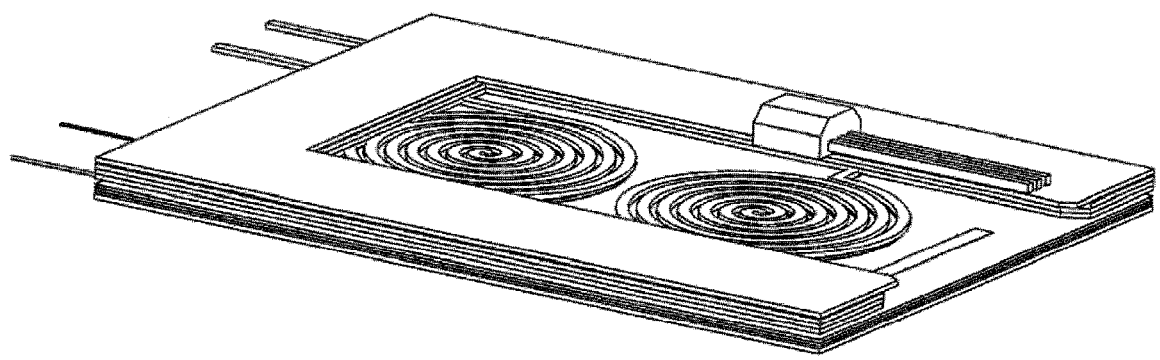
Figure 13C:
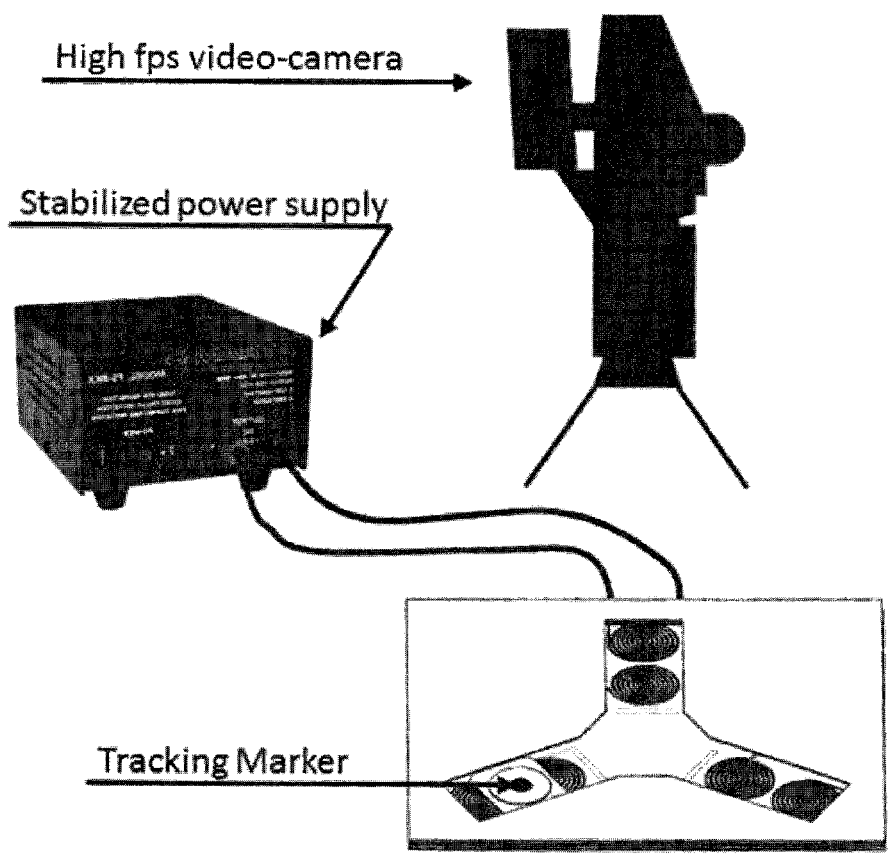
FIG. 13C shows a system for the verification of single rail dynamics including a high speed camera, a pop-up foldable actuator device equipped with a tracking marker, and a power supply.

To verify the value of the time constant τ, a Hall Effect sensor, for example the SS490, Honeywell, on the coil system and we recorded the variation of magnetic field flux density B in time, during energization with input voltages of 20 V and 30 V, schematically represented in FIGS. 13A and 13B. The sensor was placed over the coil approximatively at the center of the external one at a vertical distance of 1-2 mm. Because this test has been used to verify the time response of the system, the placement of the coil does not have critical importance as long as the produced field is in the sensitivity range of the sensor.

Figure 14:
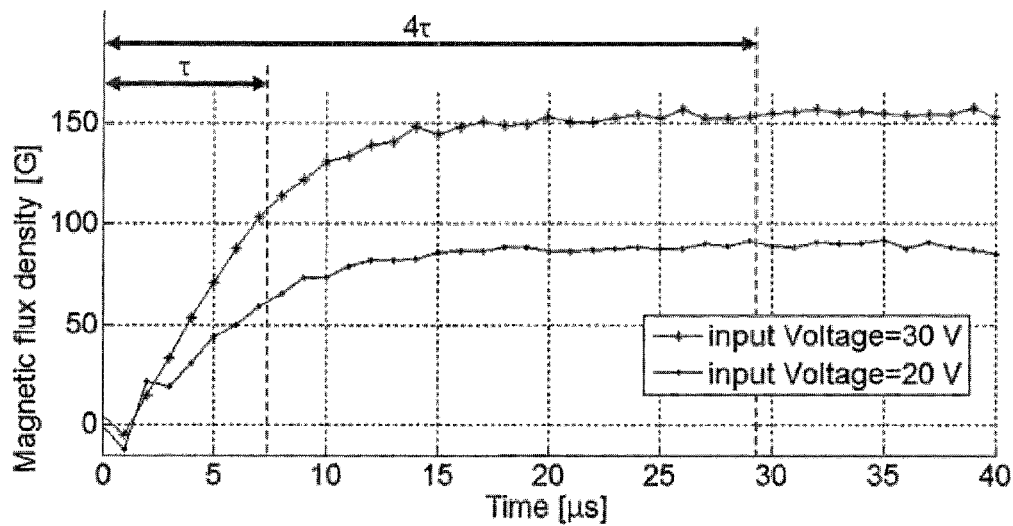
FIG. 14 shows a graph with the magnetic field development as a function of time for actuation voltage of 20 V and 30 V confirming a negligible electromagnetic transient response.

FIG. 14 shows that the experimentally evaluated time constant t resulted around 7 µs, smaller than the theoretical one of 11.2 µs, this is due to the loss of some turns in the stacking process caused by the flow of the excess of the conductive glue which reduced the ratio of the inductance to resistance. As further shown in FIG. 14, the B field was also measured over time, to verify the increment in the electrical resistance due to the increase in temperature, by maintaining the powering voltage for 0.2 s in order to appreciate the thermal effect thus identifying, for different voltages, its influence on the produced magnetic field flux density. In order to compare the model result with the experiments, because B is proportional to the current flowing in the coil I, the theoretical normalized current decrease in time was calculated.

Figure 15A:
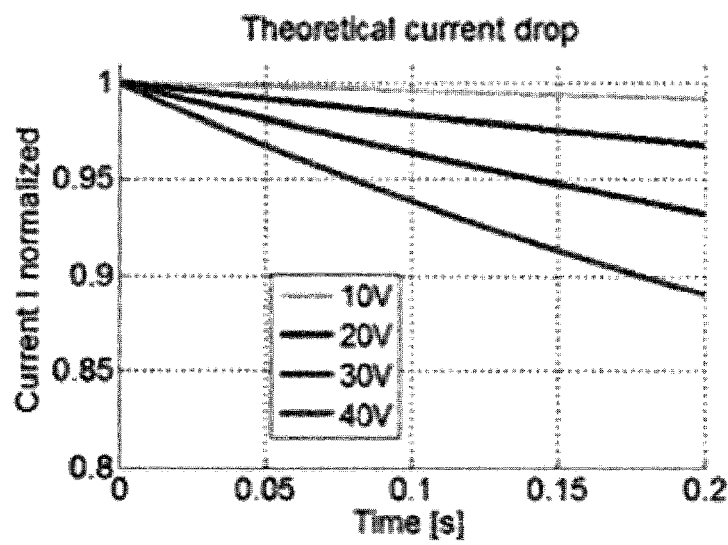
FIG. 15A shows a graph representing normalized magnetic flux density decrease due to thermal increase in simulation.
Figure 15B:
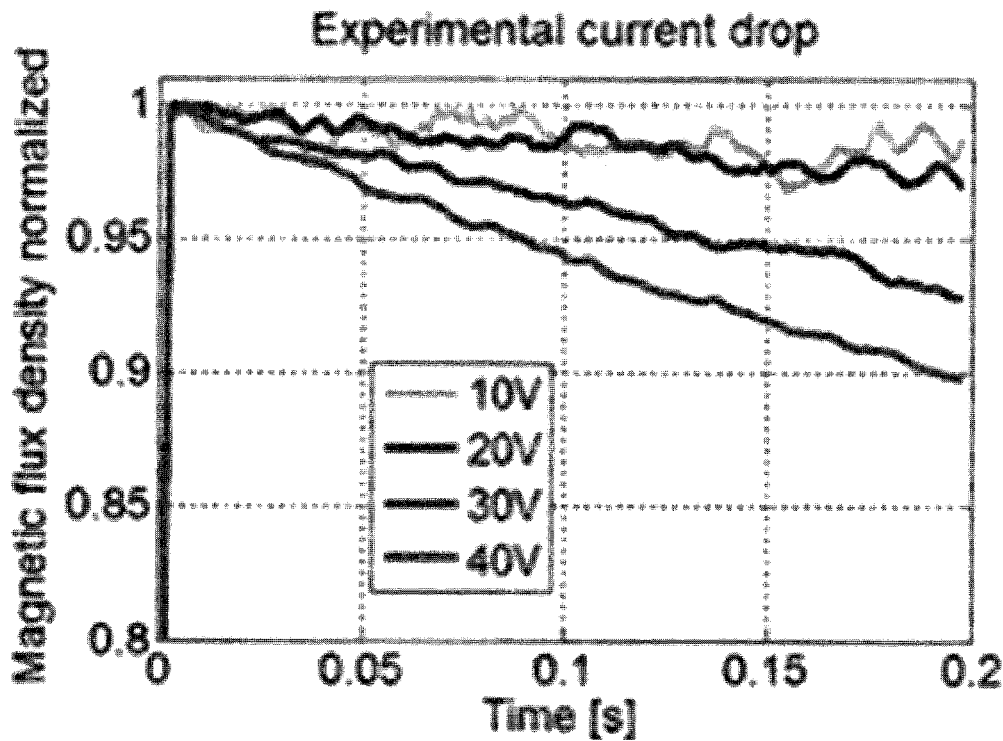
FIG. 15B shows a graph with experimental results thereof.
Figure 15C:
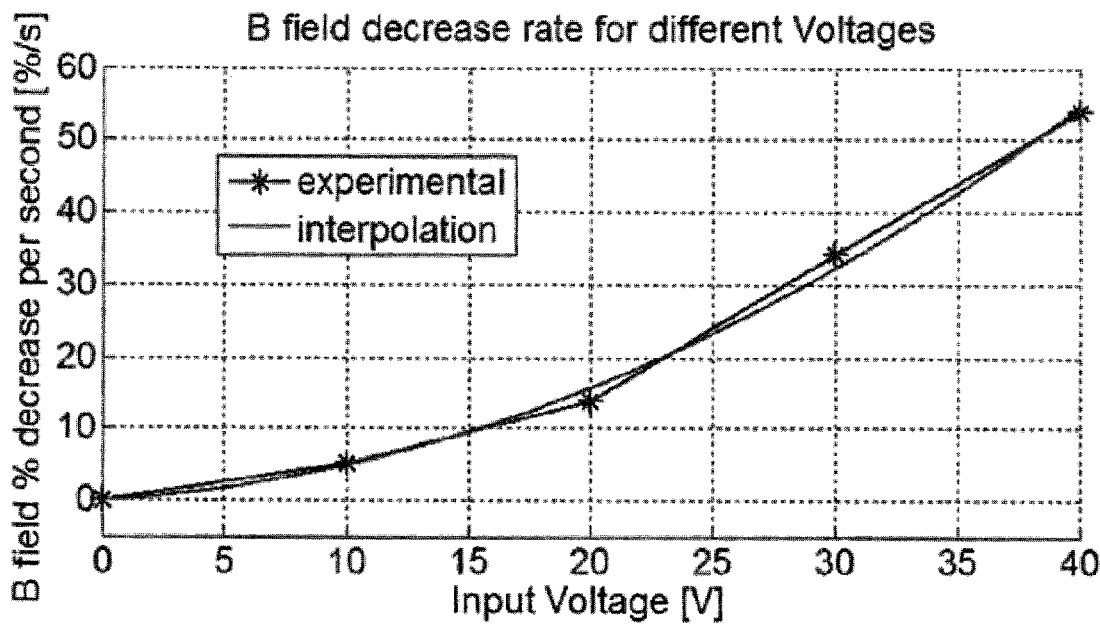
FIG. 15C shows a graph representing a B field expected decrease per second for different input voltages for the actuator.

These factors contribute in slightly decreasing the heating rate of the coil as FIG. 15A shows, but the linear trend in the investigated time span confirmed the magnetic field decreases due to the increase of temperature. The experimental results are shown in FIG. 15B, this effect can be considered negligible in the timespan of the actuation of less than 0.1 s as discussed below. The experimental results show that the transient electromagnetic behavior was too fast and the transient thermal behavior was too slow compared to the actuation time span. So both effects are negligible and were not be included in the model of device 100.

Next, actuator tests and determination of dynamic parameters are presented, according to still another aspect of the present invention. Friction coefficient sin, the external force C, and the coil quality factor Q, are three parameters in the model that are highly dependent on the fabrication precision and quality; therefore it is preferable that their values are verified experimentally. Here the characterization of these parameters are presented, by studying the motion of a single slider as an actuator 200 as it is propelled by the coils 23 and moves along linear motion axis LA1.

Figure 16A:
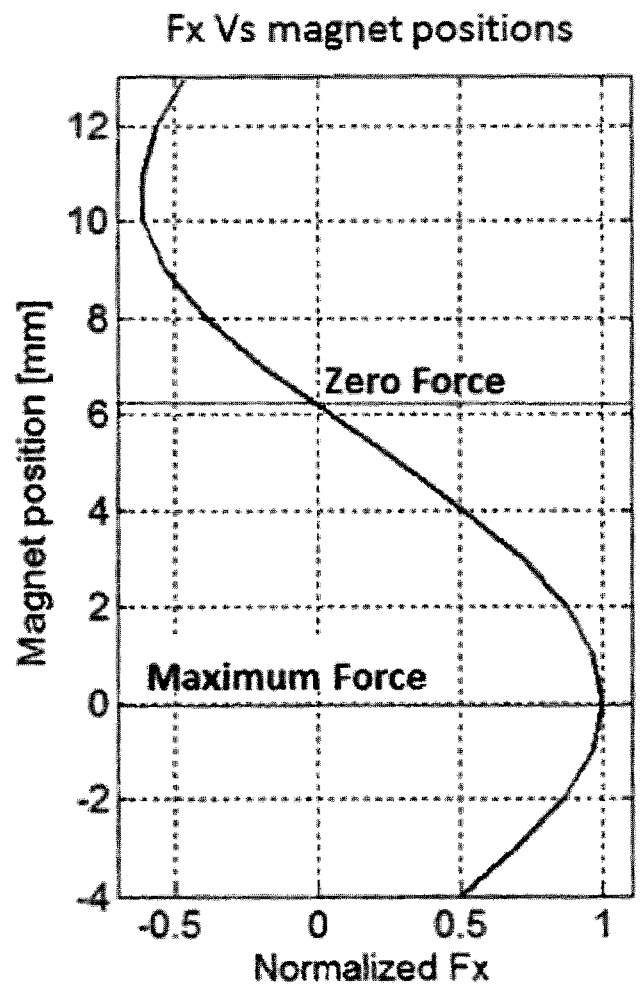
FIG. 16A-16C show graphs depicting a position of the slider in the rail, with FIG. 16A showing the Fx for different positions along the rail, FIG. 16B showing different voltages as a function of magnet position in time.
Figure 16B:
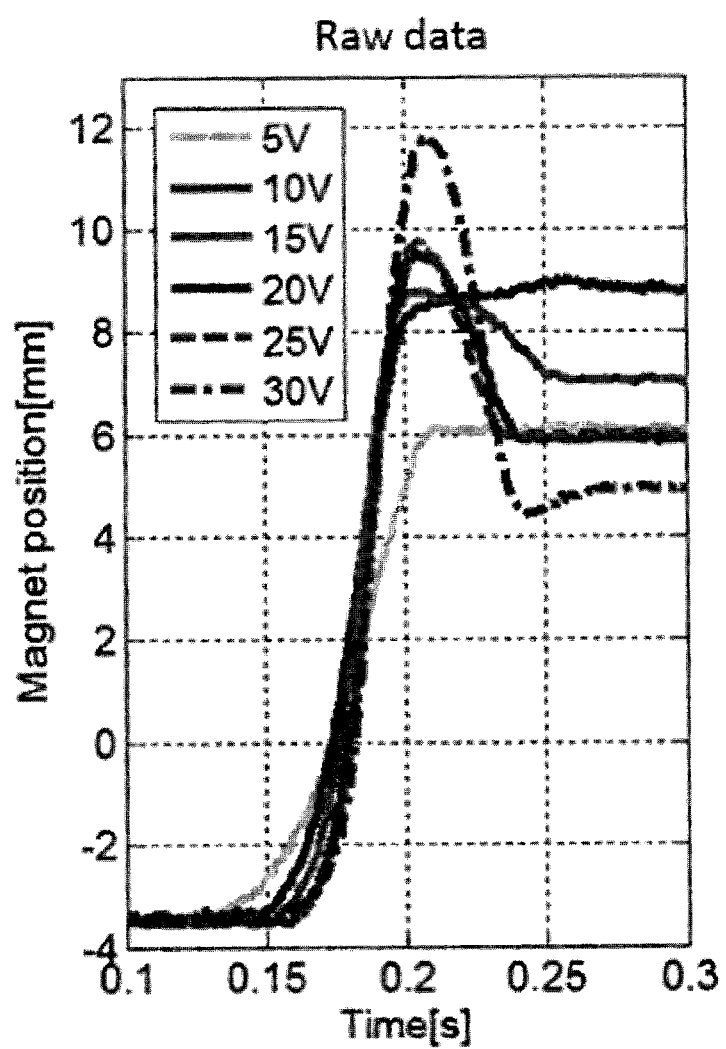

The slider motion of actuator 200 is constrained by the rail structures 13, 15, 17 of openings 12, 14, 16. The input voltages from 5 V to 30 V with 5 V increments was applied to the coil system while recording the motion of the slider 32 with a high speed camera (FS700RH, Sony™) at 960 fps. The test was repeated for three (3) times for each of the three actuators 200 of device 100. FIG. 16B show the raw data for single repetition at different voltages. At 5 V the magnet was repulsed by the first coil and attracted by the second, in agreement with the Fx shown in FIG. 16A.

Figure 16C:
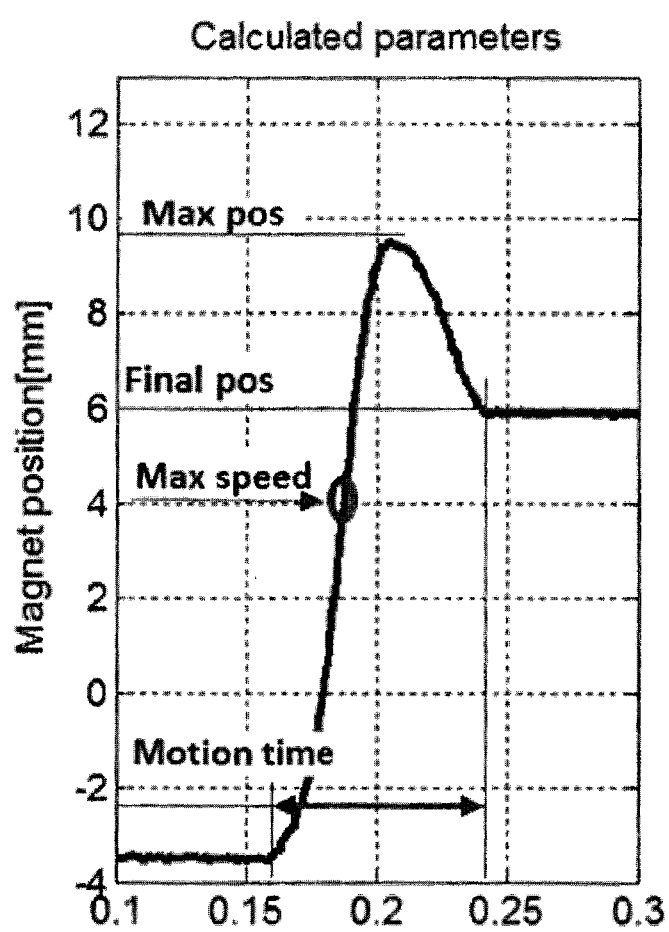
Figures 17A, 17B, 17C, 17D:
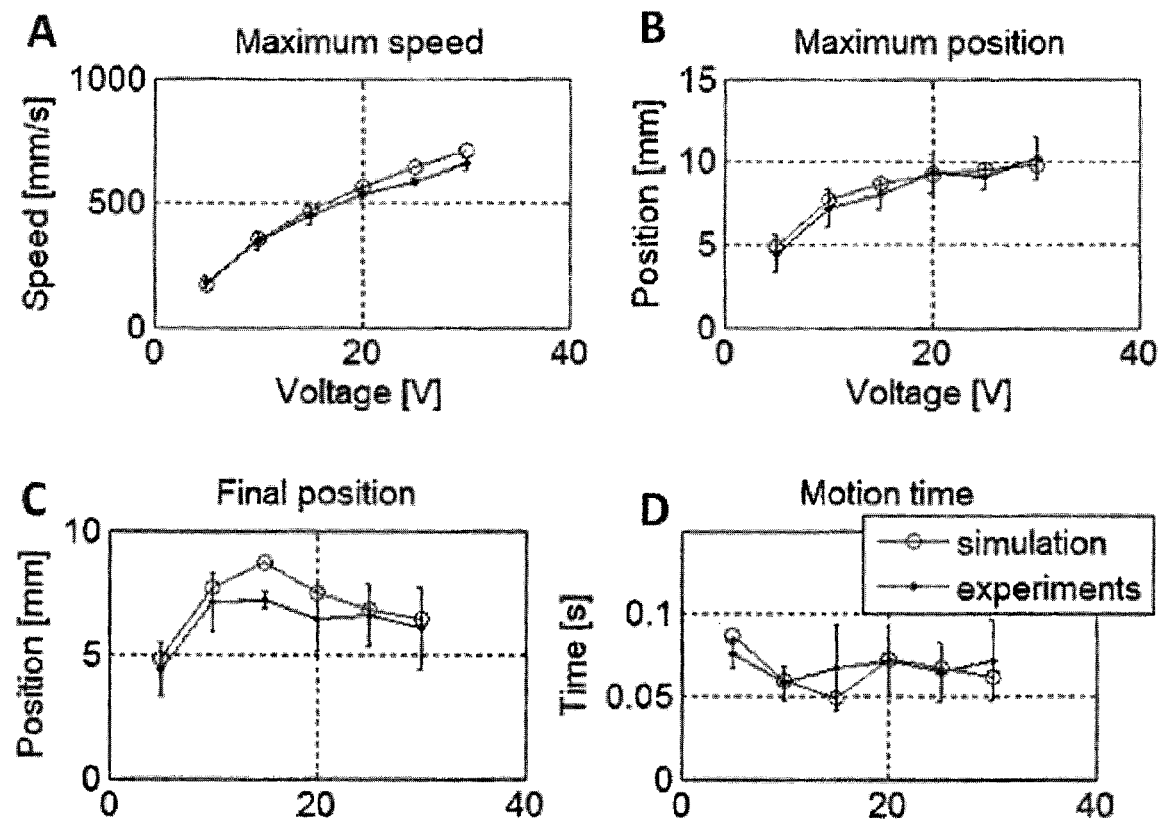
FIGS. 17A-17D show graphs that represent the comparison of the magnet motion calculated parameters, with FIG. 17A showing maximum speed, FIG. 17B showing the maximum position, FIG. 17C showing the final position, and FIG. 17D showing motion time. The simulation results are provided with the lines having the circles, and experimental results the lines with the dots, the error bars are calculated on the standard deviation of three repetitions.

Because at this voltage the momentum that is built up was rather small, the magnet stopped before reaching the position with zero horizontal force. At 10 V, magnet 32 built up enough momentum to surpass the zero force position but when it comes to a halt, the magnetic force was not large enough to pull it back to the zero force position. At higher voltages the magnet not only surpassed the zero force point but also went further, in the zone where the attraction force moved it back. Finally, at 30 V it changed direction twice before stopping. The same motion was simulated by using the model and the parameters were iteratively adjusted to replicate the behavior. These parameters are reported in Table V. For an easier comparison between the simulation and experiment results, some features of the curve, stroke versus time, were evaluated in both simulations and experiments and were used for the comparison. In FIG. 16C, the characteristics maximum position, final position, maximum speed and motion time are highlighted. Experimental results that combine the different rails outcome were compared with the model results where the average of the $\mu_{rs}$, $\mu_{rs}$ and C parameters is used. The results of the comparison are reported in FIG. 17.

Figure 18A:
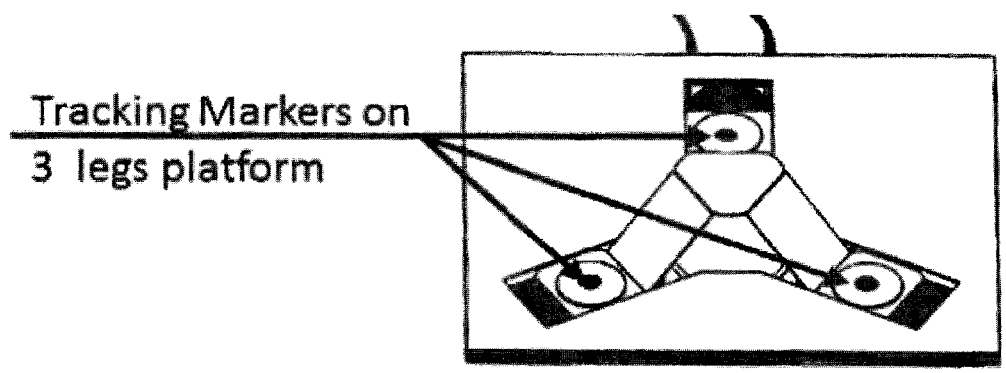
FIG. 18A-18B show schematic perspective views of the pop-up foldable actuator device that has been used for experimental purposes and tests, showing in FIG. 18A a marker for each leg of the actuator device, and in FIG. 18B a mass placed on the top platform of the actuator device for payload tests.
Figure 18B:
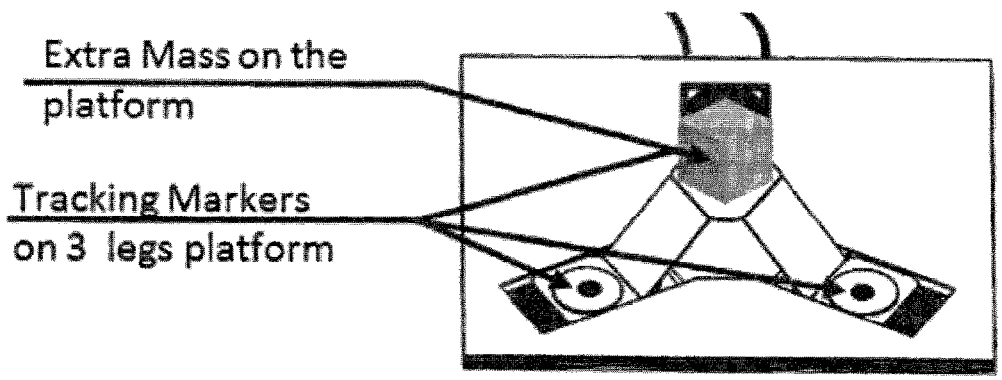

Next, the pop-up mechanism performance of device 100 and model verification were performed. This has been done to demonstrate the effectiveness of the actuation method, the design and the manufacturing of device 100. By comparing the model prediction of the behavior of the mechanism with the test results we also confirmed the system model. In the first set of experiments, the motion was measured. As shown in FIG. 18A, an exemplary device 100 was used with tracking markers on top of each magnet 32, 42, 52 of actuators 200. This device 100 was used to verify the dynamic model of the mechanism. In the second set, we loaded the platform 80 with varying masses, as shown in FIG. 18B. This test set was used to validate the dynamic model of the mechanism and the workspace reduction upon changes of the payload.

Figures 19A, 19B, 19C:
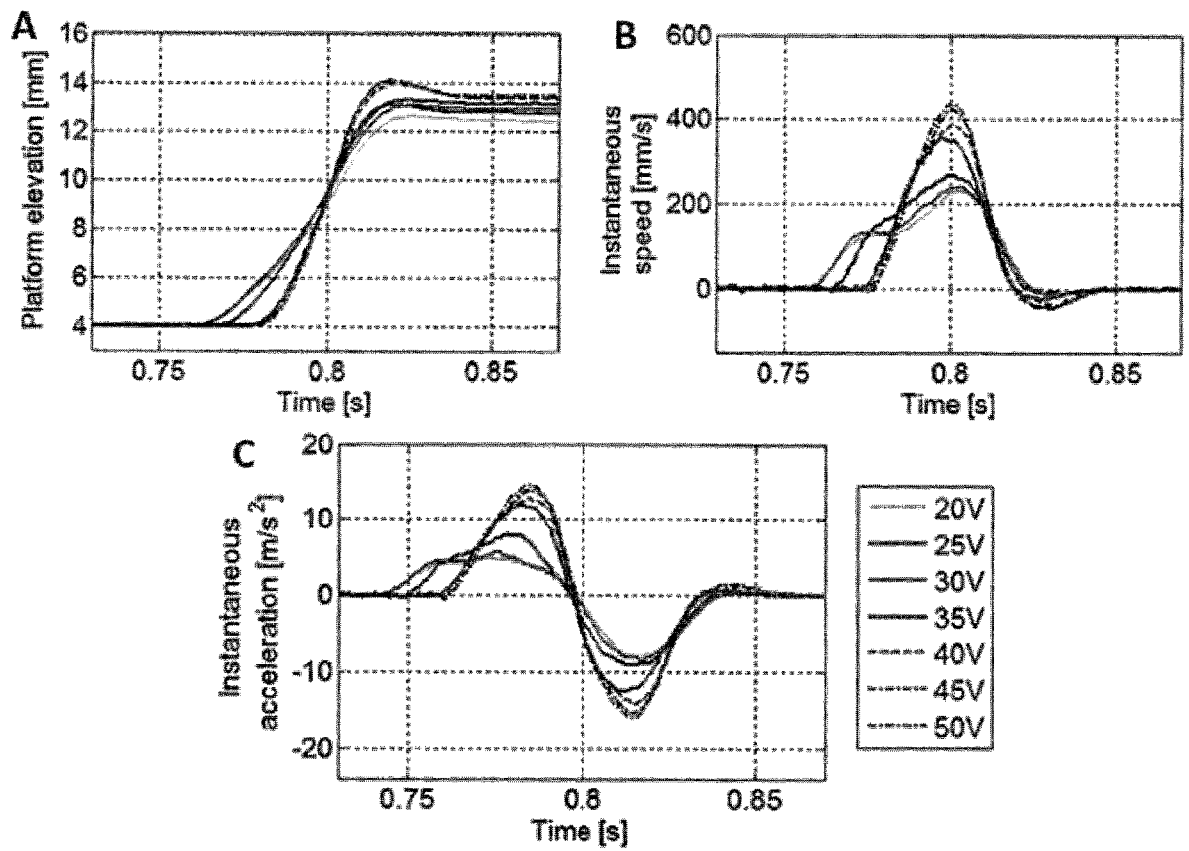
FIG. 19A-19C depicts graphs representing performance measurements of the pop-up foldable actuator device, showing a top platform position in FIG. 19A, top platform speed in FIG. 19B, and top platform acceleration in FIG. 19C.

Regarding the motion of the device 100, the position tracking was used of the pop-up platform motion to demonstrate the performance of the system and to verify the presented model. The platform moves out of the plane upon coils activation. Input voltages from 20 V to 50 V, with 5 V increments, were applied to the coil system and we measured with the high-speed camera the top element position in time. The recording was done from the side of device 100, and the results of the tracking are shown in FIG. 19; platform elevation, speed and acceleration in time for different input voltages are reported.

Another test was performed to verify the dynamic model of the mechanism and the workspace reduction upon changes of the payload, as shown in FIG. 18B. The same tracking as described above was performed by placing on the top platform different set of weights.

Figures 20A, 20B, 20C:
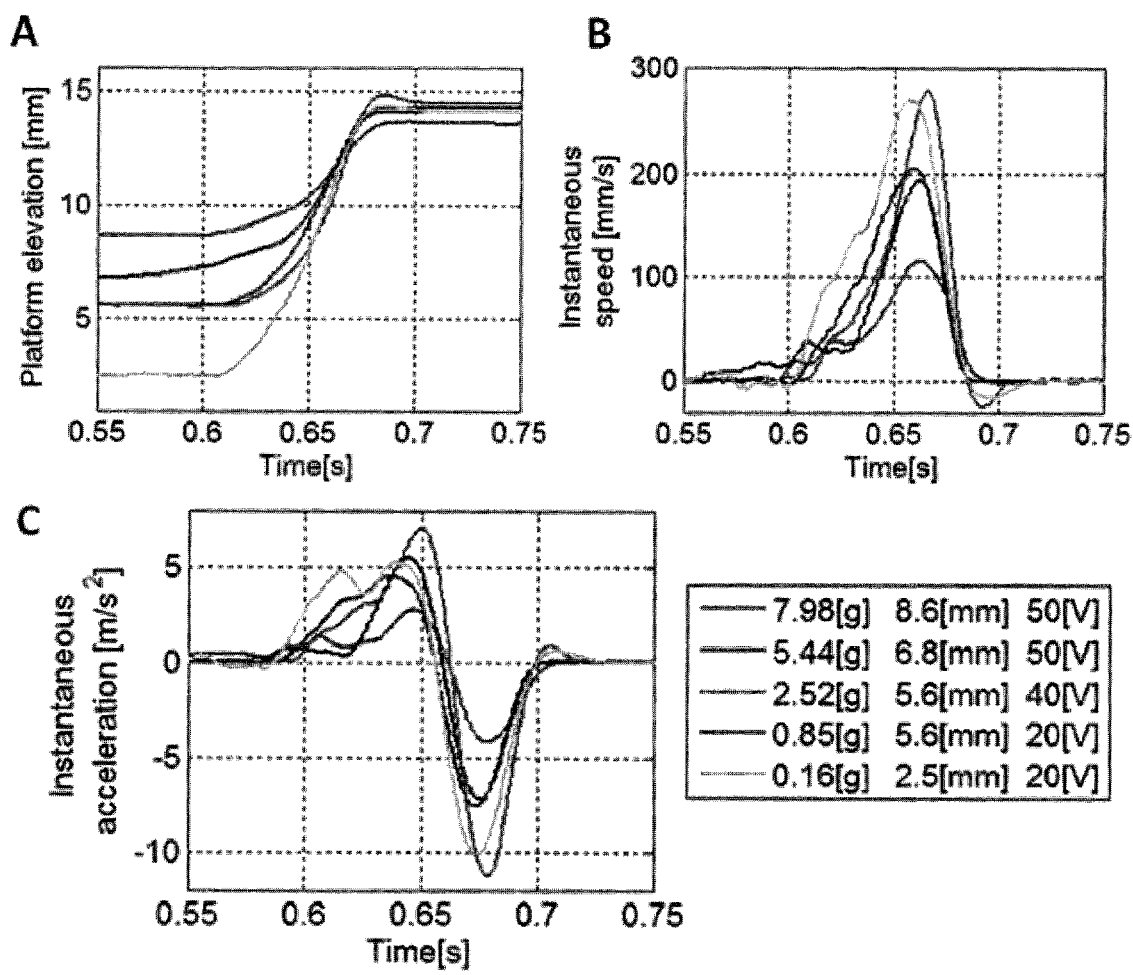
FIG. 20A-20C depicts graphs representing performance including the mass on the top platform, by testing different payload weights, showing a top platform position in FIG. 20A, top platform speed in FIG. 20B, and top platform acceleration in FIG. 20C, also describing the minimum elevation and power supply voltage to initiate the motion.
Figures 21A, 21B, 21C, 21D:
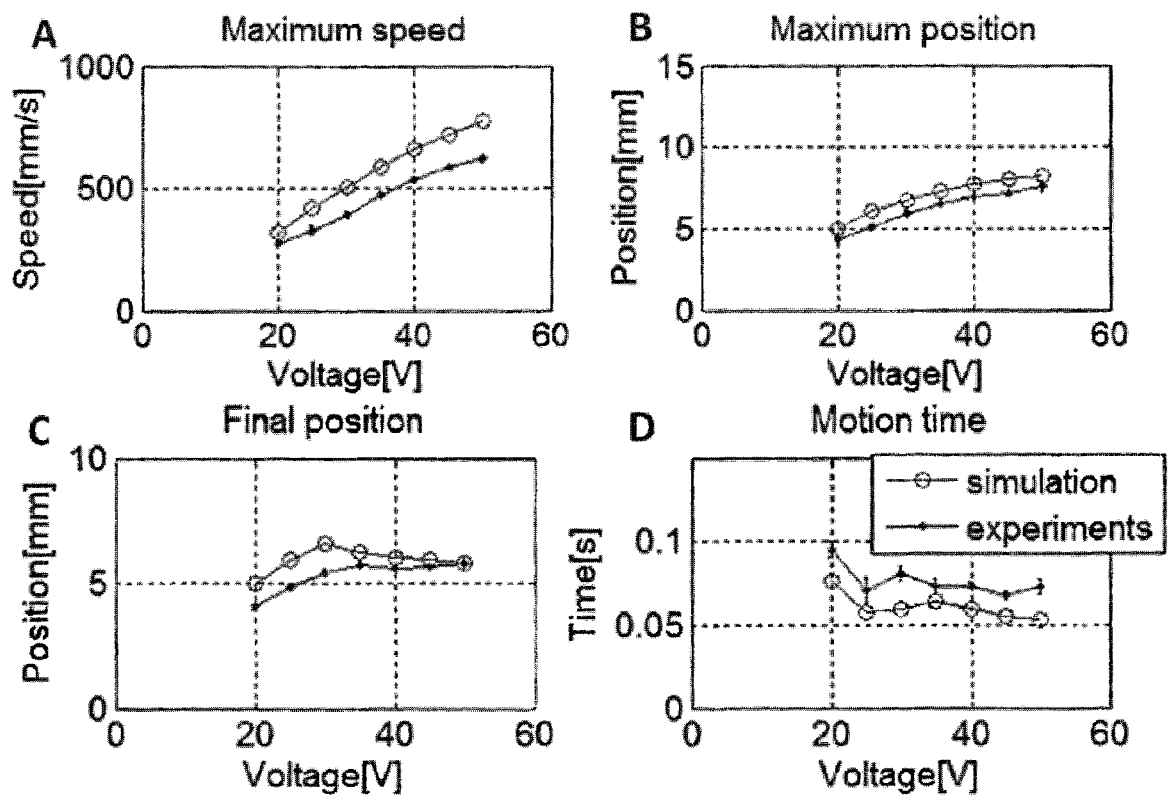
FIG. 21A-21D depicts graphs showing a comparison of the motion parameters of an exemplary pop-up foldable device, based on experimental (dot) and simulated (circle) results, including maximum speed in FIG. 21A, maximum position in FIG. 21B, final position in FIG. 21C, and motion time in FIG. 21D.

For each weight, we identified the minimum voltage to generate motion and the starting platform position, the resulting position was measured in time with the high-speed camera. The results of the tests are reported in FIG. 20. We employed the dynamics parameters previously determined, jointly with platform segments weights that are reported in Table III, and flexible hinge rotational stiffness in the modelling of the pop-up platform. In the model, assuming all three legs having the same behavior, it was considered that a single leg elevates one third of the platform mass, in agreement with the considerations made above. In FIG. 21, the comparison of device motion experimental and theoretical results are presented.

From the experiment, it was shown that the speed of device 100 could be adjusted by changing the voltage. The simulated results slightly overestimated real performance of device 100. This is likely due to the three legs composing the system having some variability in dynamic parameters, such as friction coefficients, and in the coils. These small differences made motion initiation slightly asynchronous thus reducing platform performance. One of the advantages of having a parallel platform with redundant actuation is the capability of maintaining the top platform or centerpiece 80 parallel to the base. The tests showed an average misalignment angle of 0.4±0.38 degrees, thus demonstrating the accuracy of the fabrication method and the device mechanism.

Figure 22:
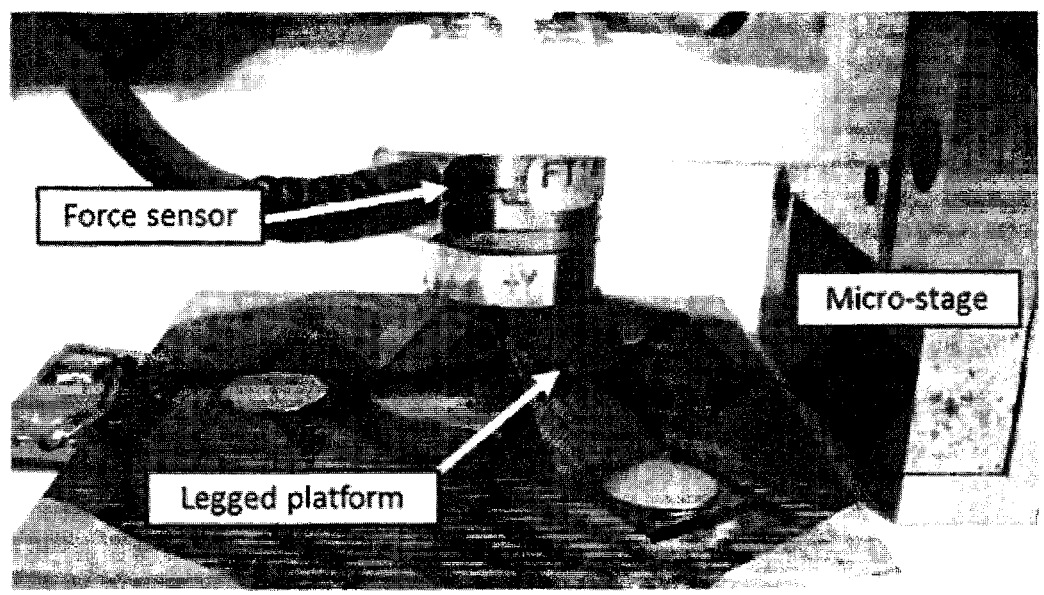
FIG. 22 shows a photo of an exemplary pop-up foldable actuator device in an experimental system for a steady forces test, the system including a force sensor and a micro stage placed on top of the platform of the pop-up foldable actuator device.
Figure 23:
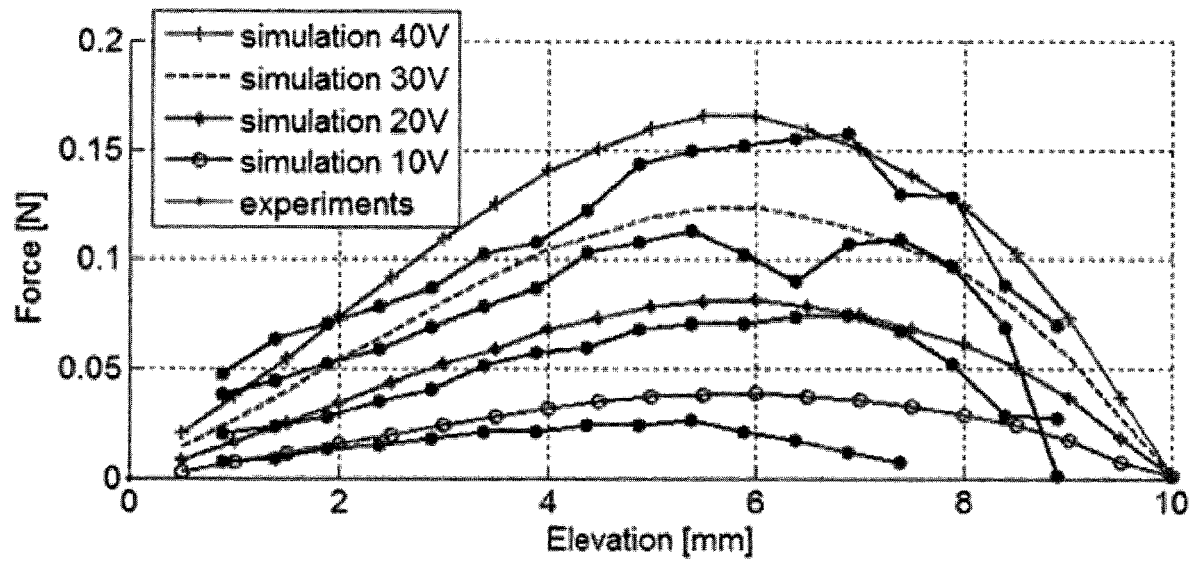
FIG. 23 shows a graph with the experimental results of the system shown in FIG. 22, depicting experimental and simulated results of force as a function of elevation.

Moreover, device 100 also presents a certain load carrying capacity of the centerpiece or platform 80. A series of tests were performed to evaluate the capability of device 100 in applying steady forces. A force sensor (ATI™ Nano 17) was placed at increasing distances form platform 80, as shown in FIG. 22. After activation, the steady forces were measured. The tests were repeated at different voltages (10 V to 40 V) and the results were compared with simulations, as reported in FIG. 23. We obtained maximum steady forces of 0.17 N, it appears that the model prediction resulted more accurate for higher voltages being less sensitive to friction forces.

Figures 24A, 24B:
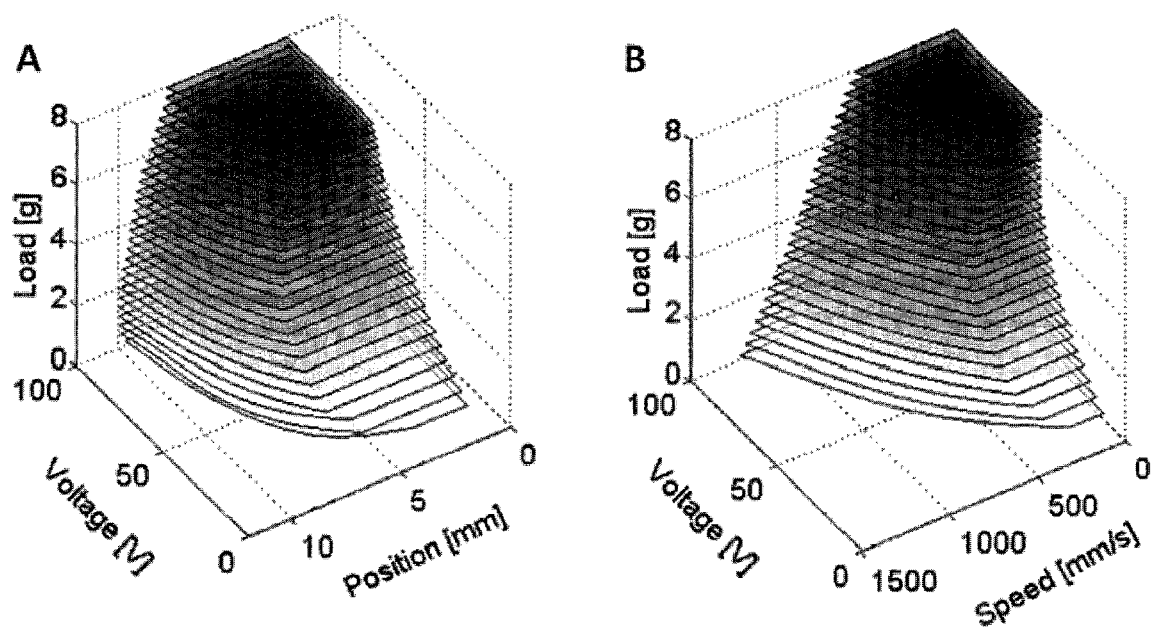
FIGS. 24A and 24B depict graphs representing achievable speeds and positional ranges for the top platform of the pop-up foldable actuator device, based on simulation results, for different weights placed on to the platform or centerpiece, and power supply voltages.

Another aspect that was considered was the workspace reduction due to the increase in payload. As an extension of the results reported in FIG. 23, the model to change platform payload was used, and once fixed the minimum starting condition and voltage to generate motion, the final position was calculated and maximum achievable speed. As represented in FIGS. 24A and 24B, an increase in the payload limits platform achievable speeds and its range of motion.

To briefly summarize some of the features, a portable 1.7 mm thick pop-up planar actuator device 100 is shown, that can be switched from a 2D planar state to a 3D actuation state when popped up. For manufacturing the device 100, preferably an SCM fabrication technique can be used, by embedding multiple essential components such as folding linkages and actuation system in the different layers of the structure. The device 100 has also been fully modelled and characterized by the nominally 2-D magnetic actuation system, based on planar coils. For an exemplary non-limiting embodiment, a maximum elevation of 13 mm was achieved, with a maximum linear velocity of over 600 mm/s for the actuators 200. The actuation time for performing the configuration change resulted lower than 0.1 s. Device 100 lays a new ground in terms of performance, size and embedment of the actuation, comparing to all background art solutions. Device 100 has superior performance and novel features, and can be used in new application fields, such as inherent force control of the actuators and back-drivability of the transmission, thus making it ideal for HU haptic applications or fragile objects manipulation.

Figure 25:
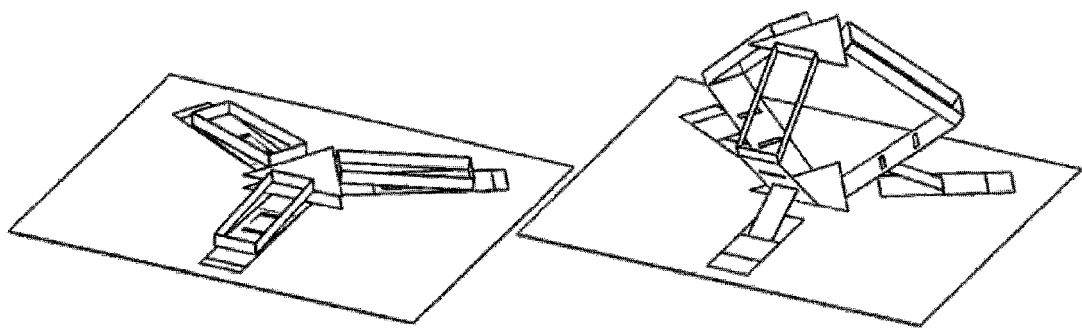
FIG. 25 shows a schematic perspective view of another embodiment of the pop-up foldable actuator device, where a delta robot is interfaced the actuator legs, showing the device in a folded portable configuration on the left, and 3D pop-up configuration on the right.

FIG. 25 shows a schematic perspective view of another embodiment of the pop-up foldable actuator device, where a delta robot is interfaced the actuator legs 30, 40, 50, showing the device 100 in a folded portable configuration on the left, and 3D pop-up configuration on the right. In this figure, a possible application is shown of device 100 to be interfaced with the delta robot principle. The delta robot structure that is movably connected to the device 100 includes a first, a second, and a third articulated arm and a centerpiece pivotably connected to each of the first, second, and third articulated arm, each of the first, second, and third articulated arm having a lower section and an upper section pivotably connected to each other, each end portion of the first, the second, and the third middle section of the first, the second, and the third leg, respectively, pivotably connected to the lower section of the first, second, and third articulated arm, respectively.

Figure 26A:
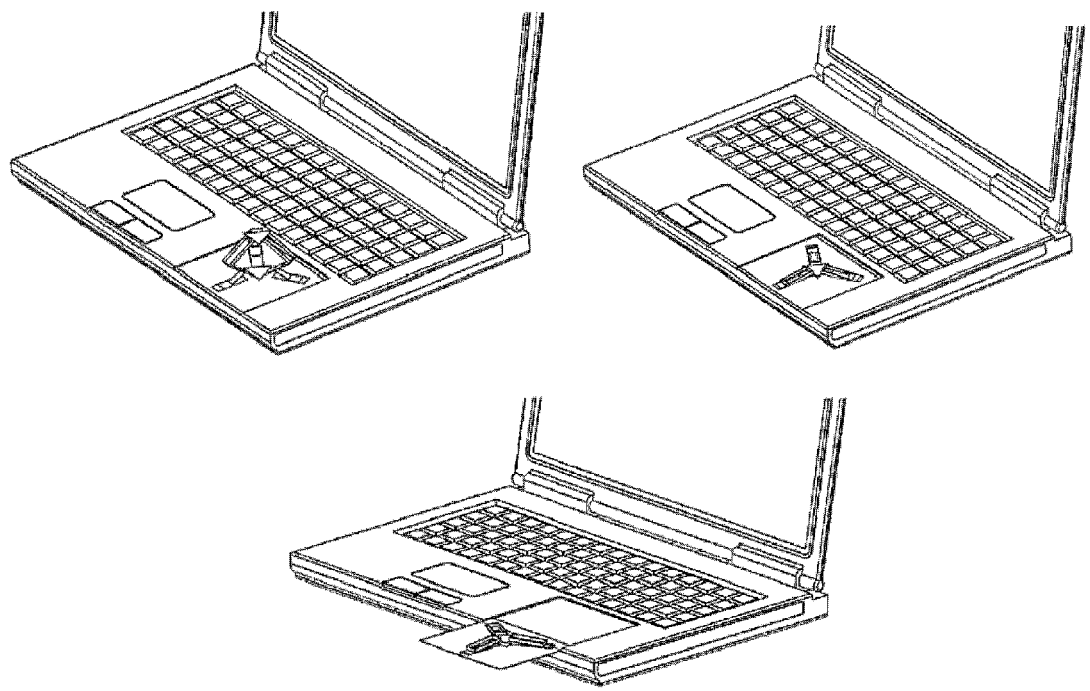
FIGS. 26A-26C shows a schematic perspective views of the pop-up foldable actuator device on a slidable tray integrated into a laptop computer (FIG. 26A), into a tablet (FIG. 26B), and into a smart phone (FIG. 26C), according to still another aspect of the present invention.
Figure 26B:
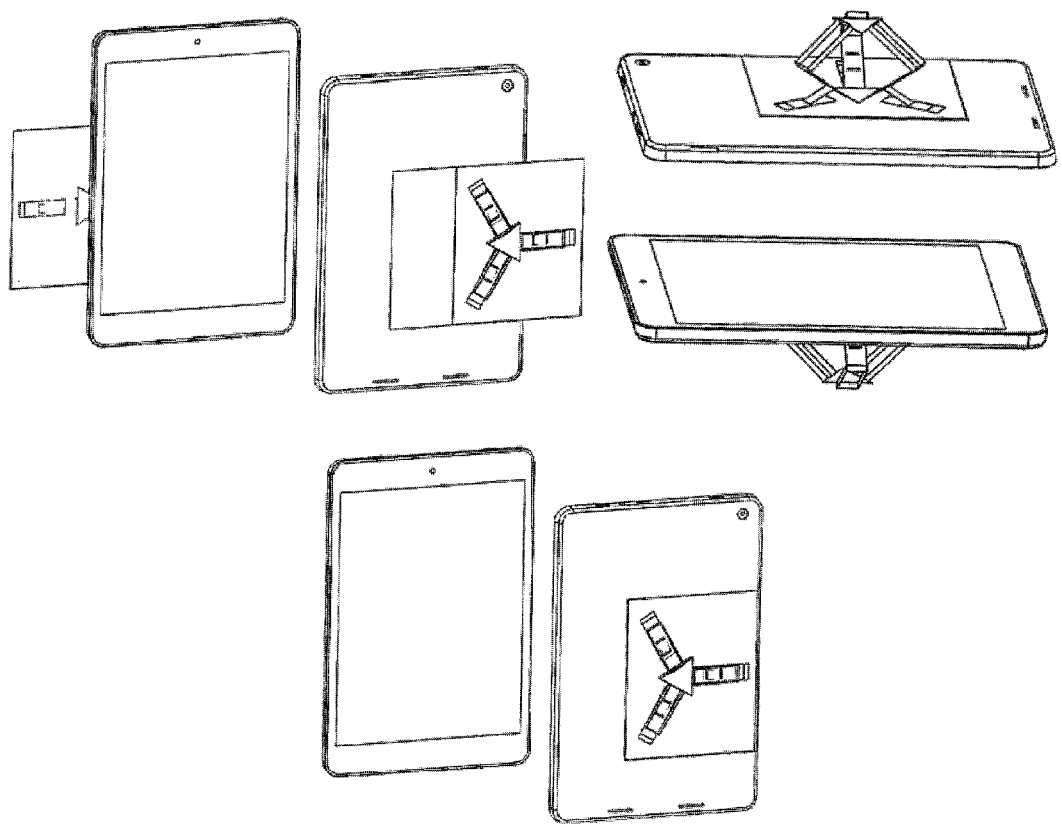
Figure 26C:
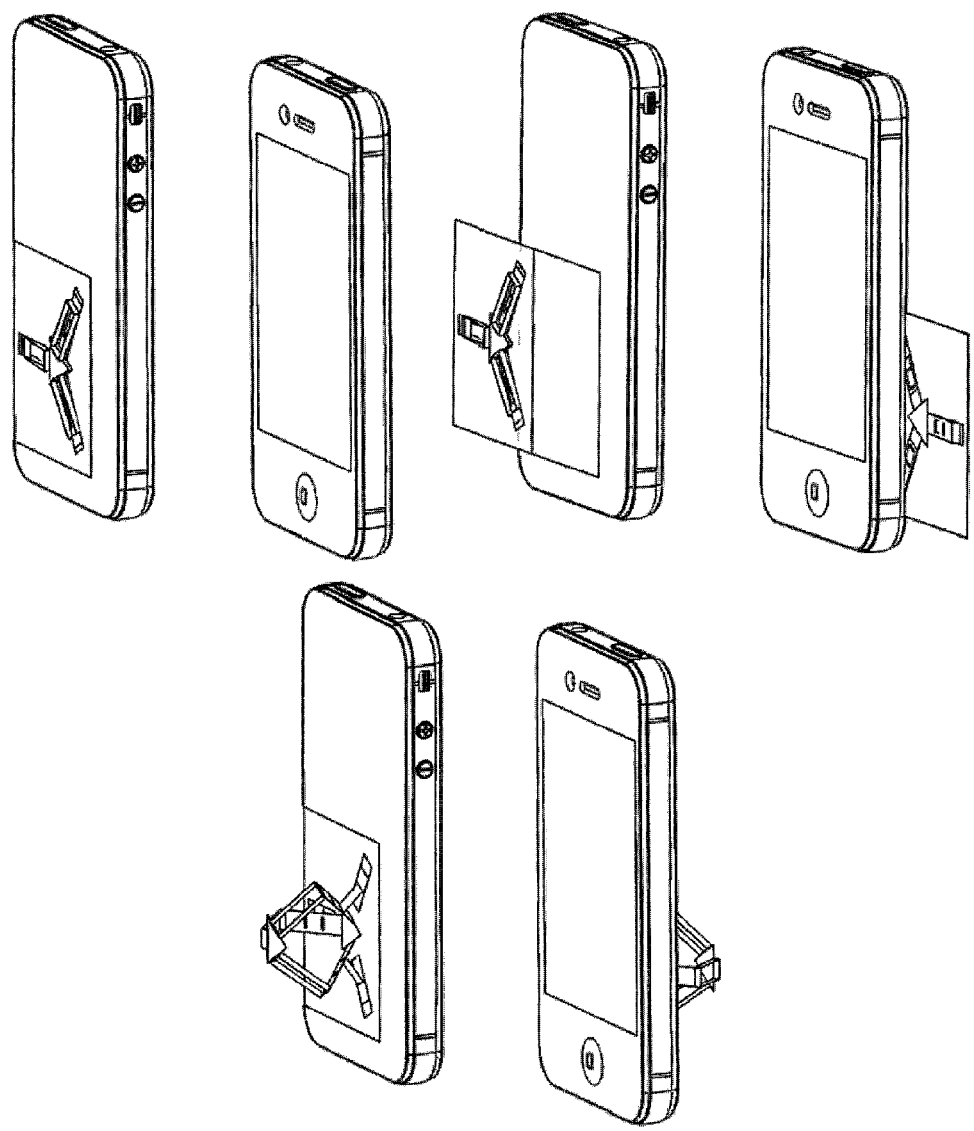

FIG. 26A-26C shows a schematic perspective views of the pop-up foldable actuator device on a slidable tray integrated into a laptop computer (FIG. 26A), into a tablet (FIG. 26B), and into a smart phone (FIG. 26C), according to still another aspect of the present invention. As the device 100 can be made very thin in a collapsed state, portable robot and haptic applications can be made, where the device can be collapsed to the 2D state to a tray or slide that can be slid, folded, or flipped to enter or be otherwise accommodated by a casing of, for example, but not limited to a smart phone, tablet computer, notebook computer.

Figure 27A:
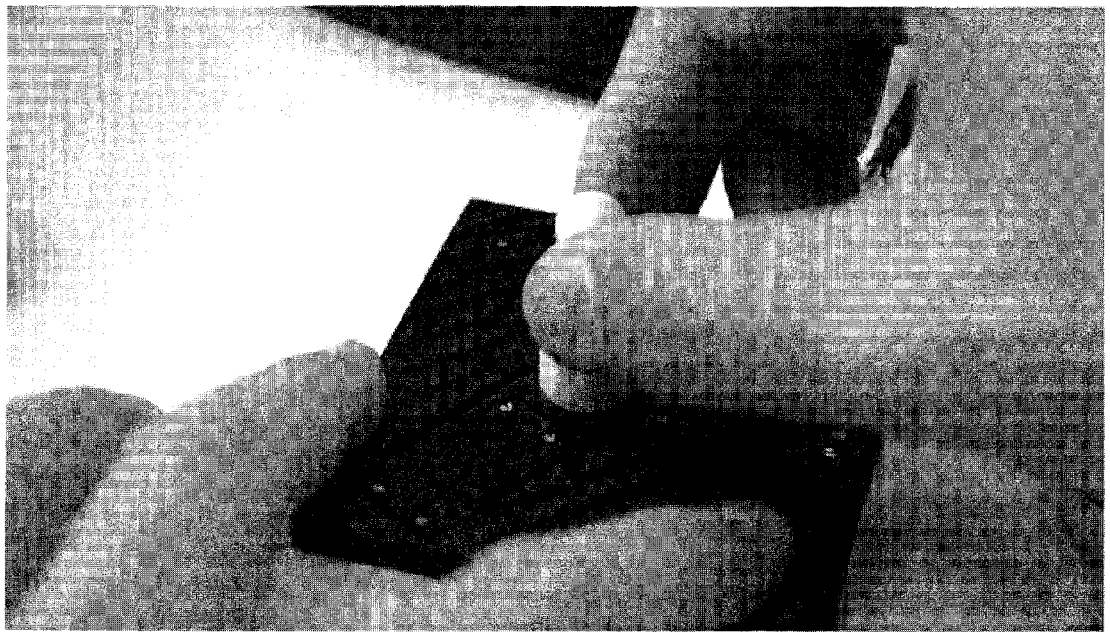
FIGS. 27A to 27G show photos of different stages of deployment of a foldable planar delta robot between a fully deployed or expanded state represented in FIG. 27D with the three legs protruding out of the openings of platform, and FIGS. 27E, 27F and 27G showing side views of the fully folded or collapsed state of the foldable planar delta robot, with the legs accommodated in the openings, according to an aspect of the present invention.
Figure 27B:
Figure 27C:
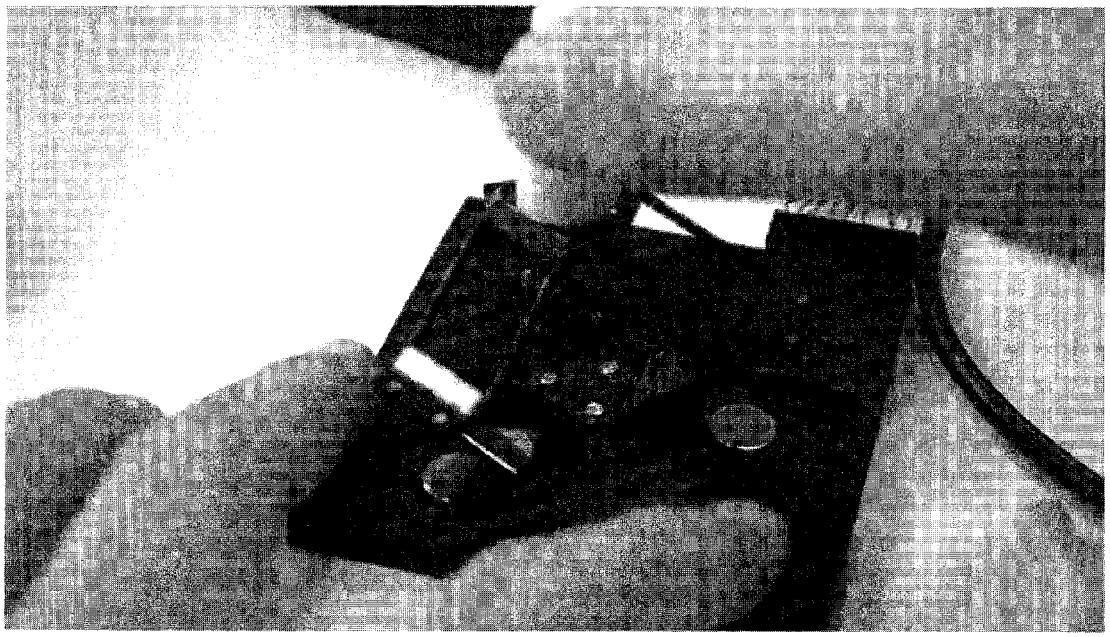
Figure 27D:
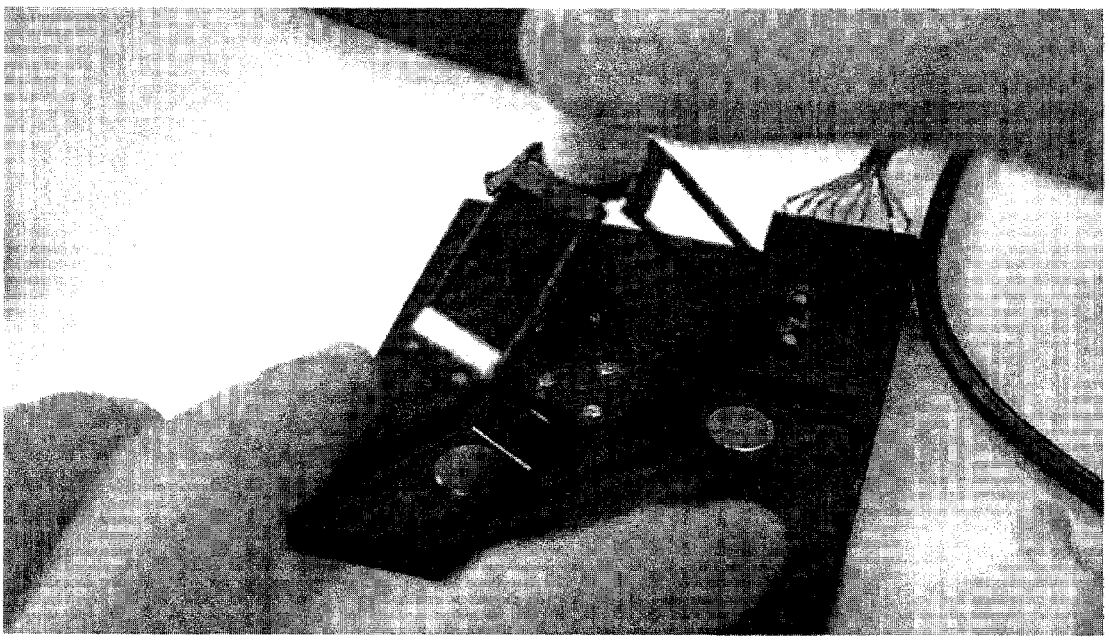
Figure 27E:
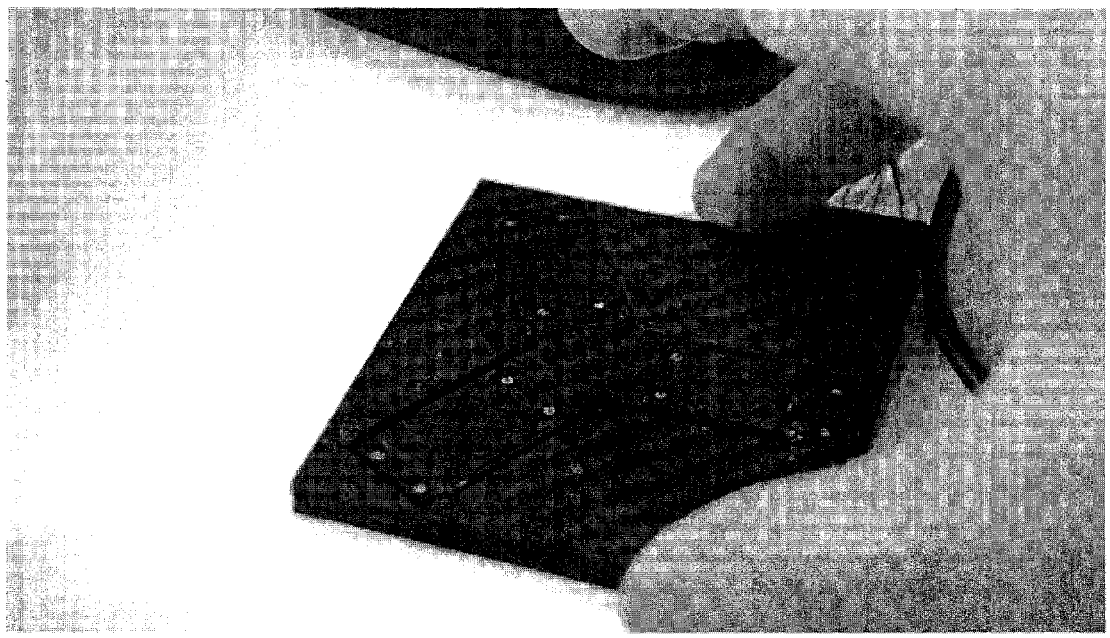
Figure 27F:
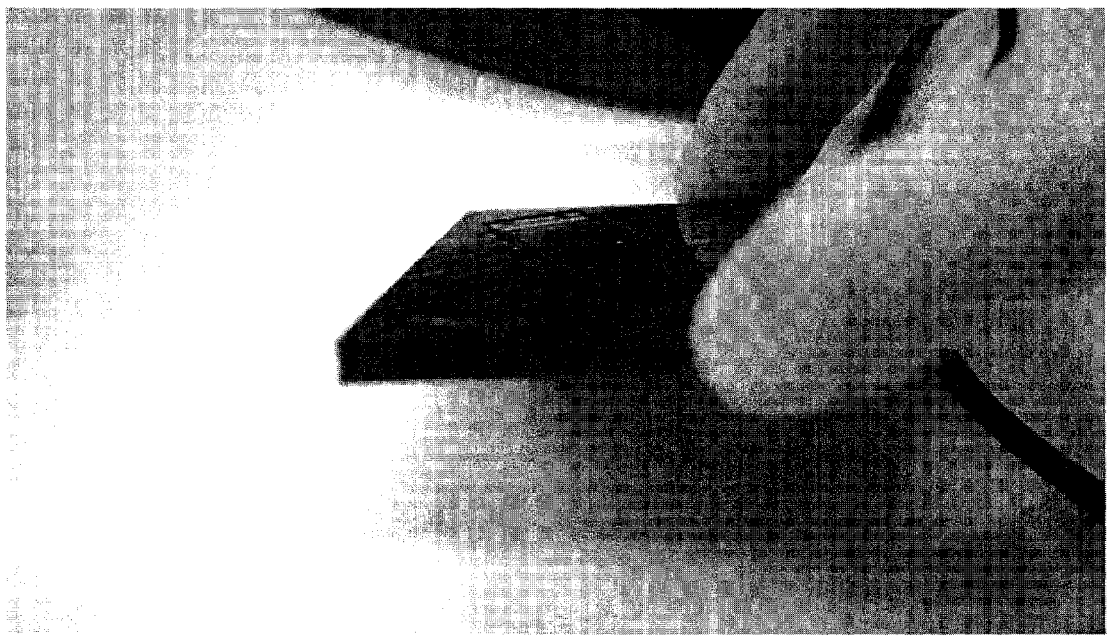
Figure 27G:
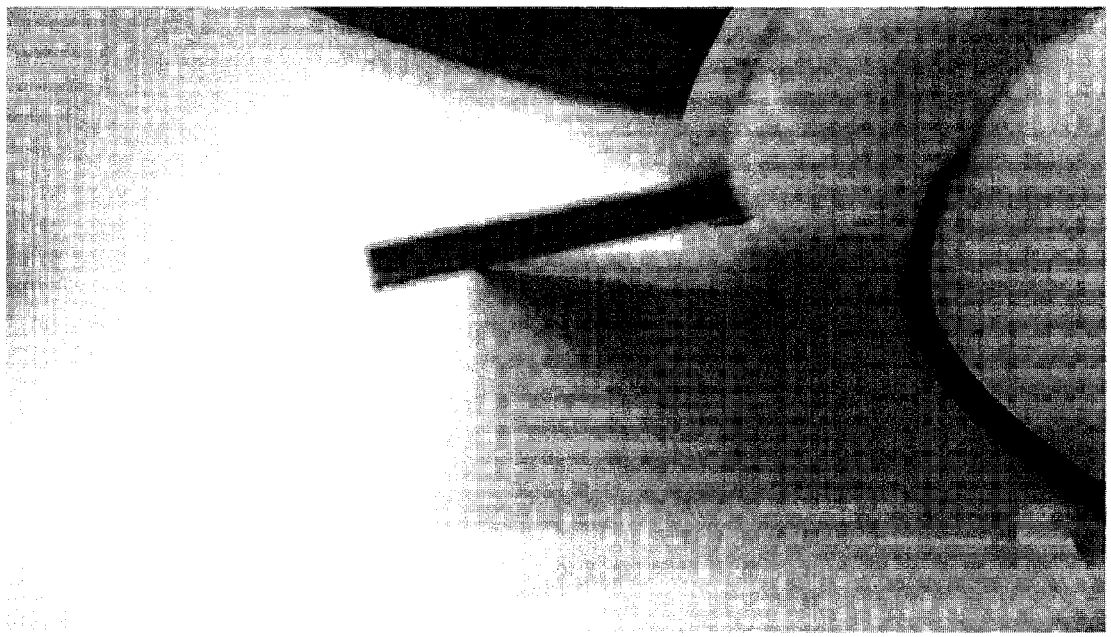

As shown in FIG. 25, a planar, collapsible or foldable delta robot device is can b provided, as shown in the photos of FIGS. 27A to 27G, the delta robot being completely foldable, as shown in FIGS. 27E-27G. When the delta robot is in collapsed or folded configuration, there are no mechanism parts visible when observed from side view. Moreover, when the actuation structure of the planar delta robot is in collapsed configuration, some mechanism parts are visible from the top view and they are folded into the opening structure of the planar base. In addition, when the actuation structure is collapsed or folded it cannot be pinched with the fingers and moved in 3D configuration without the use of actuation or other activation element designed on purpose, for example a handle as shown in FIGS. 27A to 27D, having for example a magnetic interaction force between the movable platform or centerpiece of delta robot and the handle.

Figure 28A:
FIG. 28A to 28D shows schematic views from different angles of an exemplary delta robot, in a fully folded or collapsed state, and for representative purposes, only one leg is shown, FIG. 28A showing a side view, FIGS. 28B and 28C showing top side views, and FIG. 28D showing a top view.
Figure 28B:
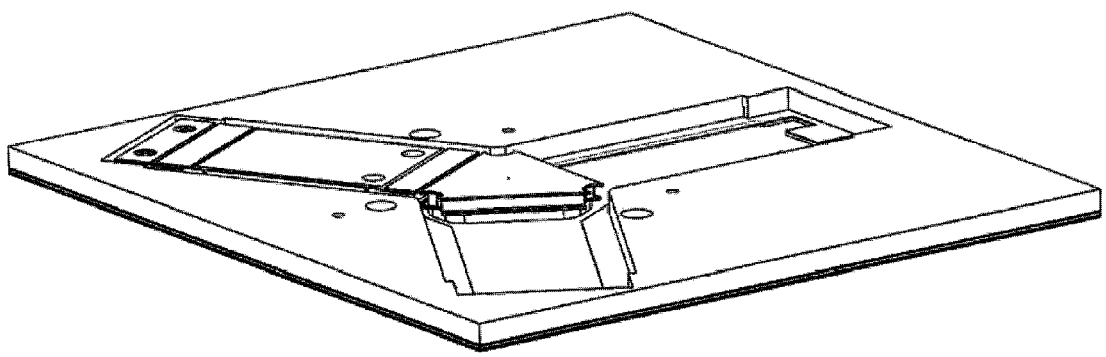
Figure 28C:
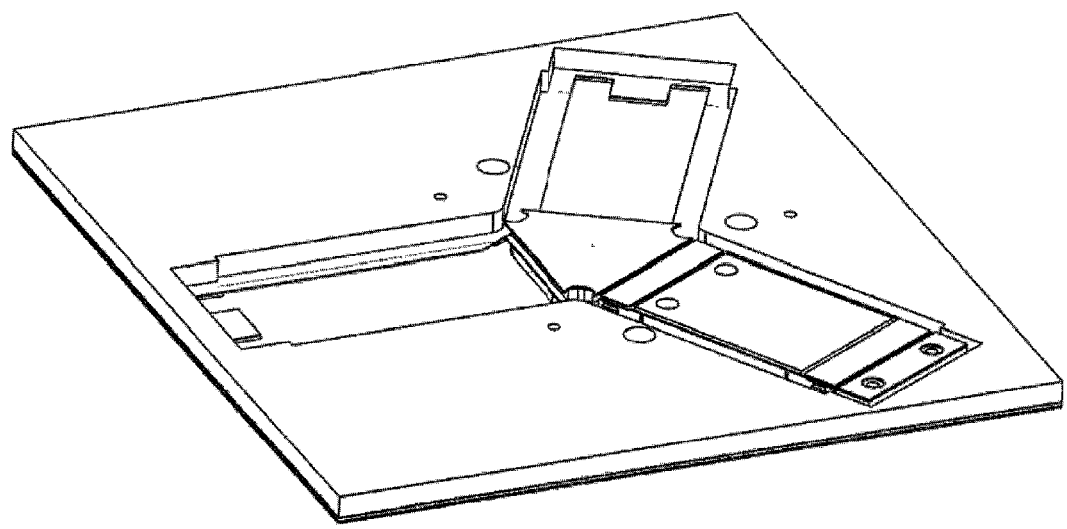
Figure 28D:
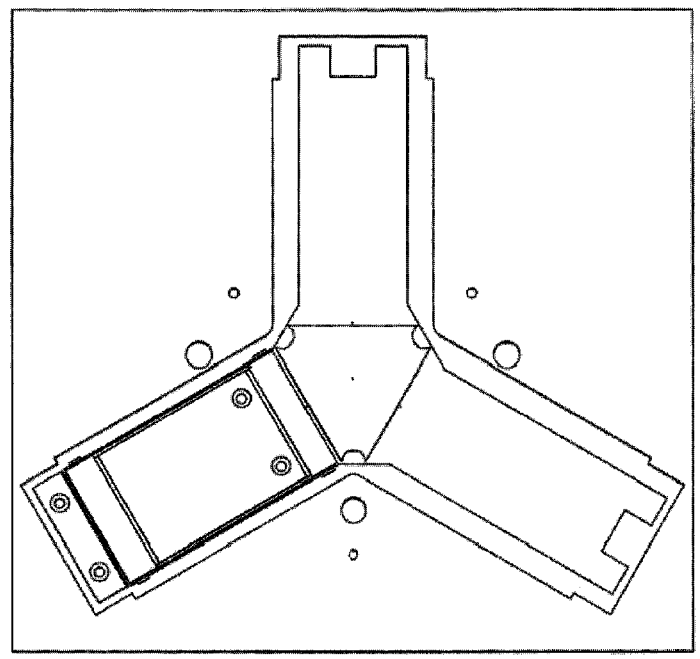

As shown in FIGS. 28B and 28C, and also shown in the photos of FIGS. 27E and 27F, the planar delta robot 300 is shown in a folded state, in which the three movable legs and the movable platform 380 of the actuation structure 370 are fully accommodated inside the planar base 310. It is noted that FIGS. 28B and 28C only show one leg of the actuation structure 370 for illustration purposes. The opening structure 318 includes three longitudinal openings 312, 314, 316 for accommodating the legs, and a center opening for accommodating the movable platform 380 or centerpiece, in the folded state. A depth of the openings 312, 314, 316, and a thickness of the legs and movable platform in folded state can be such that the openings structure 318 fully accommodates the legs, such that no parts of the legs protrude outside of the opening structure 318, when viewed from a side.

Figure 29A:
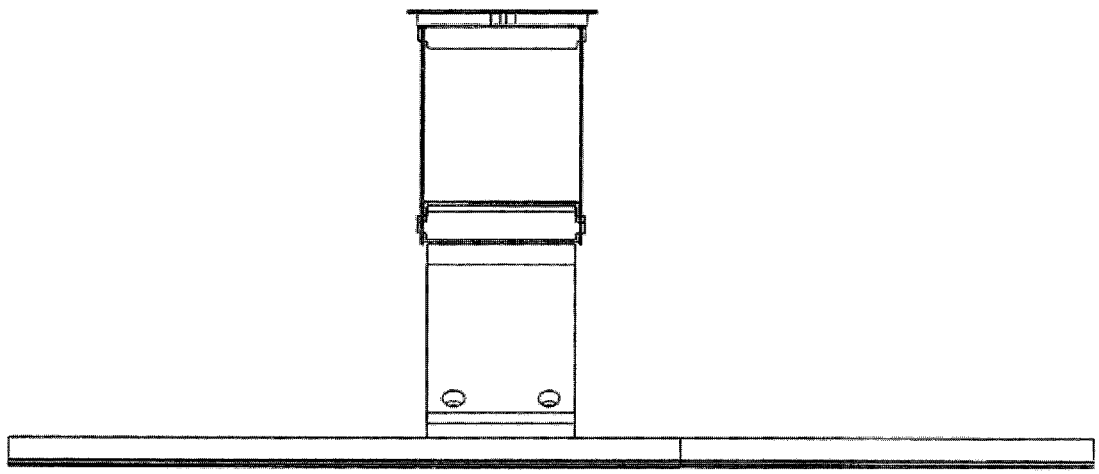
FIG. 29A to 29E shows schematic views from different angles of an exemplary delta robot, in a fully extended, expanded or deployed state, and for representative purposes, only one leg is shown, FIGS. 29A, 29B showing side views, FIGS. 29C, 28D showing top side views, and FIG. 28E showing a top view.
Figure 29B:
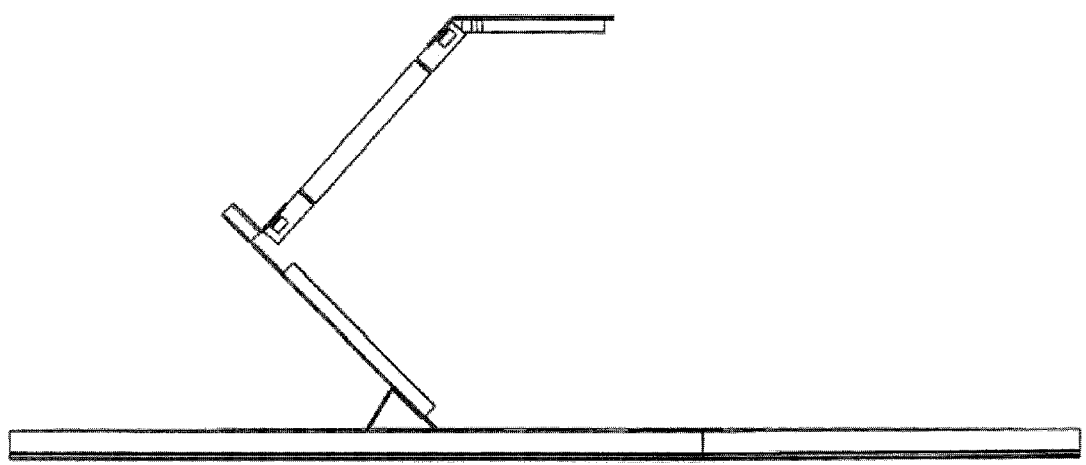
Figure 29C:
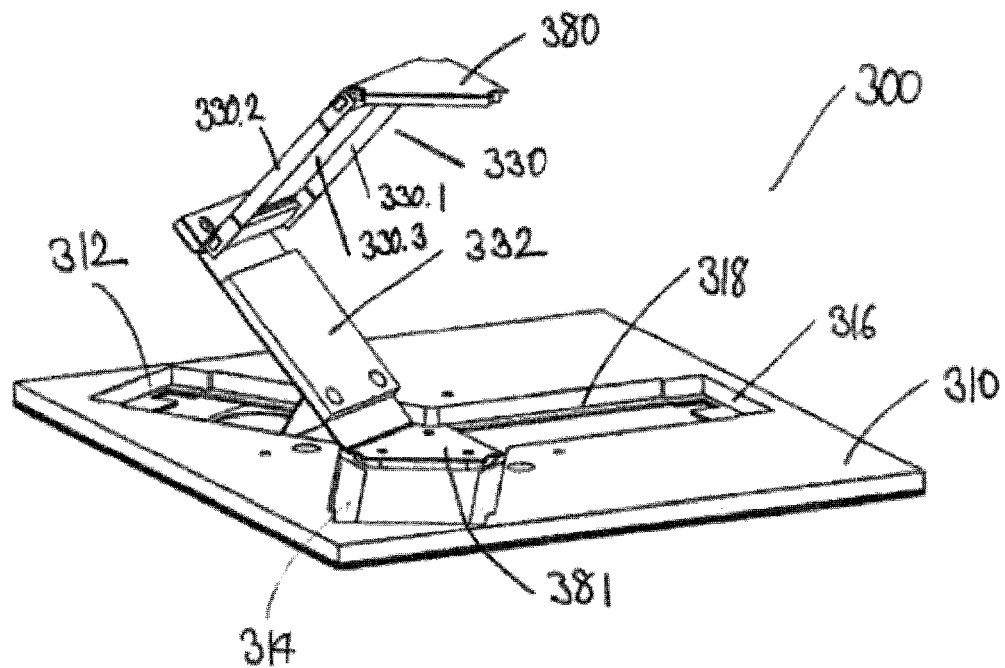
Figure 29D:
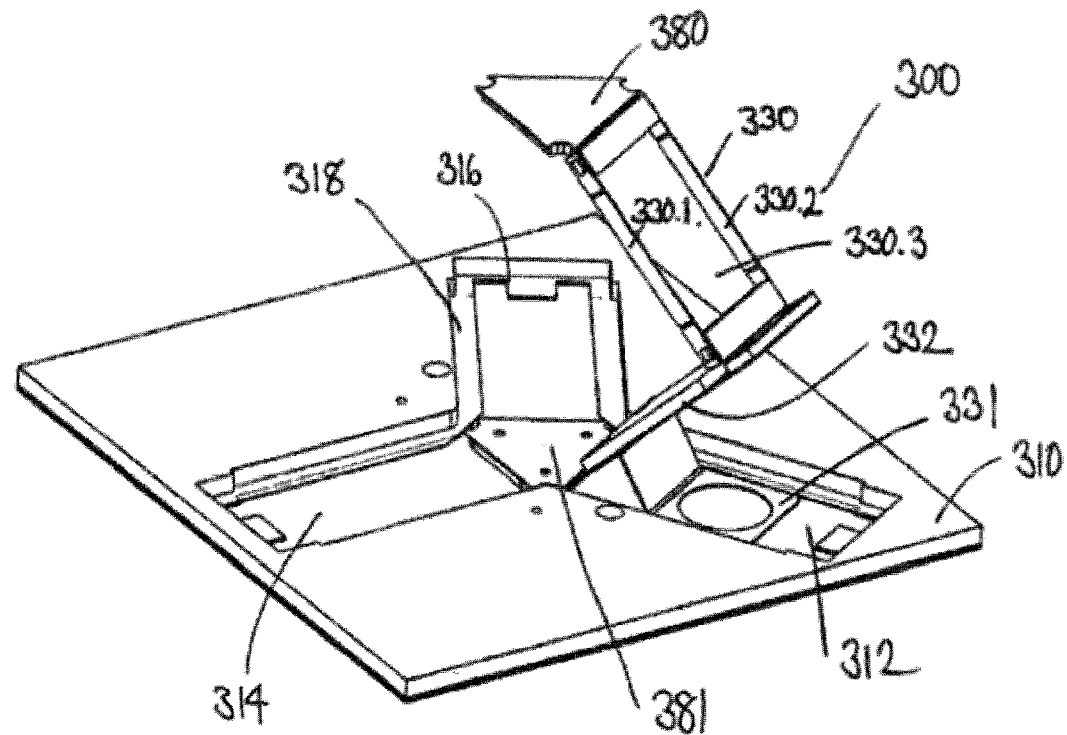
Figure 29E:
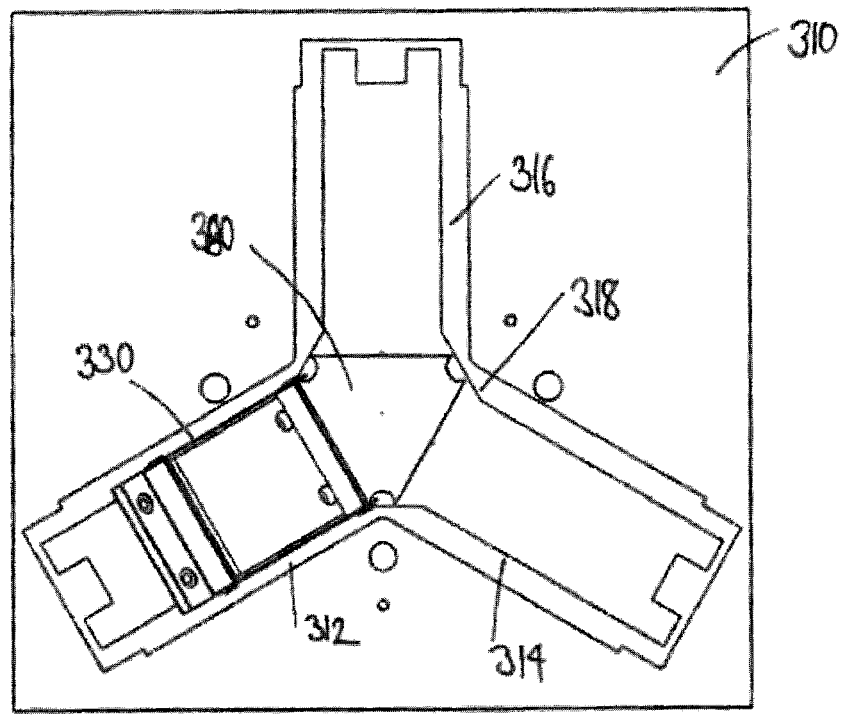
Figure 30A:
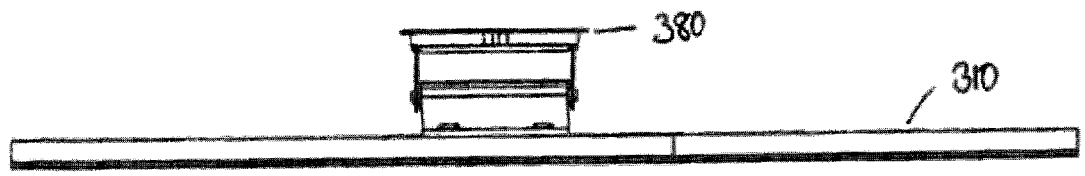
FIGS. 30A to 30E shows schematic views from different angles of an exemplary delta robot, in a partially extended, expanded, or deployed state, and for representative purposes, only one leg is shown, FIGS. 30A, 30B showing side views, FIGS. 30C, 30D showing top side views, and FIG. 30E showing a top view.
Figure 30B:
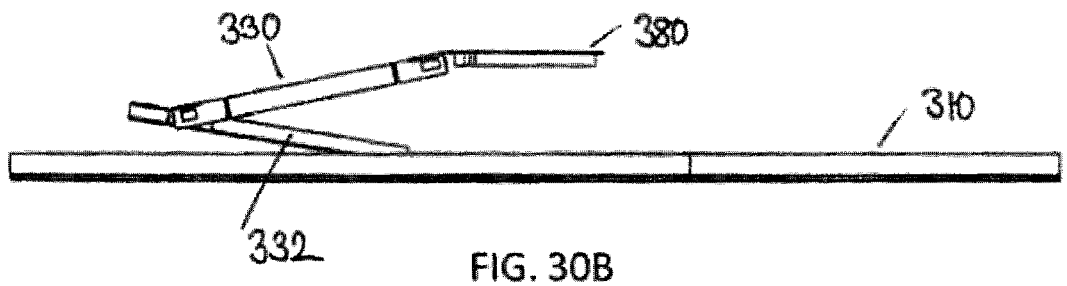
Figure 30C:
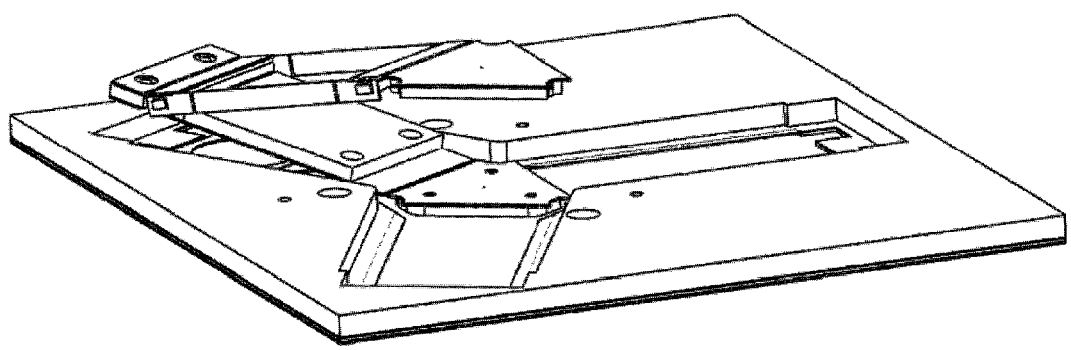
Figure 30D:
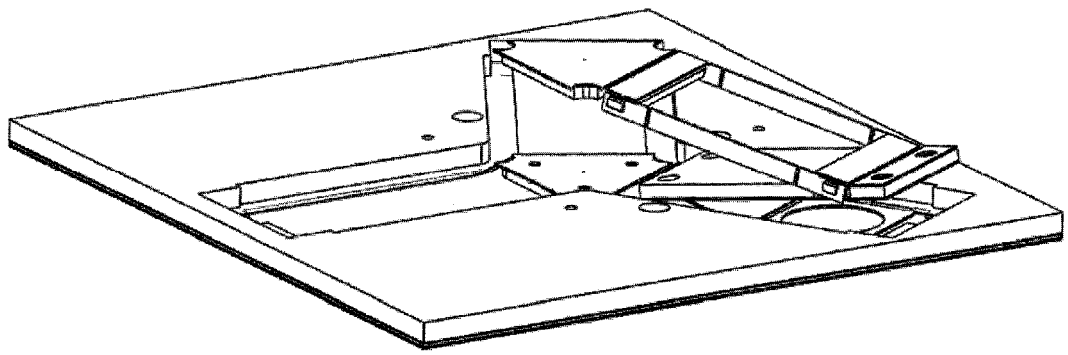
Figure 30E:
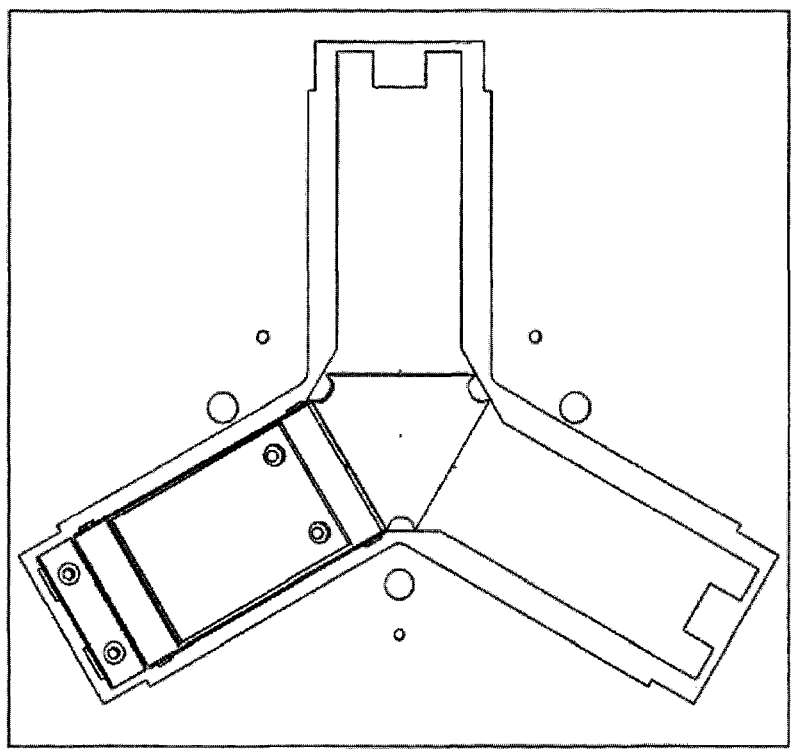

With the perspective view of FIGS. 29C and 29D, the elements of a movable leg are shown of the planar delta robot 300, including a slider element 331 located in the longitudinal opening 312 of a star-shaped opening 318 of a base plate or platform 310, configured to move linearly within the longitudinal opening 312, an actuated leg that is pivotably attached to an end of the slider 331 and also pivotably attached to a lower surface of the lower leg 332, lower leg 332 that is pivotably attached to the upper leg 330, and upper leg 330 that is pivotably attached to the movable platform 380 or centerpiece. Also, it is shown that a lower edge of the lower leg 332 is pivotably attached to the fixed center base 381, fixed center base 381 having substantially a triangular shape. Moreover, as shown in FIGS. 30C, 30D, upper leg 330 and lower leg 332 are configured to interfold with each other to put the actuation structure 370 into a foldable state into the opening structure 318. As an example, the upper leg 330 is made of two side rails 330.1, 330.2, and an opening 330.3 that can accommodate the lower leg 332 in folded state, to provide for a low profile in folded state. The slider element 331 together with the actuated leg provide for a force transmission device that allows to transmit a linear force from the slider 331 to a rotative movement of the lower leg 332 around an axis of pivot between the lower leg 332 and the fixed center base 381.

Figure 31:
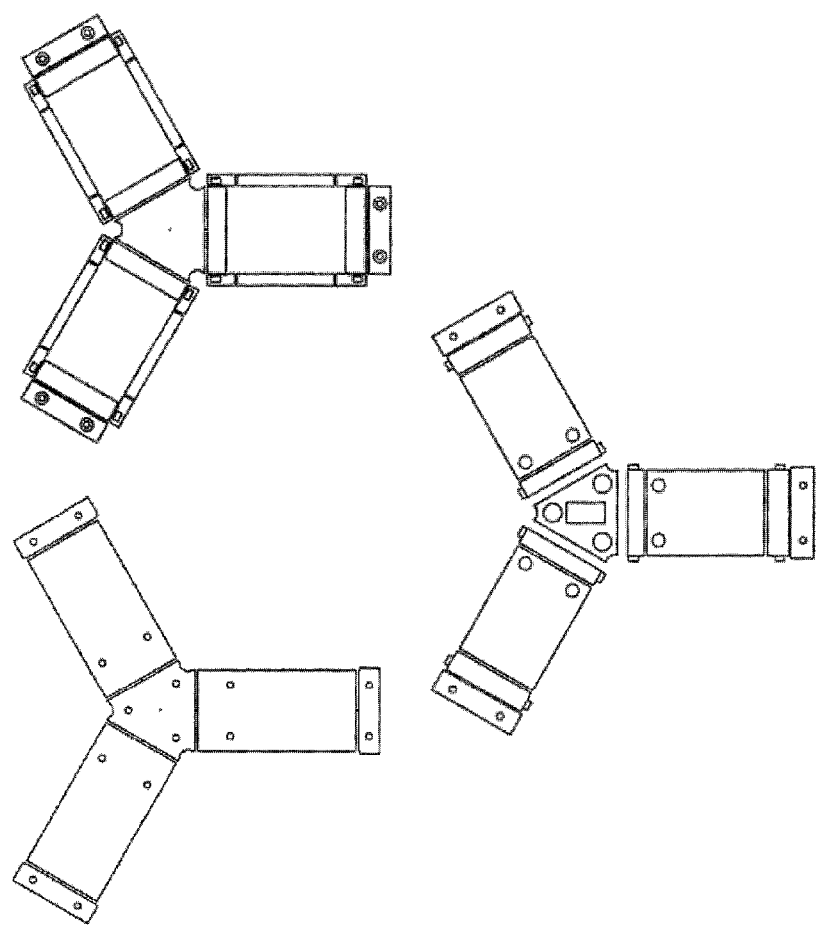
FIG. 31 shows a top schematic view of the three legs of the planar delta robot, showing top layers on the left side on top, spacer layers on the right, and bottom delta layers on the bottom left, these layers can be attached to each other to form the delta robot legs, according to another aspect of the invention.
Figure 32:
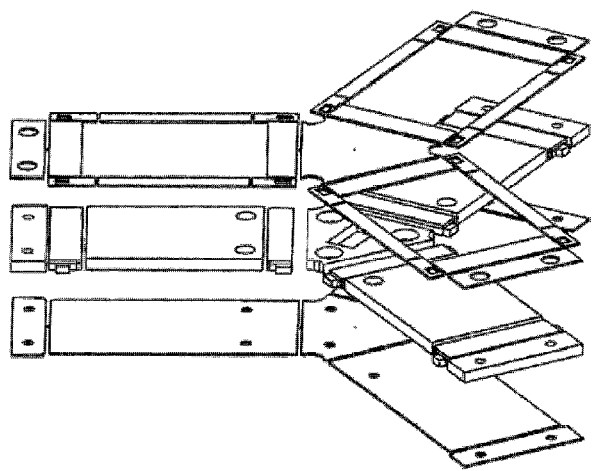
FIG. 32 shows a side perspective exploded view of the three legs consisting of the top layer, the spacer layer, and the bottom layer, in an unconnected state.
Figure 33:
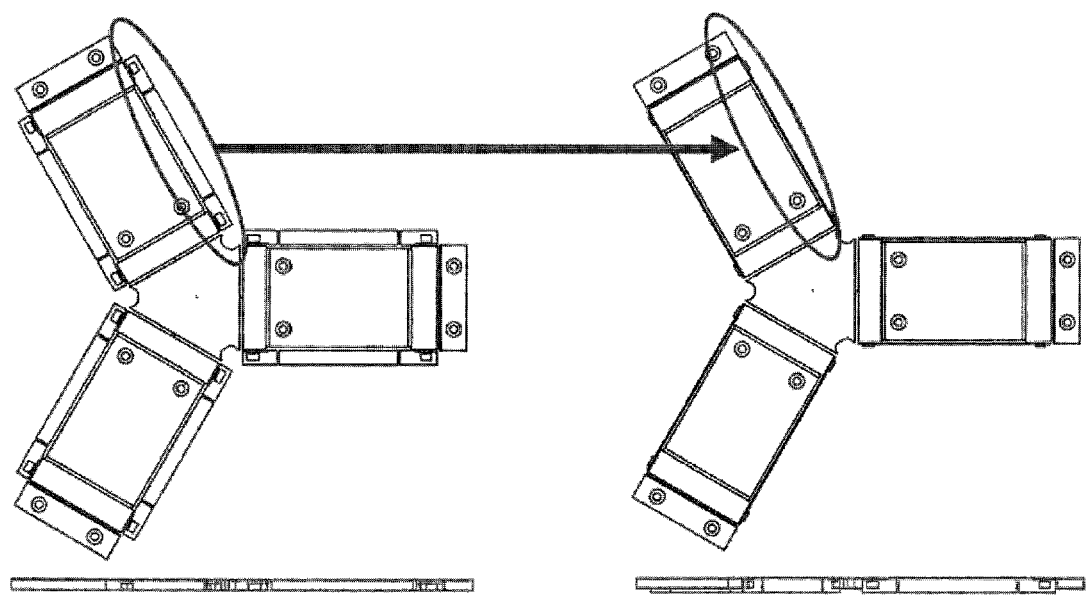
FIG. 33 shows a top schematic view of the three legs of the planar delta robot, on the left side in an unconnected state, and on the right side an interconnected state by a side ledge of the top layer that is folded down to connect to the spacer layer via pins.

Moreover, as shown in FIGS. 31, 32, and 33, the three movable legs that form the delta robot foldable actuation mechanism or structure 370 can be manufactured by a layered structure, to form the planar or flat delta robot. The foldable actuation mechanism or structure can include overlaid groups of layers including top delta layers, spacer layers and bottom delta layers. These layers can be joined using thermo-adhesive or screws, or other types of suitable attachment devices. For example, the top delta layers include the links and hinges used in the three top parallelograms mechanisms, the hinges and holes for the folding and locking assembly phase and the holes for aligning and joining with the other layer groups by using screws or adhesive. Moreover, the spacer layers include the pins that interface with the top delta layers for the folding and locking assembly phase and the holes for aligning and joining with the other layer groups by using screws or adhesive. The thickness of the spacer layers is used for compensating the height of the parallelograms of the top delta once folded. Moreover, the bottom delta layers include the hinges or joints of the actuation link of the delta the holes for aligning and joining with the other layer groups, for example by using screws, rivets, or adhesive, or another type of attachment means.

Figure 34A:
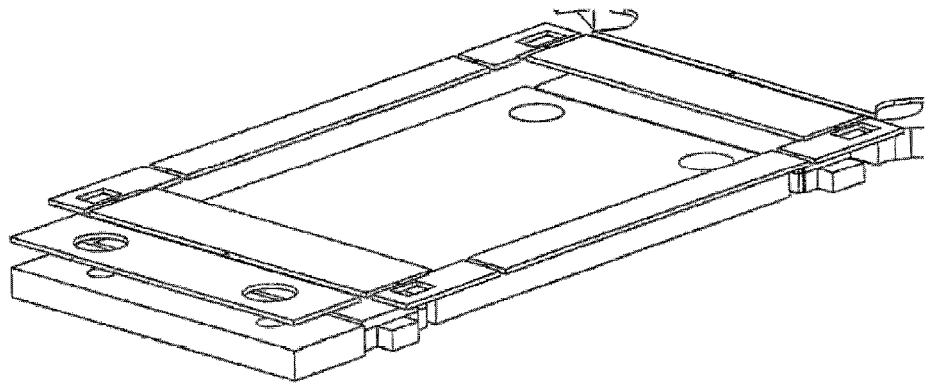
FIG. 34A to 34D show top perspective schematic views of one leg of the planar delta robot showing the stages of interconnection of the side ledges of the top layer with the pins on the spacer layer.
Figure 34B:
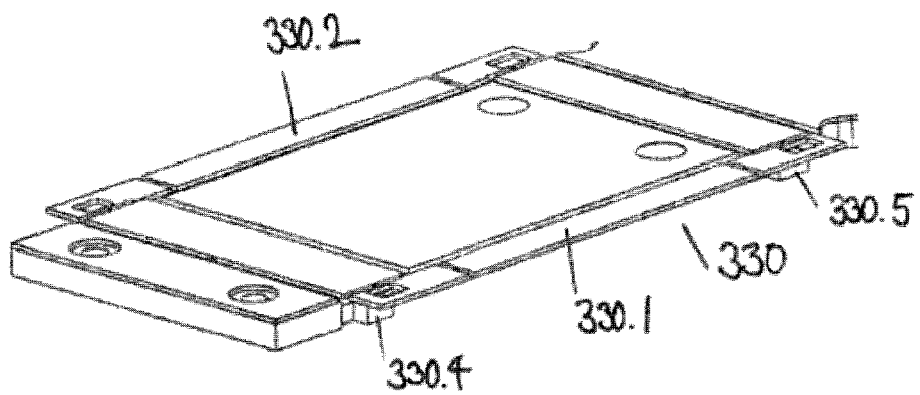
Figure 34C:
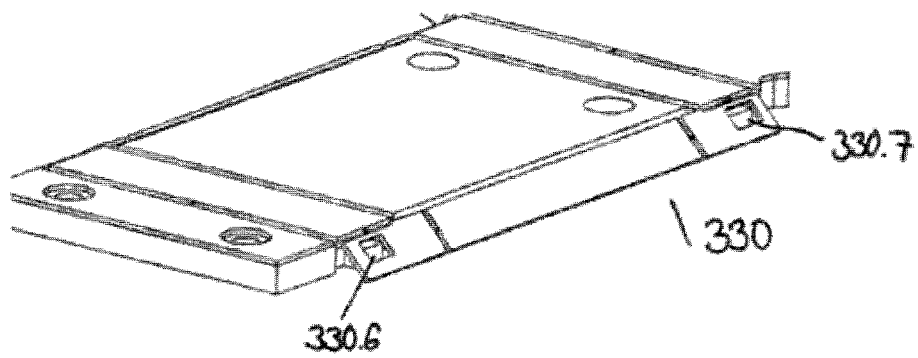
Figure 34D:
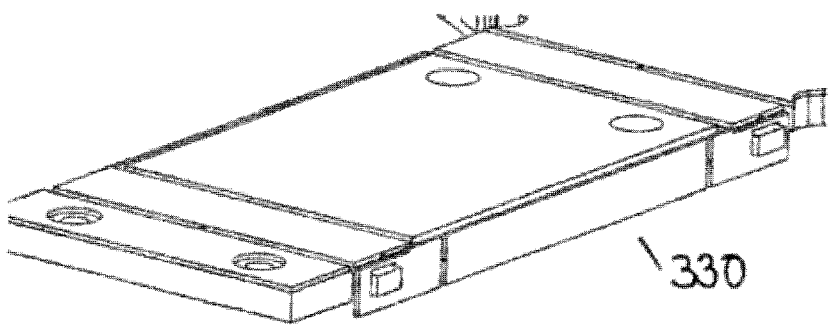
Figure 35A:
FIG. 35A to 35D show side schematic views along an axis of longitudinal extension of one leg of the planar delta robot showing the stages of interconnection of the side ledges of the top layer with the pins on the spacer layer.
Figure 35B:
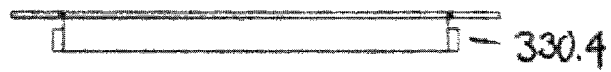
Figure 35C:
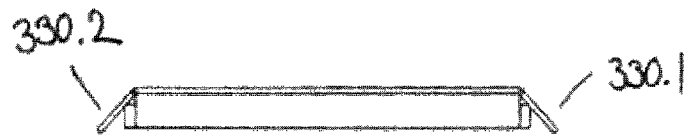
Figure 35D:

As shown in FIGS. 33, 34A to 34D, and 35A to 35D, according to an aspect of the present invention, a locking method for delta assembly is presented. To bring in place the lateral joints of the delta mechanism, sidewise protruding ledges of the top layer, forming two side rails 330.1, 330.2, as shown in FIG. 34A are folded and using holes 330.6, 330.7 on the top layer and corresponding pins 330.4, 330.5 in the spacer layer, and are locked in position, or vice versa with pins in the top layer and holes in the spacer layer. This can be made by a snap-in mechanism, for example the holes 330.6, 330.7 and corresponding pins 330.4, 330.5. The three groups of layers that form the legs of the delta robot are aligned and can be joined with adhesive. Thereafter, the folding and locking phase can take place. The top delta parallelogram elements are folded on the spacer layers and the pins of the spacers layers interface with the holes on the top delta layers. The locking provided for mechanical stability and stiffness and can be further fastened by gluing or soldering.

In FIGS. 34A to 34D, and 35A to 35D, the folding of the side ledges and the locking is illustrated. Top delta layers and spacers layers are superposed with each other and aligned. Next, the top delta layers and spacers layers are bonded together using glue thermo-adhesive, soldered, connected with screws, or rivets. The top delta parallelogram elements are folded on the spacer layers and the pins of the spacers layers interface with the holes on the top delta layers. The locking happens for mechanical interference and can be further fastened by gluing or soldering.

Figure 36:
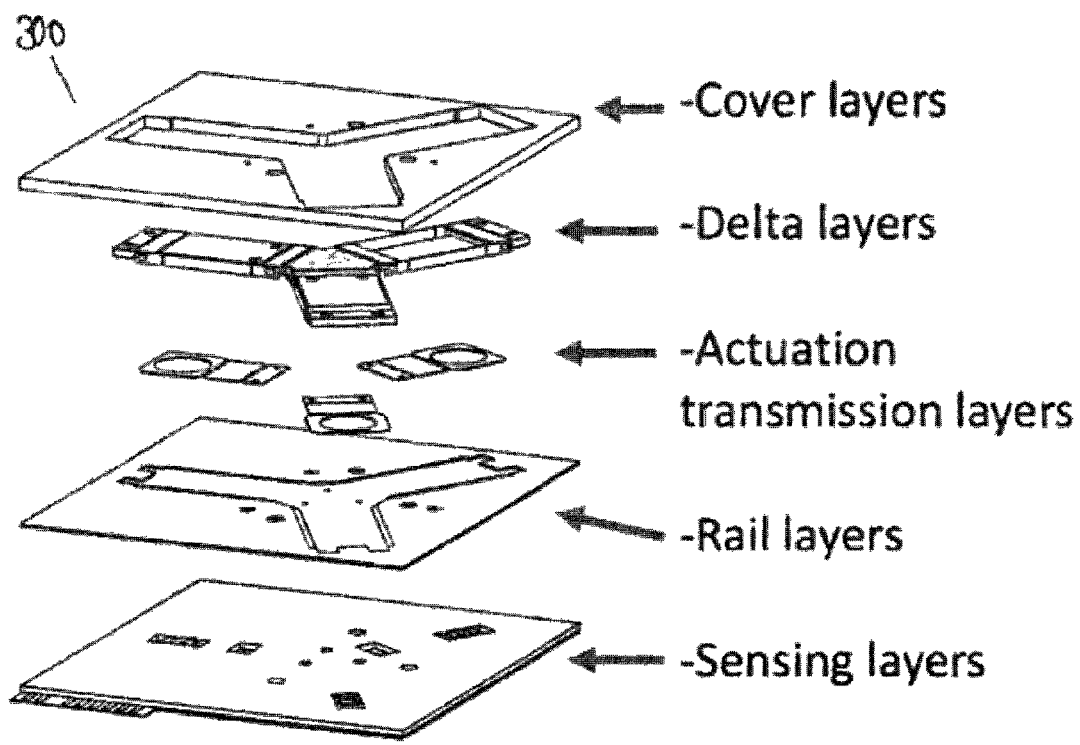
FIG. 36 shows an exploded perspective view of the pop-up planar delta robot device that is made of several layers, shown to scale, including a cover layer with openings, the delta layer having three legs, actuation transmission layers, rail layers, and the sensing and control layers, according to an aspect of the present invention.

With respect to FIG. 36, it is shown that the planar delta robot 300 can be made of different layers, each layer having a specific function, to provide for a flat planar structure. As shown above, the legs of the planar delta robot are made of layers themselves. The delta robot can include a cover layer having three opening that are arranged towards each other in star configuration. The openings are configured to fully accommodate the legs of the delta robot in a folded or collapsed state. The actuation transmission layer can include holes for aligning and joining with the other layer groups by using an attachment means, for example screws or adhesive. The links and hinges that are used for actuation transmission are connected with permanent magnets or coils or other actuators or parts of them. The rail layers are configured to guide the linear motion of the sliders the actuation layer of each leg of the delta robot, to limit the motion to a specific axis. The sensing layer can include the circuit board and the sensors, for example but not limited to magnetic encoders or magneto-resistive sensors or hall-effect sensors, configured to track mechanism motion. The cover layers used for encapsulating the delta mechanism such that its top surface is at the same level of the cover layers.

Figure 38A:
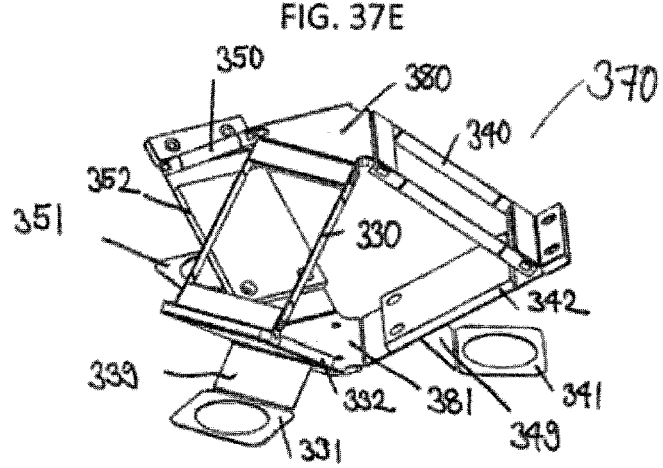
FIG. 38A shows perspective schematic view of the legs of the planar delta robot without the base, with all three legs attached to a triangularly shaped centerpiece, based on the representation of FIG. 25.
Figure 38B:
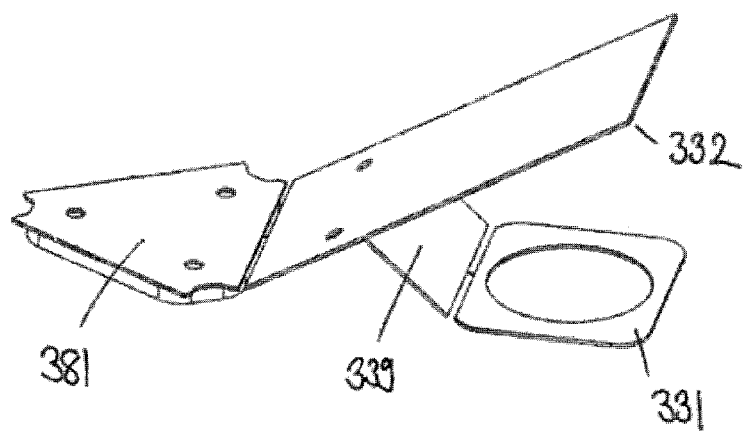
FIG. 38B shows a perspective view of a lower part of one delta leg pivotably attached to triangularly-shaped attachment base, and a slider having a leg, the leg pivotably attached to slider and delta leg, forming a slider-crank mechanism.
Figure 38C:
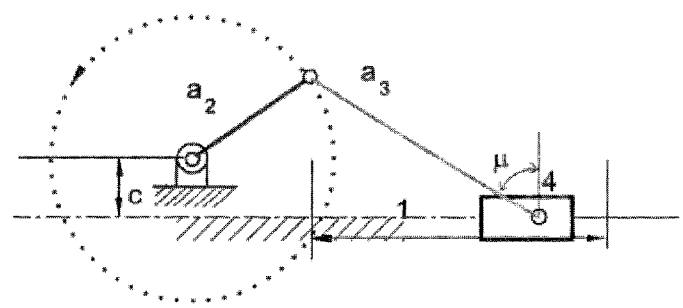
FIGS. 38C and 38D show a side schematic view of the mechanism showing a linear movement that translates into a rotative or pivoting output movement on the delta leg.
Figure 38D:
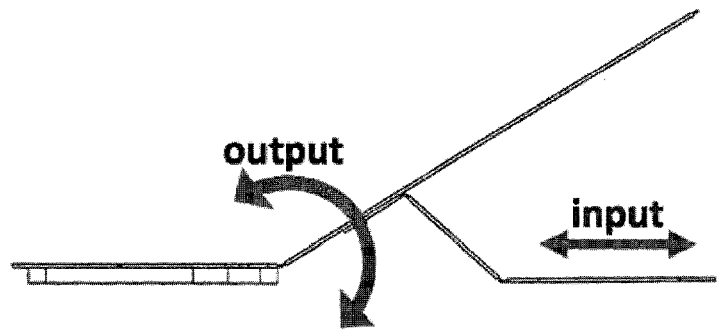
Figure 39A:
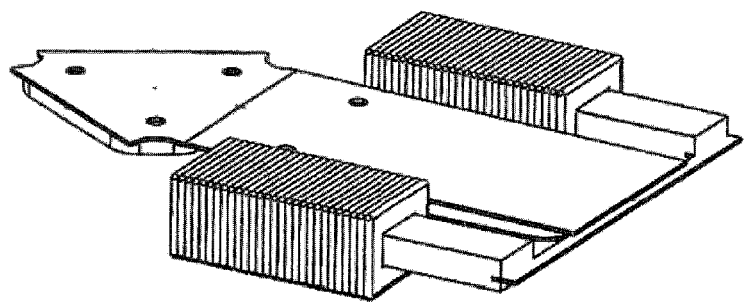
FIGS. 39A to 39C shows an exemplary implementation of a linear motor to move a slider for a delta leg having two coils on each side of the slider, implemented as inductive actuators with coils, with FIG. 39A showing the leg in a folded state from a top perspective view, FIG. 39B showing the leg in a folded state from a top view, and FIG. 39C showing the leg in an extended, expanded or protruded state with the actuation element having been pulled inside the two coils.
Figure 39B:
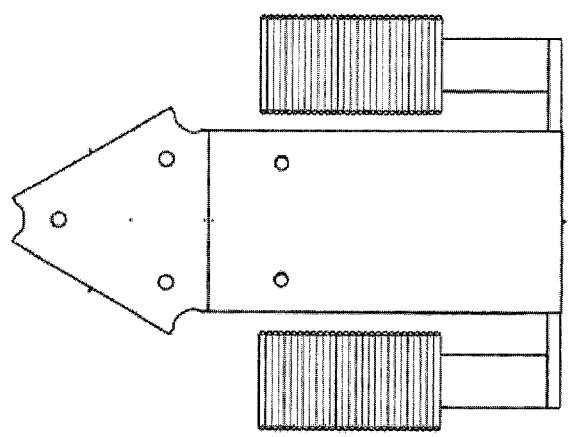
Figure 39C:
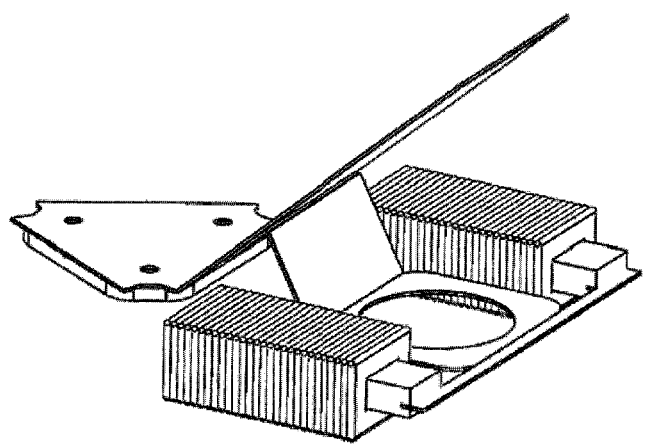
Figure 39D:
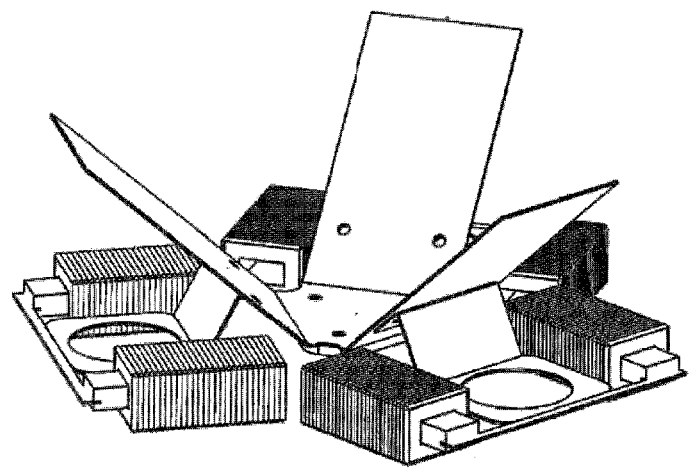
FIG. 39D shows the three legs in an extended state, each leg interconnected with each other via the triangularly-shaped attachment base. Coils are shown for representation purposes and may not be to scale, for example, the coils can be implement to be substantially thinner to be fully accommodated in the layered structure, for example inside the rail layers.
Figure 40A:
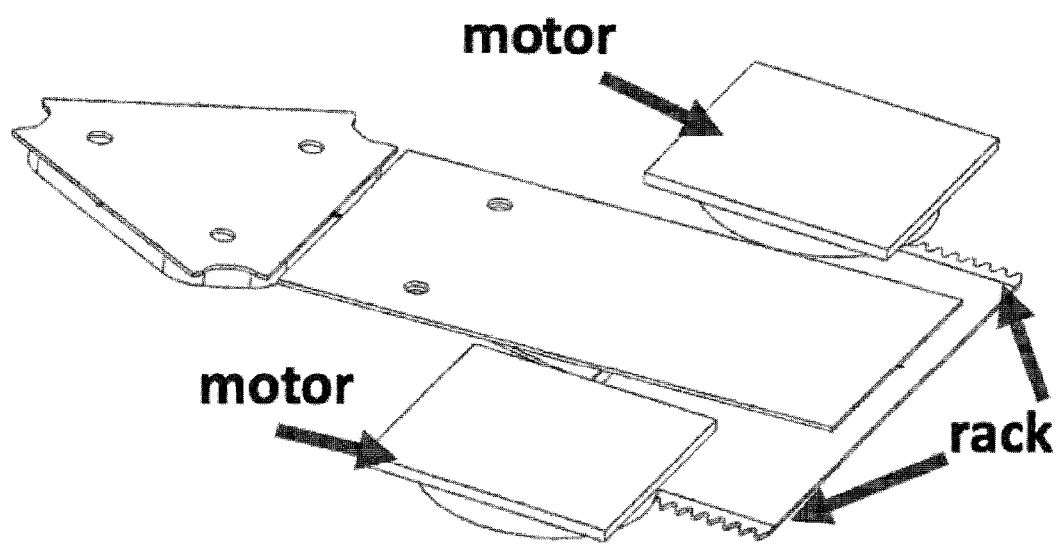
FIGS. 40A to 40F shows another exemplary implementation of a linear actuation mechanism to move a slider for a delta leg, based on a flat rotative motor that engages with teeth or dents of a rack in a rack-and-pinion configuration, with FIG. 40A showing the leg in a folded state from a top perspective view, with two motors having a low profile arranged on each side of slider, engaging with a rack mechanism that is operatively attached to each side of the slider, FIG. 40B showing the leg in an extended or protruded state with the rack, not showing the motors for illustration purposes to show the rack, FIG. 40C showing the leg in an extended or protruded state with the rack and the motors engaging with the rack, and FIG. 40D showing an exemplary planar rotative motor having a low profile, and FIG. 40E showing the rack-and-pinion actuation mechanism in a bottom view, on both side of slider, pinion of the rotative shaft of motor engaging with a corresponding rack.
Figure 40B:
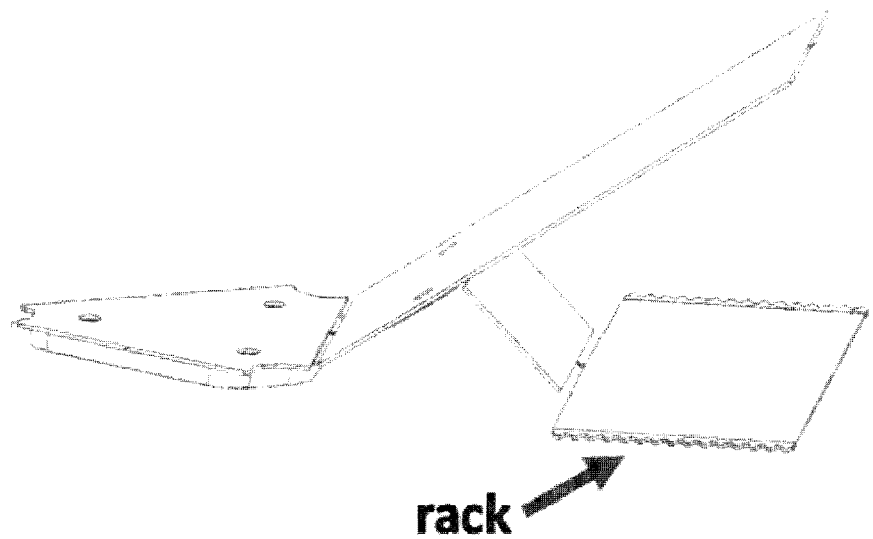
Figure 40C:
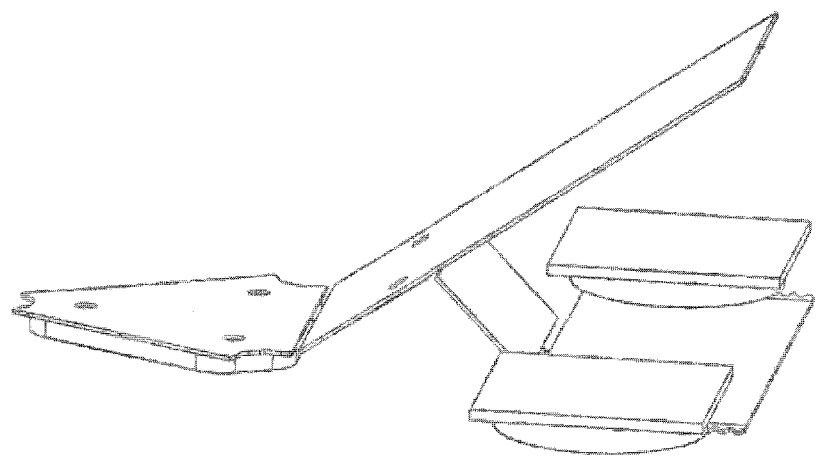
Figure 40D:
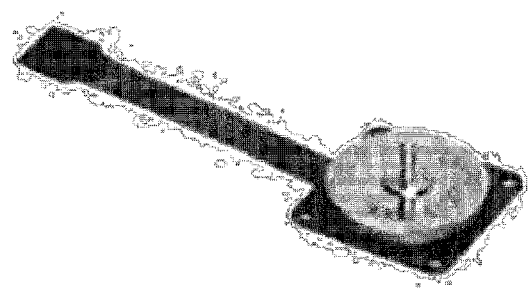
Figure 40E:
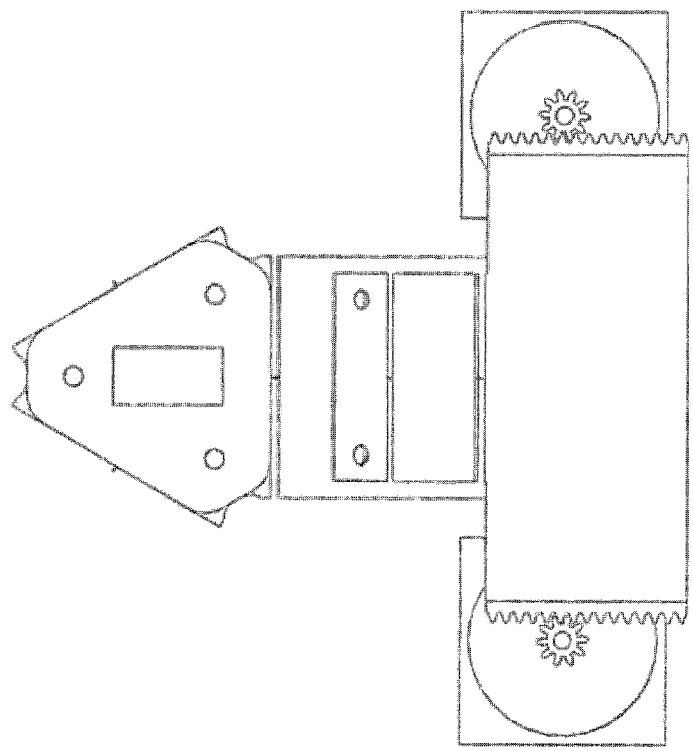
Figure 40F:
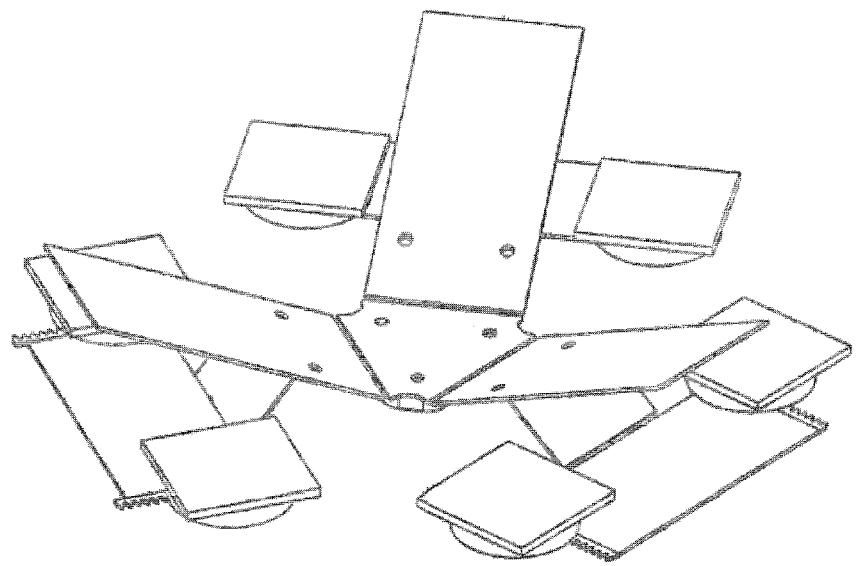
Figure 41A:
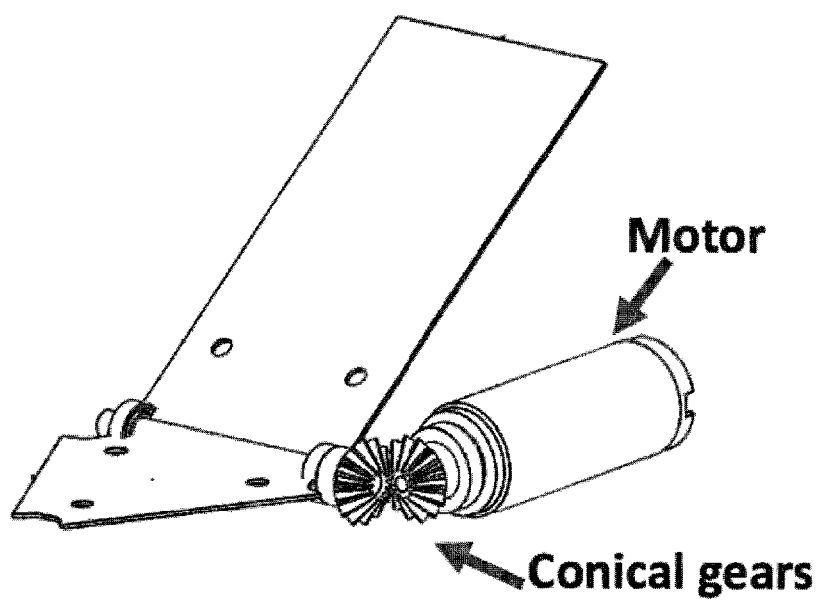
FIGS. 41A to 41F shows another exemplary implementation of an actuation mechanism to move the slider via rotative motion of a motor, the motor engaging via a pair of conical gears with each rotative axis between the triangularly-shaped attachment base and each of the legs, FIG. 41A showing one leg with triangularly-shaped attachment base with a motor that engages at the pivot axis between the leg and the base via conical gears, FIG. 41B showing a top view of the same, FIG. 41C showing a side perspective view with the leg fully retracted or collapsed, FIG. 41D showing all three legs in a perspective view actuated by motors via the pivot axes, FIG. 41E showing a top view of the same, and FIG. 41F showing all three complete delta legs with top centerpiece and attachment base.
Figure 41B:
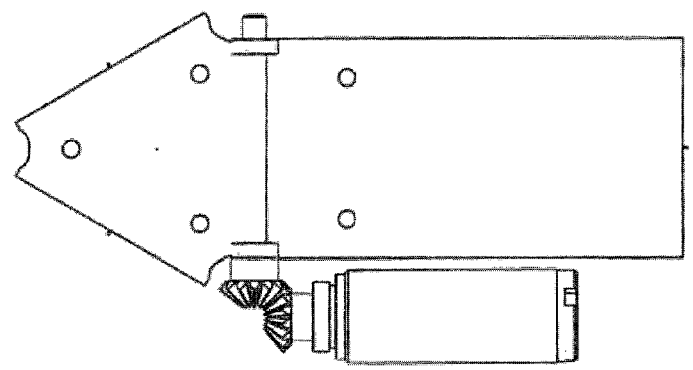
Figure 41C:
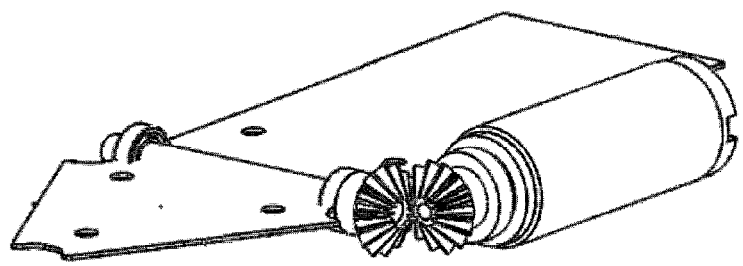
Figure 41D:
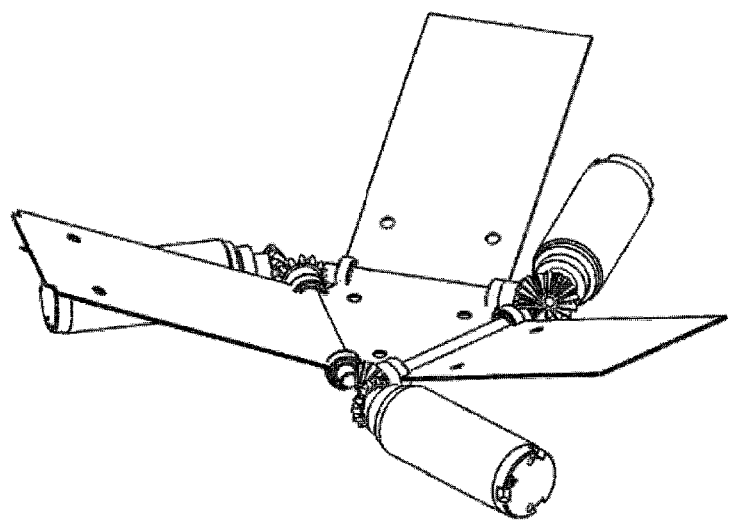
Figure 41E:
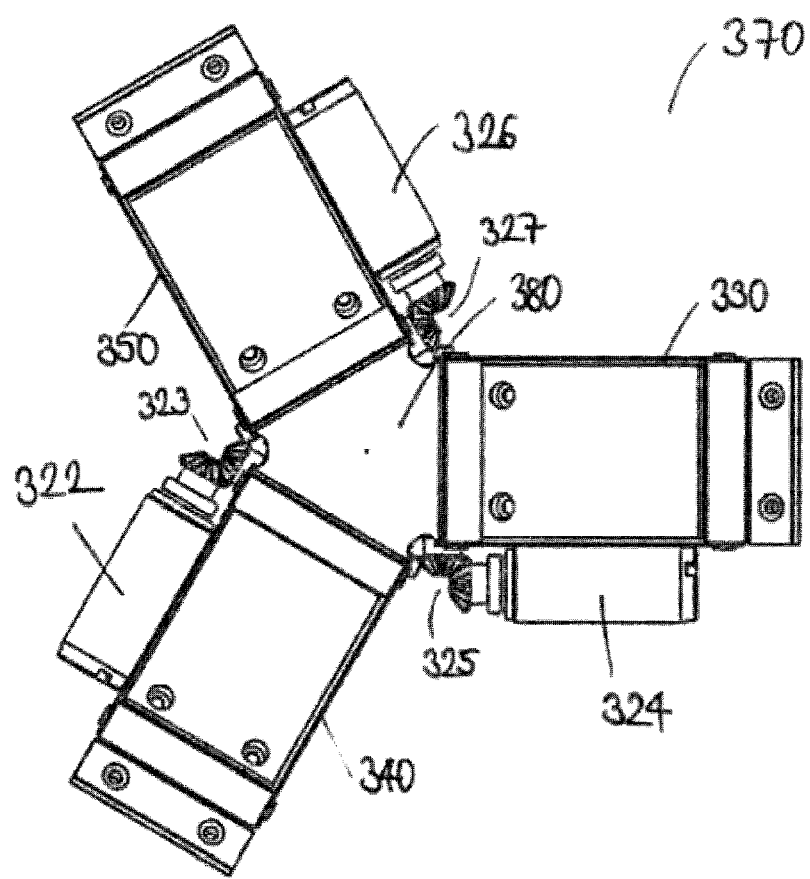
Figure 41F:
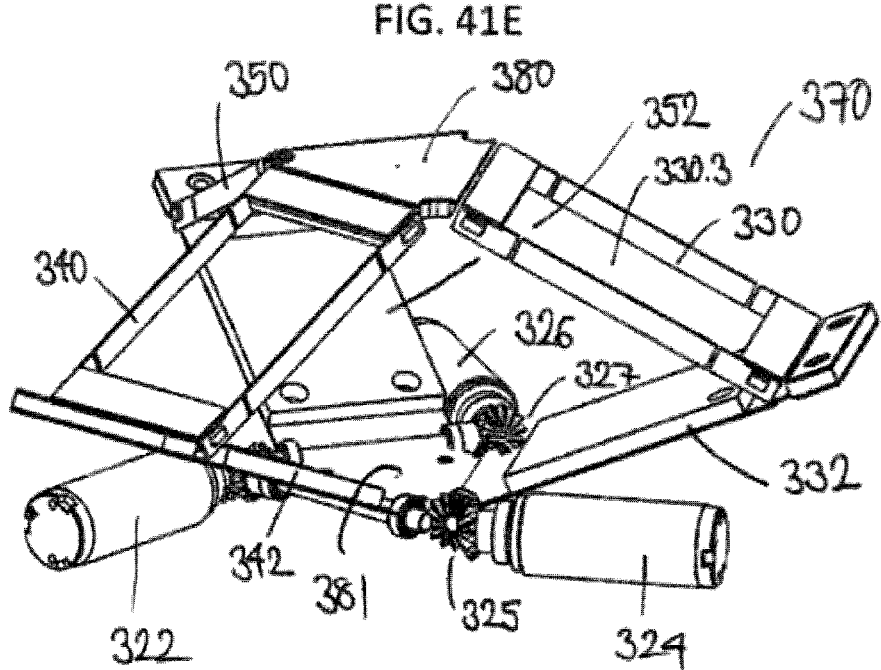
Figure 42A:
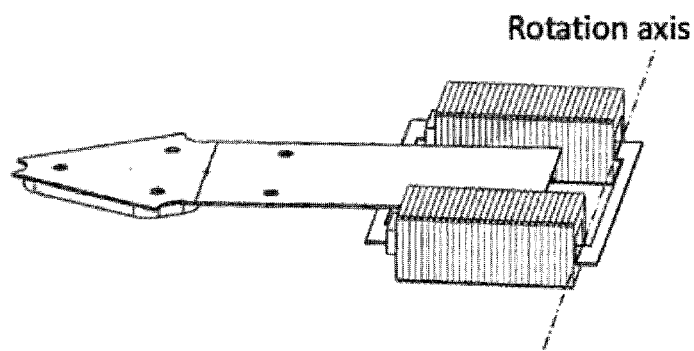
FIGS. 42A to 42G shows another exemplary implementation of an actuation mechanism for the planar delta robot, on this variant, the linear sliders are replaced with a linear actuation device that is capable of pivoting (hinged) with the linear motion, in a hinge-slider crank mechanism, with FIGS. 42A to 42C showing one leg in a collapsed, retracted state, with inductive actuator being fully retracted, and leg and actuator being parallel to base, from a perspective view (FIG. 42A), a top view (FIG. 42B), and a side view (FIG. 42C), and FIG. 42D showing a perspective view of one leg in an extended state, with inductive actuator being extended and leg protruding upwards, FIGS. 42E, 42F and 42G showing a schematic representation of the linear movement that transforms into a rotative movement of the leg.
Figure 42B:
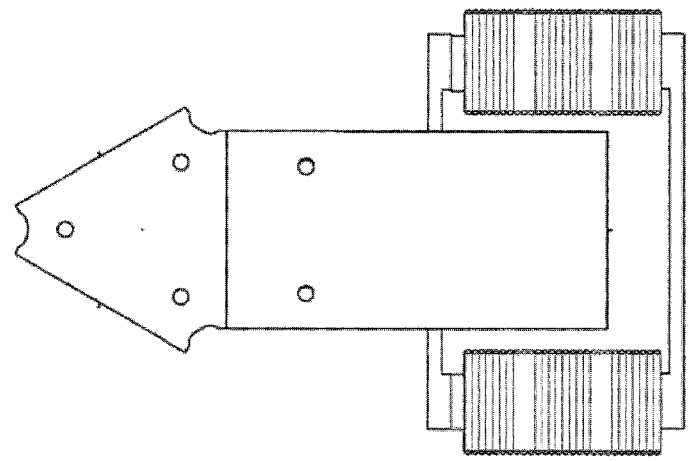
Figure 42C:
Figure 42D:
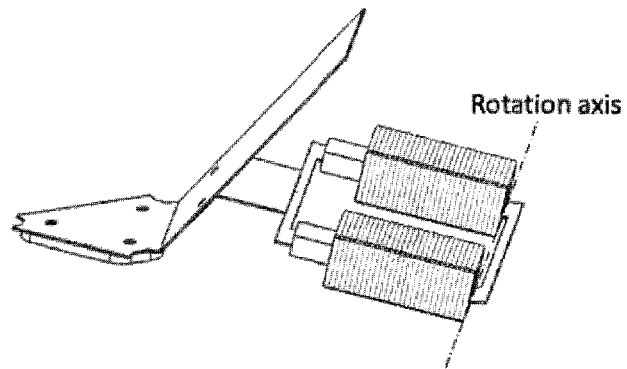
Figure 42E:
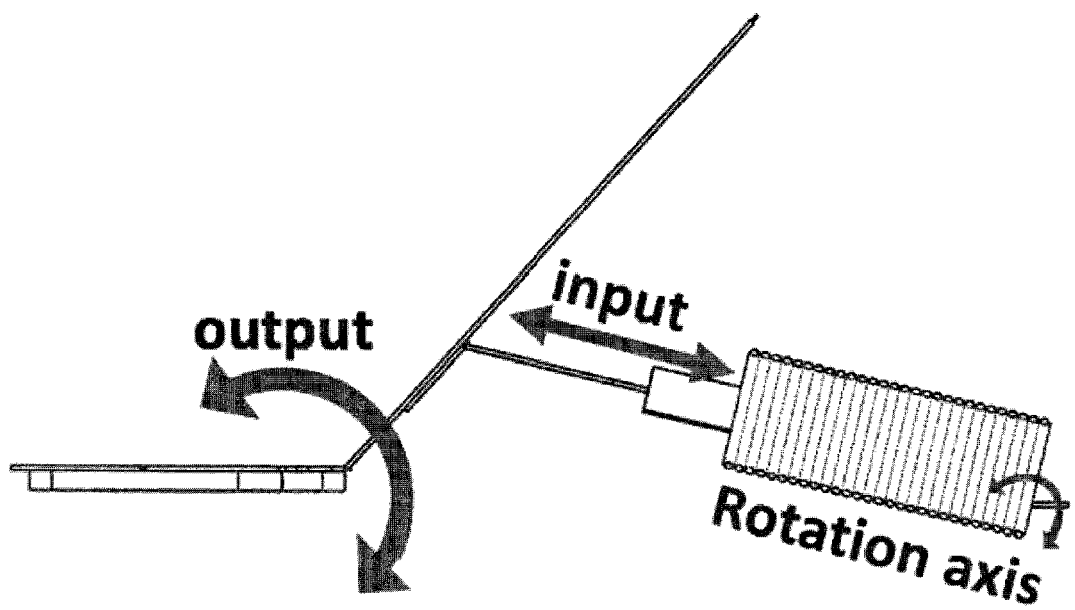
Figure 42F:
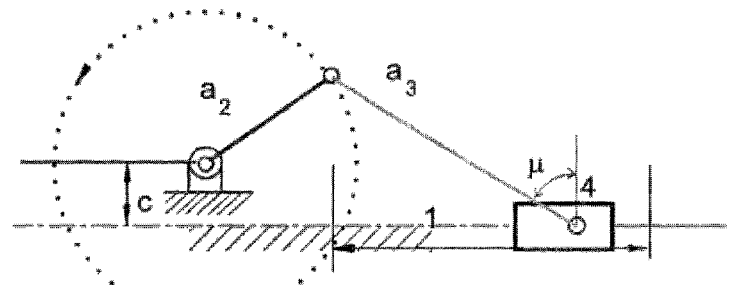
Figure 42G:
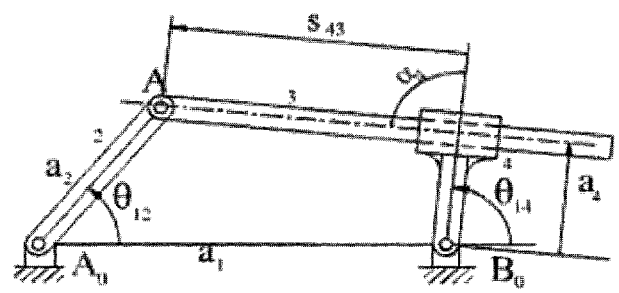

The cover layer, the rail layer, and the sensing layer form the planar base of the planar delta robot 300, and the actuation structure is formed by the delta layers. The actuation structure formed by the delta layers is shown in folded state in FIG. 36, while FIG. 38A shows the actuation structure in an expanded state for mechanical actuation of the planar delta robot. The actuation structure includes a fixed center base that is substantially triangular, three movable legs, including a lower leg and an upper leg, and a force transmission device. In this variant shown, the force transmission device includes an actuated leg that is pivotably attached to lower leg. The movable top platform or centerpiece, that can be actuated with three degrees of freedom, is pivotably attached to an end edge of each one of the upper legs. Moreover, each upper leg is pivotably connected to a corresponding lower leg.

Figure 37A:
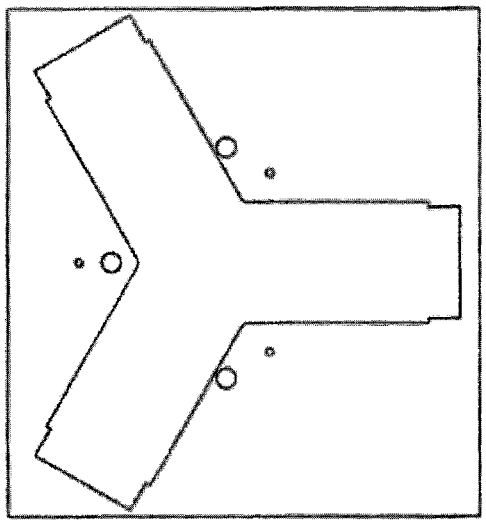
FIGS. 37A to 37E shows a top perspective view of each layer shown in FIG. 36, shown to scale, with including the cover layer having three openings arranged in a star configuration in FIG. 37A, the actuation transmission layers in FIG. 37B configured to create linear movement onto each leg, also arranged in a star configuration.
Figure 37B:
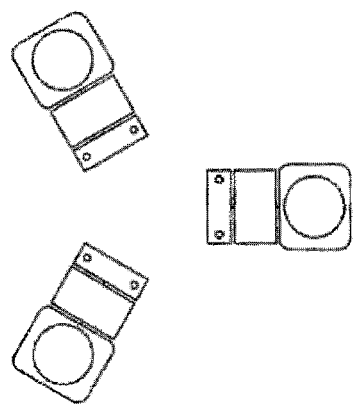
Figure 37C:
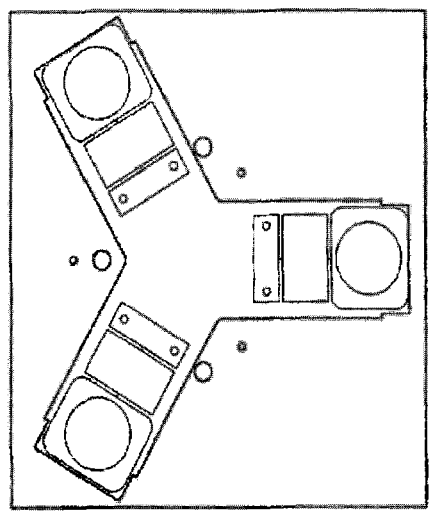
Figure 37D:
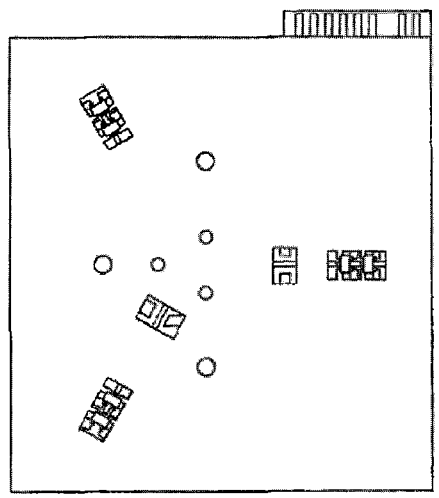
Figure 37E:
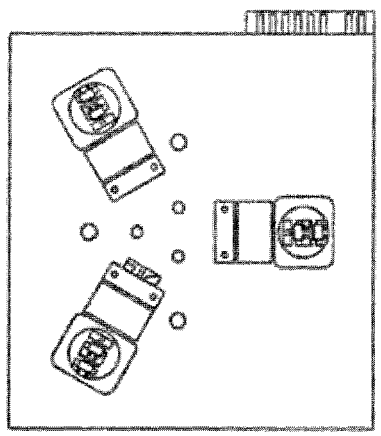

The actuation transmission layers shown in FIGS. 36, 37B, and 37E are the elements that form a part of the linear transmission motor 322, 324, 326 to provide for a linear movement to the sliders 331, 341, 351. For example, these layers can include planar coils that interact with a permanent magnet on the sliders, to form a mechanical transmission mechanism for each of the three legs. The sensing layers can include additional electronics, for example a power electronics circuit, sensors, and control electronics, for example a microcontroller, to individually control three linear axes of movement of the mechanical transmission mechanisms. At the upper edge of the base plate or platform shown in FIG. 37E, a connector is shown. This connector can be electrically connected to the electric motors that provide for the liner sliding movement, and to sensors that can measure a linear position of the sliders 331, 341, 351 shown in FIG. 38A, so that the device can be connected to a controller 95 and power supply module 90, for operating the delta robot.

Next, different embodiments for providing the mechanical transmission are presented. For example, FIGS. 38A to 38D shows representations of a slider-crank mechanism to provide for linear motion that transforms into a rotative motion of the delta leg. To transmit the motion from the actuators to the delta, a slider-crank mechanism can be obtained with a specific design of the actuation layer. A first link 339 is pivotably connected to a lower section of bottom leg 332, the length thereof being represented as $a_3$ in the FIG. 38C. The lower edge of the bottom leg 332 is also pivotably connected to fixed center base 381, the lower edge part of bottom leg 332 being represented as $a_2$ in FIG. 38C. Not shown is the upper leg 330, that is also pivotably connected to bottom leg 332. This structure of FIG. 38B forms a prismatic joint that leaves one (1) degree of freedom. By applying an input force to first link 339, along its degree of freedom, a torque is transferred to the delta bottom leg joint. This mechanical principle can be applied to all legs via links 339, 349, 359, that connected to respective slider 331, 341, 351.

Next, with FIGS. 39A to 39D, an implementation for the mechanical transmission is shown, using laterally placed voice coils for the mechanical transmission. To actuate a leg of the delta robot 300, an actuation method is provided by using voice-coil actuators placed laterally respect to the delta leg. The voice coils define, as well, prismatic joints used for leg kinematics. The input force to the first link 339 and bottom leg 332 can be applied using inductive actuators with moving magnet or moving coil. The inductive actuator shape can be optimized to fit the space available and flat inductive actuators can be used to minimize device thickness. Multiple actuators can be placed in on the sides of the leg for magnifying actuation force and increase device compactness.

With FIGS. 40A to 40F, another implementation of the mechanical transmission is shown, based on a rack-and-pinion mechanism and flat rotative motors. To actuate a slider of the leg a second actuation method can be implemented by using electric motors and a pinion for acting on a rack for linear transmission of the motion. The input force to the link 3 in the mechanical transmission 1 can be applied using rotatory motors that are flat for the planar design and rotating a pinion as a gear, and the transmission can be performed using pinion/gear and a rack. Multiple actuators can be placed in on the sides of the leg for magnifying actuation force and increase device compactness.

FIGS. 41A to 41F shows another implementation of the mechanical transmission, using rotative motors 322, 324, 326 that act on a pivot point, formed by bevel gear joint 323, 325, 327. To actuate the platform a second actuation method is defined by using electric motors 322, 324, 326 that using a couple of conical gears transmit the motion to bottom legs 332, 342, 352 of the delta. The input force to the bottom delta leg can be obtained by direct coupling with an electrical rotatory motor 322, 324, 326. The transmission can employ a gear joint 323, 325, 327 having beveled or conical gears for rearranging motors positions and increase device compactness. Also, in a variant, the motors can be arranged to directly connected to a lower section of bottom legs 332, 342, 352 without the use of any gears.

FIGS. 42A to 42G show another implementation of the mechanical transmission, using a hinge-slider-crank mechanism and actuation. To transmit the motion from the actuators to the delta, this transmission method is defined using a hinge-slider-crank arrangement, that transforms a linear movement into a rotation of the leg. With this mechanism the actuator can change inclination improving the force transmission. The Hinge-Slider-crank mechanism is obtained with a specific design of the actuation layer. A first link is connected to the bottom delta leg; this link is directly interfaced to the inductive actuators. The inductive actuators are connected to the base of the device with a rotatory link. By applying an input force to the first link, a torque is transferred to the delta bottom leg joint and the inductive actuator changes inclination for an improved force transmission.

Figure 43A:
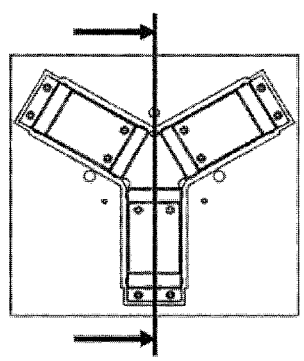
FIGS. 43A to 43C show an aspect of the present invention, using a magnetic locking device for holding the planar delta robot in a collapsed or folded state, and a device to detach the legs from the folded state for operation, with a first permanent magnet pair having a permanent magnet in the centerpiece and in the attachment base, and second permanent magnet in a handle, with FIG. 43A showing a top view to indicate the following cross-sectional views, FIG. 43B showing a cross-sectional perspective view showing the pair of permanent magnets creating the first attachment force to maintain the planar foldable delta robot in a folded state, FIG. 43C showing several cross-sectional and perspective views showing the handle with a larger permanent magnet to create a second attachment force between the handle and the centerpiece that is stronger than the first attachment force, for manually pulling the planar delta robot into an operable state.
Figure 43B:
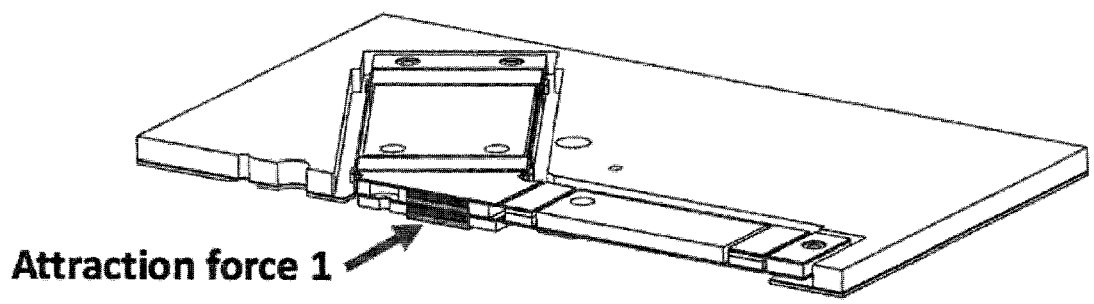
Figure 43C:
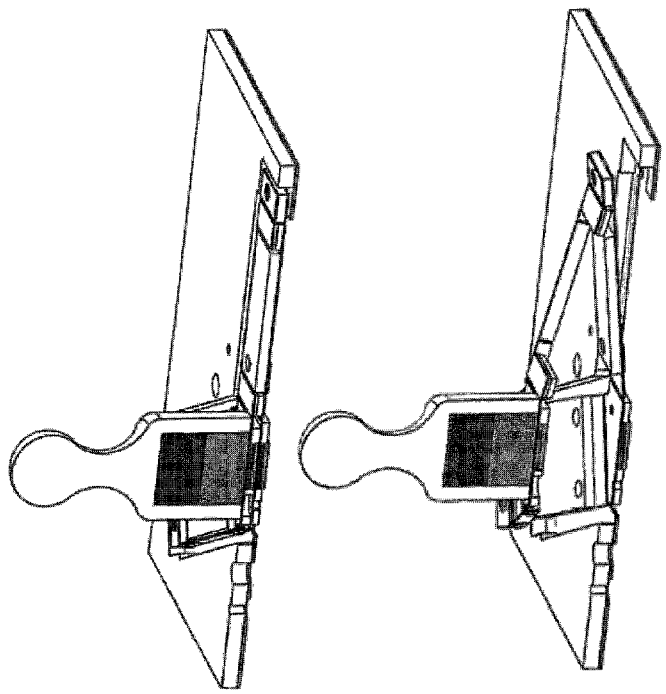
Figure 43C:
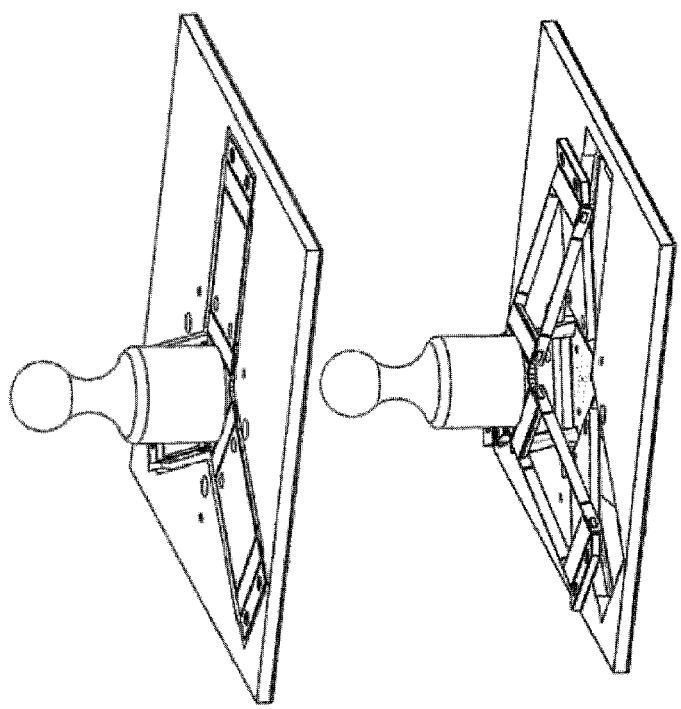

FIGS. 43A to 43C show another aspect of the present invention, showing a handle that is equipped with a permanent magnet to extract the actuation mechanism from the folded, collapsed state of the delta robot. In order to keep the delta collapsed whenever folded, even when the delta robot is subject to shock and other forces, permanent magnets are used. Permanent magnets with aligned magnetization axis are placed in the top and base platform of the delta. These two magnets exchange a force F1 that keeps the delta folded. The detachment is performed using a hand held magnet in handle or other type of manually operable device to pull on the actuation mechanism, that when in contact with the top centerpiece generates a magnetic force F2 higher than the force F1 that keeps the delta folded. The permanent magnet 1 can be embedded in the base plate of the delta mechanism, as shown in FIG. 43B. The permanent magnet 2 is embedded in the top plate or centerpiece of the delta mechanism. When the delta is in 2D flat configuration, magnet one and 2 exert an attraction force F1 that keeps the delta flat. When magnet 3 is placed on top of the delta it generates a force F2 much higher than F1. By holding with the hand magnet 3, it is possible disengage the delta from magnet 1 and undock the system. By holding with the hand magnet 3 it is possible to move the delta in 3D within its workspace.

Figure 44:
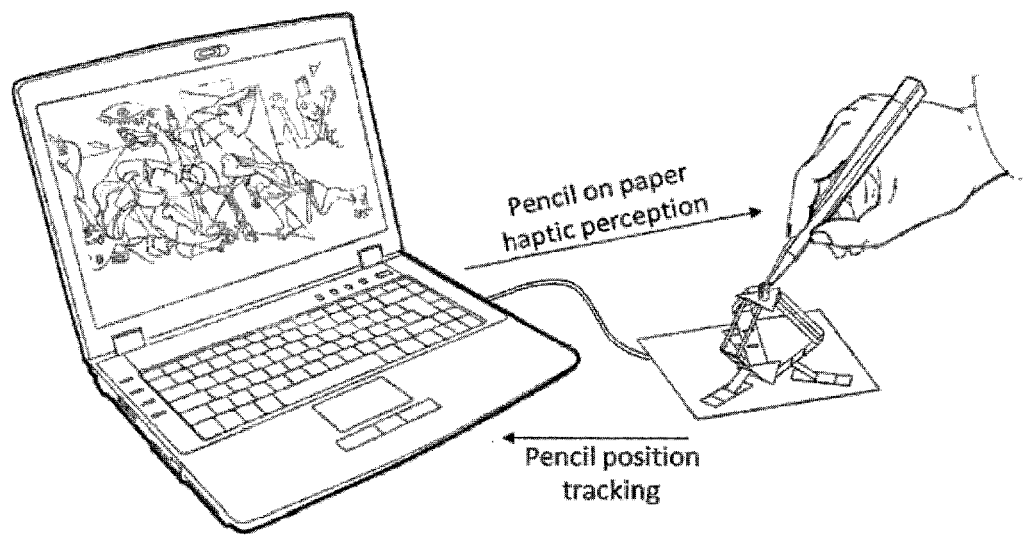
FIG. 44 shows a perspective view of another aspect of the present invention, showing a computerized drawing system including a portable computer, a foldable planar delta robot operatively connected to the computer, and a pencil or pointer device that can be used to move the centerpiece of the foldable planar delta robot, via a coupling mechanism or docking system to couple the tip of the pencil to the centerpiece of the delta platform.
Figure 45:
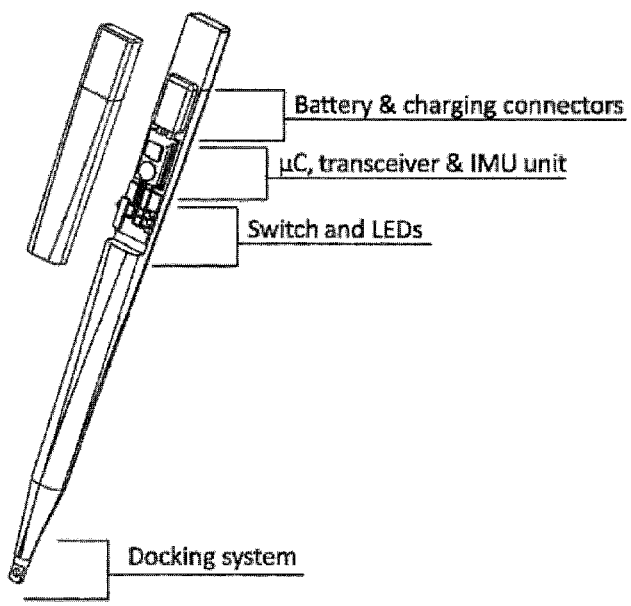
FIG. 45 shows a perspective exploded view of the elements of the pencil or pointer device of the computerized drawing system of FIG. 44.

Next, FIGS. 44 and 45 show a configuration of the delta robot as computerized drawing system, for example a digital drawing platform. A digital drawing platform can be set using the foldable delta as endpoint of an electronic pen, the foldable delta being interfaces with a computer via a cable, for example a USB cable. The foldable delta can interact with the user, assisting during drawing, giving the perception of using different tools on different materials or enabling 3D drawing.

As shown in FIG. 45, the electronic pen equipped with motion sensors (IMU) is interfaced with the top plate of the delta. A docking system between the centerpiece of the delta robot and the pen or other type of pointing tool allows forces exchange between the delta and the pen. The delta robot can transfer to the human hand haptic information as function of user position in space. By holding with the hand magnet 3 it is possible to move the delta in 3D within its workspace.

Figure 46A:
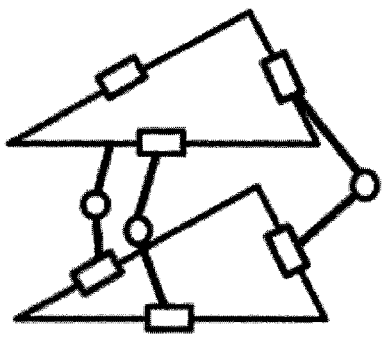
FIGS. 46A-46C shows different schematic perspective views of an origami-mechanics pushbutton parallel platform, using a fully foldable structure, with FIG. 46A showing a schematic representation of the revolute joints and the spherical joints, and three foldable legs that operatively connect a base plate to a movable platform, FIG. 46B showing two variants, the variant on the left showing the foldable legs implemented with tiles that bend externally to the triangularly-shaped movable platform, and the variant on the right showing the foldable legs bending internally to the hexagonally-shaped movable platform, and FIG. 46C showing the degrees of freedom that are possible with the origami-mechanics pushbutton parallel platform, including a frontal rotation or tilt, a lateral rotation or tilt, and a linear motion or squeeze in a direction that is perpendicular to the base, according to another aspect of the invention.
Figure 46B:
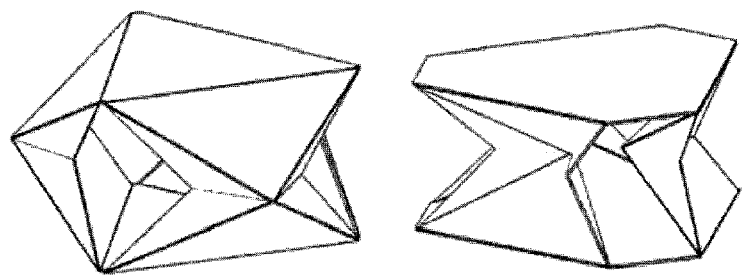
Figure 46C:
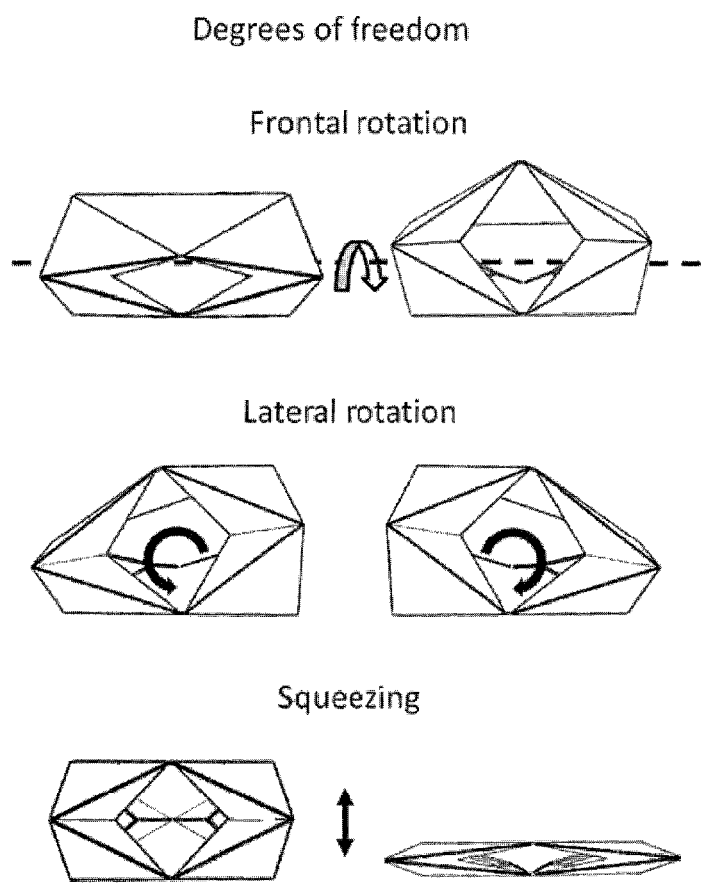

With respect to FIGS. 46A-46C, different schematic perspective views of an origami-mechanics pushbutton parallel platform are shown, using a fully foldable structure. FIG. 46A shows a schematic representation of the revolute joints and the spherical joints, and three foldable legs that operatively connect a base plate to a movable platform. The origami-mechanism pushbutton parallel platform can operate at three (3) degrees of freedom, with two (2) rotational or pivotable movements, and one (1) translation or linear movement. The origami-based mechanism can be described as a parallel movable platform with three (3) spherical kinematics chains. A similar arrangement has been described in Salerno M., Zhang K., Menciassi A., Dai J. S., "A novel 4-DOFs origami enabled, SMA actuated, robotic end-effector for minimally invasive surgery," Robotics and Automation (ICRA), 2014 IEEE International Conference on May 31, 2014, pp. 2844-2849, and in Salerno, M., Zhang, K., Menciassi, A., and Dai, J. S, "A novel 4-DOF origami grasper with an SMA-actuation system for minimally invasive surgery," IEEE Transactions on Robotics, 2016, Vol. 32 No. 3, pp. 484-498, and Zhang, K., Fang, Y., Fang, H. and Dai, J. S., "Geometry and constraint analysis of the three-spherical kinematic chain based parallel mechanism." ASME Journal of Mechanisms and Robotics, 2010, Vol. 2, No. 3, p. 031014, all three publications herewith incorporated by reference in their entirety.

FIG. 46B shows two variants of the origami-mechanism that can be used for the pushbutton parallel platform, in the variant on the left showing the foldable legs implemented with tiles that bend externally to the triangularly-shaped movable platform, and the variant on the right showing the foldable legs bending internally to the hexagonally-shaped movable platform.

FIG. 46C showing the degrees of freedom that are possible with the origami-mechanics pushbutton parallel platform, having the tiles that bend externally with respect to the movable platform, including a frontal rotation or tilt, a lateral rotation or tilt, and a linear motion or squeeze in a direction that is perpendicular to the base, according to another aspect of the invention. For example, when the origami-mechanism of the pushbutton parallel platform is in collapsed configuration, it is possible that the there are no mechanism parts visible when observed from a side view when the origami robot is in collapsed configuration, as all the parts can be accommodated into an opening of the base platform, some mechanism parts are visible from the top view and they are collapsed the opening of the base platform. The lateral tiles forming the legs of the origami-mechanism of the pushbutton parallel platform can be arranged externally to the origami-mechanism of the pushbutton parallel platform, for example external to the movable platform, or internal to the movable platform, minimizing volume expansion when squeezed or moved in a direction that is perpendicular to an upper surface of the base platform.

Figure 47:
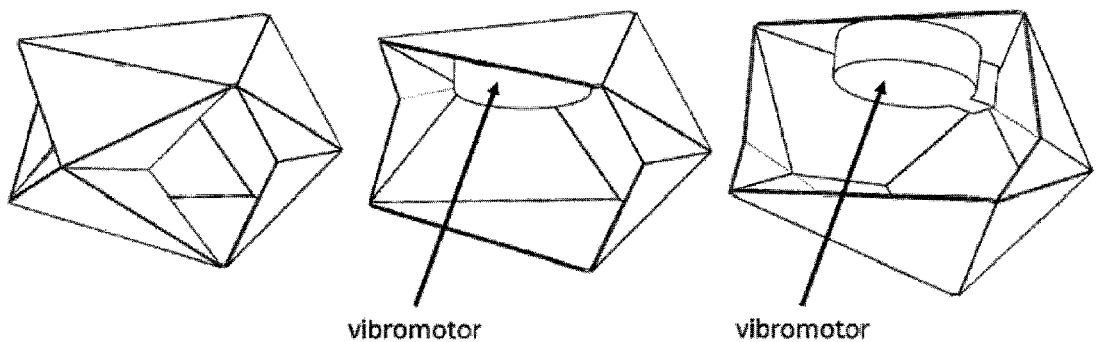
FIG. 47 shows the exemplary arrangement of a vibromotor or a vibration generation device arranged underneath the movable platform or centerpiece of the pushbutton parallel platform, operatively connected to the controller, configured to generate vibrations to the movable platform, to provide for a vibrational feedback to a user that is touching the centerpiece.

FIG. 47 shows the exemplary arrangement of a vibromotor or a vibration generation device arranged underneath the movable platform or centerpiece of the pushbutton parallel platform, operatively connected to the controller, for example the controller 95 as exemplarily shown in FIG. 1B, configured to generate vibrations to the movable platform, to provide for a vibrational feedback to a user that is touching the movable platform. The vibromotor can be attached thereto or integrally formed with the movable platform.

Figure 48A:
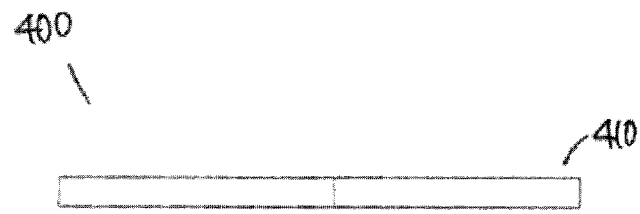
FIGS. 48A-48C show different schematic views of an origami-mechanism pushbutton parallel platform in a fully folded or collapsed state, with FIG. 48A showing a side view, FIG. 48B showing a top perspective view, and FIG. 48C showing a top view, showing upper parts of the legs and the hexagonally-shaped movable platform.
Figure 48B:
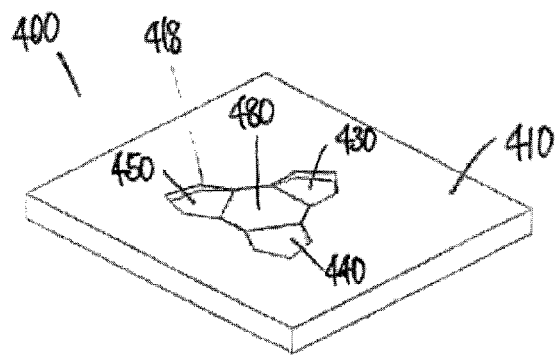
Figure 48C:
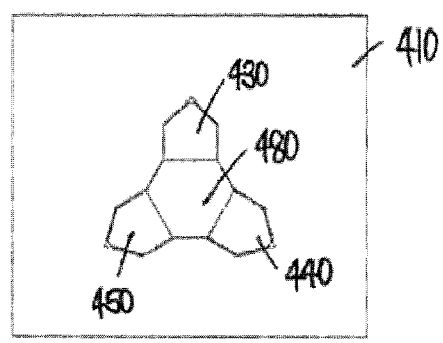

FIGS. 48A-48C show different schematic views of an origami-mechanism pushbutton parallel platform 400 in a fully folded or collapsed state. For example, with FIG. 48A, a side view is shown where none of the parts that form the origami-mechanism 470 for the pushbutton parallel platform 400 are visible, as they are all accommodated in an opening 418 of the base platform 410, FIG. 48B shows a top perspective view where the star-shaped opening 418 can be seen, accommodating the three upper legs 430, 440, 450 and the hexagonally-shaped moveable platform 480 is shown, where an upper surface of the hexagonally-shaped moveable platform 480 is flush or recessed as compared to an upper surface of the base platform 410. FIG. 48C shows a top view thereof, and it can be seen that when the origami-mechanism 470 is collapsed or folded, the gaps in the star-shaped opening 418 formed between the base platform 410 and upper legs 430, 440, 450 are very small, i.e. preferably smaller than 0.5 mm, so that the legs cannot be pinched with the fingers and moved into the expanded three-dimensional configuration without the use of actuation by the motors that actuate the legs of the robot 400, or other activation element designed for this purpose, i.e. magnetic interaction.

Figure 49A:
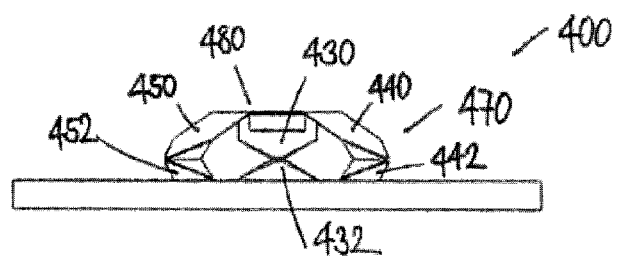
FIGS. 49A-49C show different schematic views of an origami-mechanism pushbutton parallel platform in an expanded, operational state, with FIG. 49A showing a side view, FIG. 49B showing a top perspective view, and FIG. 49C showing a top view, showing upper parts of the legs and the hexagonally-shaped centerpiece extended away from the base.
Figure 49B:
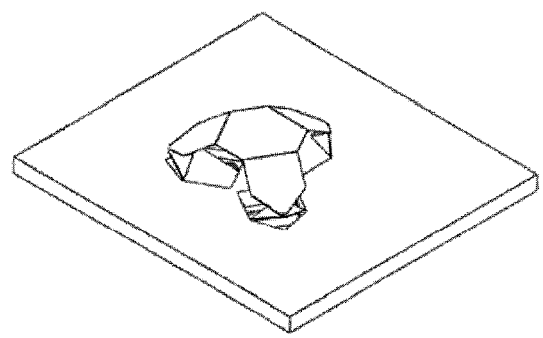
Figure 49C:
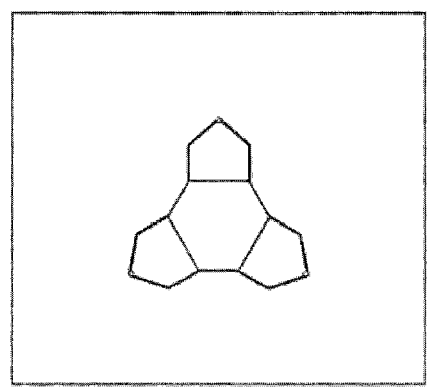

FIGS. 49A-49C show different schematic views of an origami-mechanism pushbutton parallel platform 400 in an expanded, operational state. The origami-mechanism 470 that forms the pushbutton parallel platform 400 can be configured as a push button, a joystick, or a haptic feedback operational knob, as exemplarily shown in FIG. 54. FIG. 49A shows a side view where the origami-mechanism 470 is protruding out of the base platform 410, FIG. 49B showing a top perspective view, and FIG. 49C showing a top view, showing upper legs 430, 440, 450, and the hexagonally-shaped centerpiece 480 extended away from the base platform 410.

Figure 50A:
FIGS. 50A-50D show different views of the origami-mechanism pushbutton parallel platform showing only one leg for illustration purposes, with FIG. 50A showing two side views from a first side and another second side that is arranged perpendicular to the first side, showing one leg operatively connected to the centerpiece or movable platform in a first extended position or state.
Figure 50B:
Figure 50C:
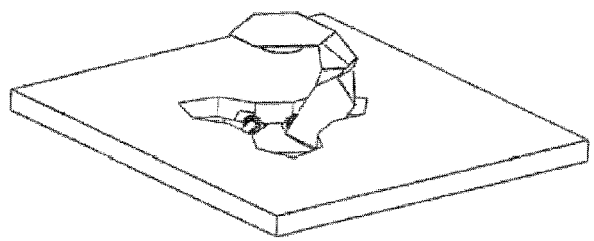
Figure 50D:
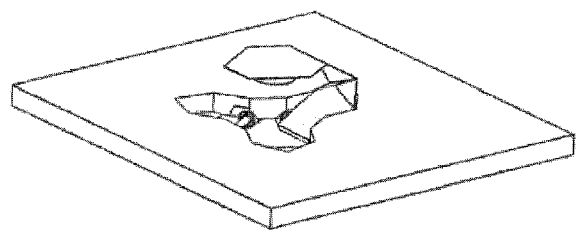

FIGS. 50A-50D show different views of the origami-mechanism based pushbutton parallel platform 400 showing only one leg for illustration purposes. FIG. 50A shows two side views from a first side and another second side that is arranged perpendicular to the first side, showing one leg operatively connected to the centerpiece or movable platform in a first extended position or state. The leg is made of a lower leg that is operatively connected to a motor, an upper leg that is pivotably connected to the lower leg, and star-shaped intermediate portion that can fold between the upper and the lower leg. The vibration motor is also shown, attached to a lower surface of the movable platform. FIG. 50B shows two side views from a first side and another second side that is arranged perpendicular to the first side, showing one leg operatively connected to the centerpiece or movable platform in a second extended position or state, being slightly less extended than the first state, FIG. 50C showing a perspective view of the first state, and FIG. 50D showing a perspective view of the second state.

Figure 51A:
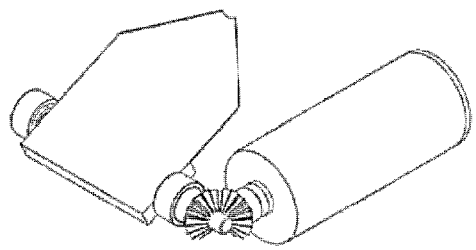
FIGS. 51A-51B show different views of a partial leg of an origami-mechanism pushbutton parallel platform for illustration purposes, in FIG. 51A showing a lower leg and its pivotable axis that is connected via a gear mechanism to a motor in a perspective view, and FIG. 51B showing a top view.
Figure 51B:
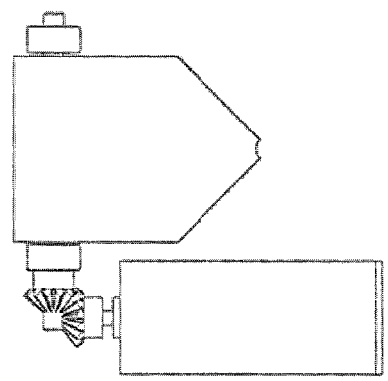

FIGS. 51A-51B show different views of a partial leg of an origami-mechanism pushbutton parallel platform 400 for illustration purposes. FIG. 51A showing a lower leg 432 and its pivotable axis that is connected via a gear mechanism 423 to a motor 422 in a perspective view, in which motor 422 is configured to pivot lower leg 432 around a rotational axis formed by the bevel gear of gear mechanism 423 attached to a lower section of the lower leg 432. FIG. 51B shows a top view, and it is shown that in this configuration, a rotational axis of motor 422 is arranged to be perpendicular to a pivot or rotational axis of lower leg 432. However, it is possible to choose a gear mechanism 423 with a different angle, or that a rotational axis of the motor 422 and the rotational axis of the lower leg 432 are arranged to coincide.

Figure 52:
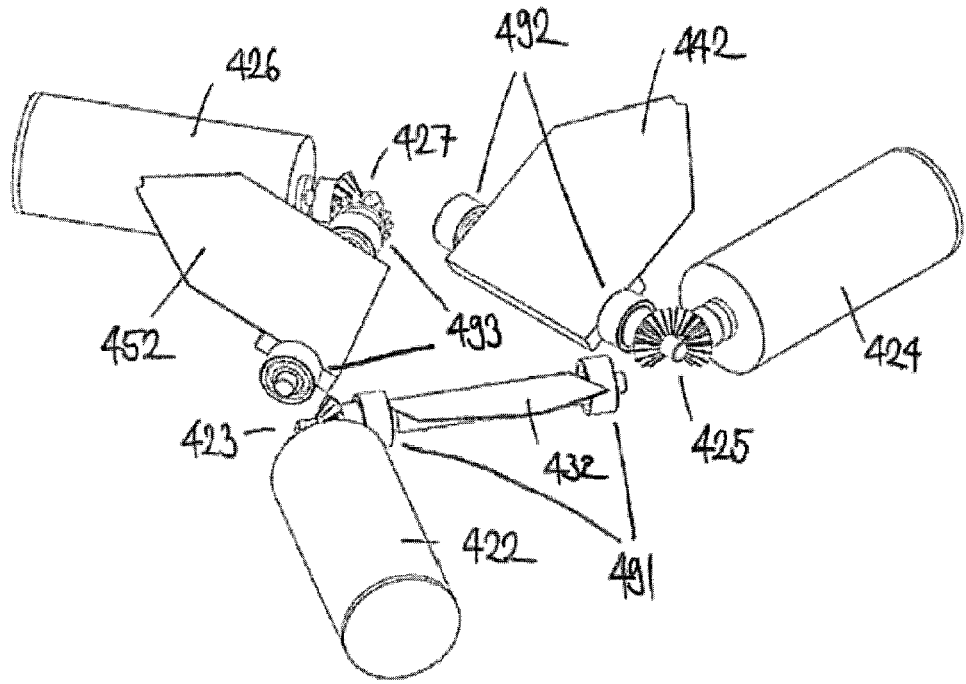
FIG. 52 shows a perspective view of three partial legs and the corresponding motors for each leg of an origami-mechanism pushbutton parallel platform, individually represented in FIGS. 51A-51B, each one of the three legs rotatable rotatable around an axis, each one of the three axes arranged towards each other in a 120° angle.

FIG. 52 shows a perspective view of three partial legs and the corresponding motors for each leg of an origami-mechanism 470 pushbutton parallel platform 400, individually represented in FIGS. 51A-51B as discussed above, each one of the three legs rotatable around an axis, each one of the three axes arranged towards each other in a 120° angle. In this figure, for representation purposes, the base platform to which the motors and the rotational axes of the three legs are attached to is not shown. As can be seen, each one of the rotational axes is operatively held by a bearing structure 491, 492, 493, arrange don each side of each one of the lower legs 432, 442, 452, respectively. These can be fixedly or removably attached to a base platform (no shown).

Figure 53A:
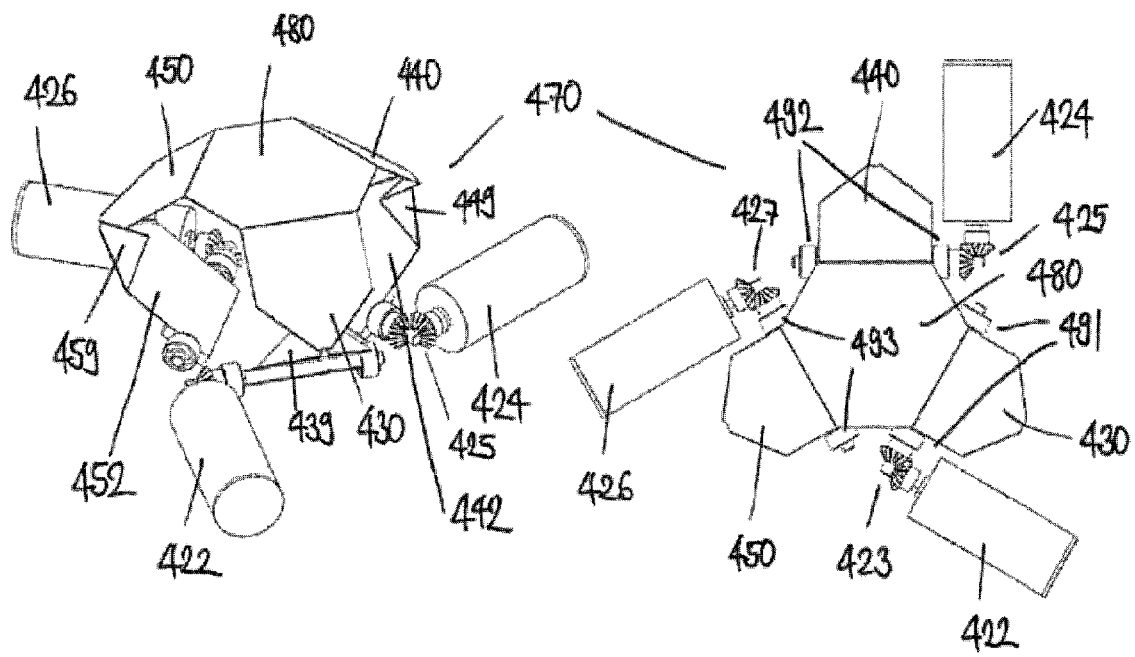
FIG. 53A-53B show perspective views of an exemplary origami-mechanism pushbutton parallel platform having a hexagonally-shaped movable platform, three motors operatively connected via a gear mechanism to three robot legs, the legs made of an upper and lower leg that are pivotably connected to each other, with FIG. 53A showing the pushbutton parallel platform with a side perspective view and a top view, the motors arranged in a horizontal arrangement for reduced thickness of the robot, and FIG. 53B showing the pushbutton parallel platform with a side perspective view with the motors arranged in a vertical arrangement where a size of the footprint of the pushbutton parallel platform needs to be reduced, while more vertical space or depth is available.
Figure 53B:
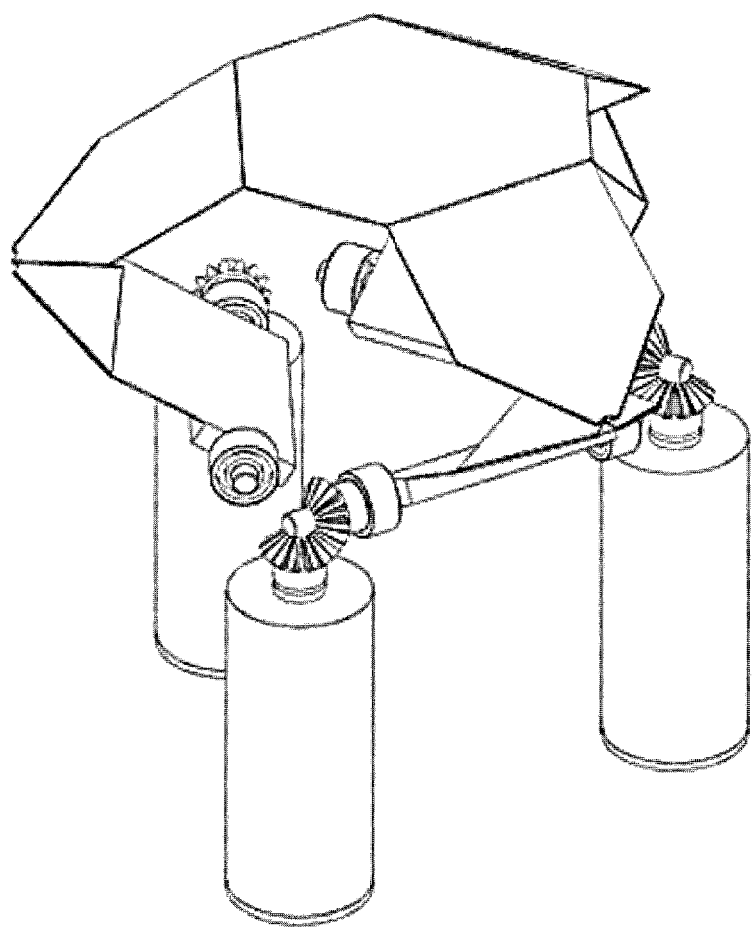

FIG. 53A-53B show perspective views of an exemplary origami-mechanism pushbutton parallel platform 400 having a hexagonally-shaped movable platform 480, three motors 422, 424, 426 operatively connected via a gear mechanism 423, 425, 427 to three robot legs, the legs made of an upper leg 430, 440, 450 and lower leg 432, 442, 452, respectively, that are pivotably connected to each other. FIG. 53A showing the pushbutton parallel platform 400 with a side perspective view and a top view, the motors arranged in a horizontal arrangement for reduced thickness of the robot. The hexagonally-shaped moveable platform 480 is shown, and each one of the longer sides that alternate with a shorter side of the hexagon are pivotably attached to an edge of an upper leg 430, 440, 450. Lower legs 432, 442, 452 are pivotably engaged to a respective upper leg 430, 440, 450, via four interconnected foldable triangles 439, 449, 459 that form an origami-type joint between the lower legs 432, 442, 452 and a respective upper leg 430, 440, 450, also referred to as the foldable middle section. As shown in FIG. 53A, each one of the foldable middle section 439, 449, 459 includes four triangularly-shaped elements, two of the triangularly-shaped elements arranged on one side and the opposite side of the upper and lower leg, the two triangularly-shaped elements on each side configured to fold towards each other, having one side of the elements pivotably attached to another side, while an opposite side is pivotably attached to the upper and lower leg, respectively.

Figure 54:
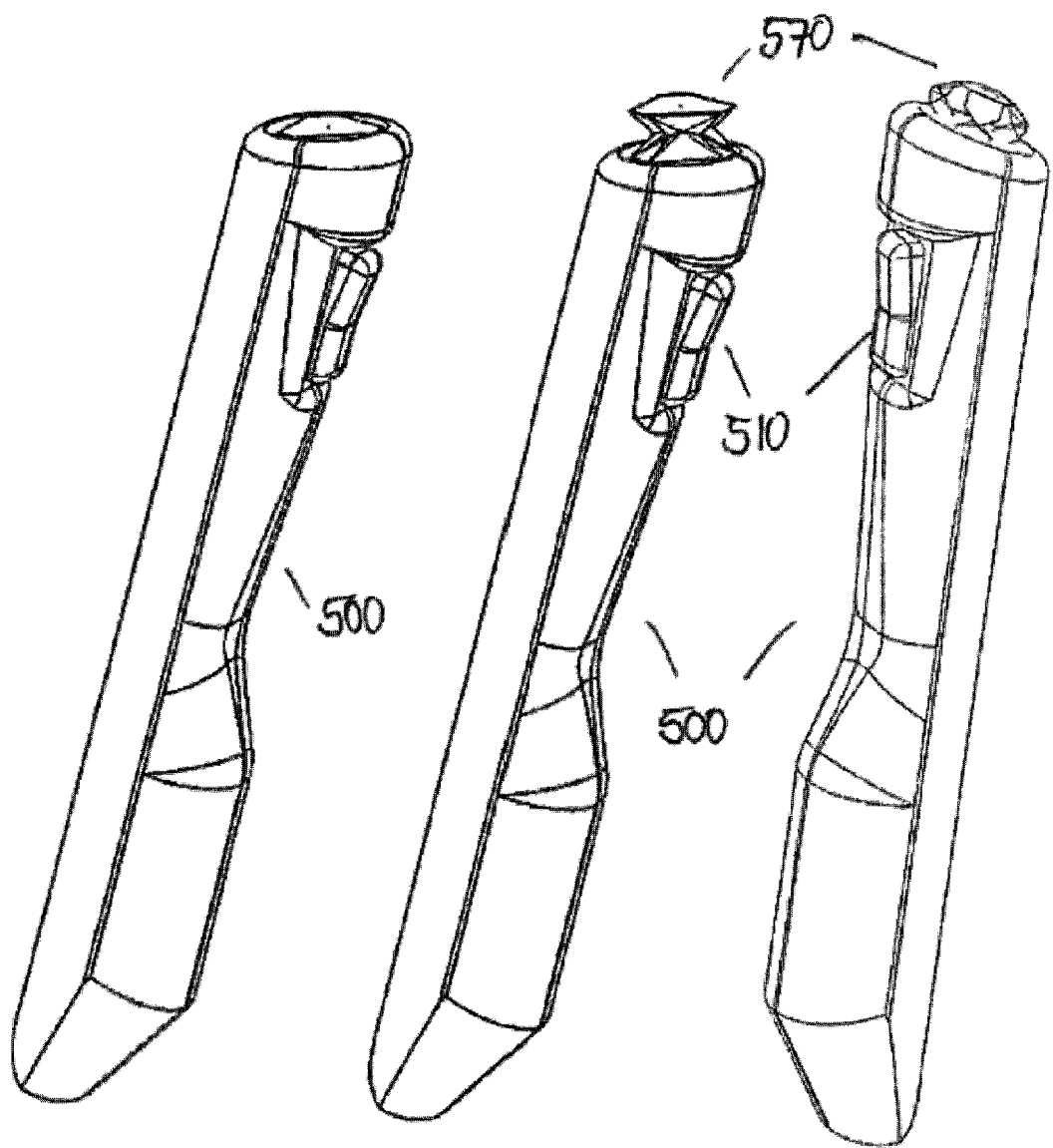
FIG. 54 show different perspective views of a handheld device including a trigger button preferably operable by an index finger of the user, and an origami-mechanism based haptic pushbutton preferably operable by a thumb of the user, for example based on the mechanism shown in FIG. 53B, according to still another aspect of the present invention.

Next, a lower edge of each one of the lower legs 432, 442, 452 is shown to form a pivotable axis, the axis being fixed by ball bearings 491, 492, 493 or another joint that are arranged on each side of the pivotable axis, and can be attached to a base platform or another type of base structure. FIG. 53B showing the pushbutton parallel platform 400 with a side perspective view with the motors 422, 424, 426 arranged in a vertical arrangement where a size of the footprint of pushbutton parallel platform 400 needs to be reduced, while more vertical space or depth is available;

FIG. 54 show different perspective views of a handheld device 500, for example a joystick, control handle, or haptic feedback operation device, including a trigger button 510 preferably operable by an index finger of the user, and an origami-mechanism based haptic pushbutton 570 preferably operable by a thumb of the user, for example based on the mechanism shown in FIG. 53B, according to still another aspect of the present invention. The handheld device 500 can be further equipped with a wireless communication interface to communicate with another electronic device, or can be equipped with a cable, for example a USB cable, to communicate to the electronic device.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

TABLE I

| Parameter Name | Measurement unit | Value |
| --- | --- | --- |
| Coil inner diameter | mm | 1 |

TABLE I-continued

| Parameter Name | Measurement unit | Value |
|---|---|---|
| Coil outer diameter | mm | 12 |
| Coil height | mm | 0.5 |
| Magnet diameter | mm | 10 |
| Magnet height | mm | 1 |
| Br | T | 1.2 |
| $\mu_r$ | / | $1.256637 \cdot 10^{-6}$ |
| $\sigma$ | S/m | $6 \cdot 10^7$ |
| $I_{coil}$ | A | 0.23 |
| N | / | 300 |

TABLE II

| Parameter Name | Measurement unit | Value |
|---|---|---|
| d | mm | 45 |
| $a_{min}$ | mm | 20 |
| $a_{max}$ | mm | 28 |
| b | mm | 12 |
| $r_p$ | mm | 6 |
| c | mm | 16 |

TABLE III

| Parameter Name | Value |
|---|---|
| P1 [g] | 11.2 |
| P2 [g] | 0.65 |
| P3 [g] | 0.15 |
| P4 [g] | 0.14 |
| Total [g] | 12.14 |

TABLE IV

| Parameter Name | Measurement unit | Value |
|---|---|---|
| $R_0$ | Ω | 126 |
| $T_0$ | °C | 20 |
| $\alpha$ | 1/°C | $3.9 \cdot 10^{-3}$ |
| $m_c$ | kg | $5.07 \cdot 10^{-5}$ |
| $c_c$ | J/(kg °C) | 385 |
| $m_k$ | kg | $1.68 \cdot 10^{-5}$ |
| $c_k$ | J/(kg °C) | 1090 |

TABLE V

| Parameter Name | Value |
|---|---|
| $\mu_{rs}$ | 0.57 |
| $\mu_{rd}$ | 0.343 |
| C [mN] | 2.6 |
| Q | 0.7 |

The invention claimed is:

1. A parallel platform system, comprising:

a planar base having an opening structure with a center opening and three openings arranged in a star configuration around the center opening;

an actuation structure including three movable legs and a movable platform, the movable platform rotatably attached to each one of the three movable legs; and three mechanical transmission mechanisms to individually actuate a corresponding one the three movable legs, wherein each movable leg includes an upper leg pivotably attached to the movable platform, a lower leg operatively attached to a respective one of the mechanical transmission mechanism for departing a rotation to the lower leg relative to the planar base, and pivotably attached to the planar base, wherein in a folded state, the movable legs of the actuation structure and the movable platform are arranged in the opening structure, wherein in an expanded state, the three movable legs protrude out of the opening structure to move the movable platform with one translational degree of freedom and two rotational degrees of freedom by the three mechanical transmission mechanisms, and wherein each movable leg includes a foldable middle section pivotably connected to a respective one of the upper legs and the lower legs.

2. The parallel platform system according to claim 1, further comprising:

a vibromotor arranged on the movable platform.

3. A joystick having a parallel platform system according to claim 1.

4. A haptic device having a parallel platform system according to claim 1.

5. The parallel platform system according to claim 1, wherein the foldable middle section includes four triangularly-shaped elements, two of the triangularly-shaped elements arranged on each side of the upper and lower leg, the two triangularly-shaped elements on each side configured to fold towards each other.

6. The parallel platform system according to claim 1, wherein the lower leg is also pivotably attached to the upper leg.

7. The parallel platform system according to claim 1, wherein each movable leg includes a link pivotably attached to a respective one of the lower legs, and wherein each one of the mechanical transmission mechanisms includes a slider element that departs a pivoting motion to a respective one of the lower legs via the link, the link also pivotably attached to the slider.

8. The parallel platform system according to claim 1, wherein each one of the mechanical transmission mechanism is arranged inside the planar base, and each one of the mechanical transmission mechanisms perform a linear motion along a longitudinal extension of a respective one of the three openings of the planar base to actuate a respective one of the lower legs.

9. The parallel platform system according to claim 1, wherein each one of the mechanical transmission mechanism includes a slider element that departs a pivoting motion to a respective one of the lower legs via a link.

10. The parallel platform system according to claim 1, wherein the slider element is actuated by at least two coils arranged at the planar base.

11. The parallel platform system according to claim 1, wherein each one of the mechanical transmission mechanism includes a rotative motor configured to rotate a corresponding one of the lower legs relative to the planar base.

12. The parallel platform system according to claim 1, wherein each one of the upper legs includes two side rails that are spaced apart to form an opening to accommodate the lower leg therein when in the folded state.

\* \* \* \* \*